US012634098B2

(12) United States Patent
Liu et al.

(10) Patent No.: US 12,634,098 B2
(45) Date of Patent: May 19, 2026

(54) METHODS AND APPARATUS FOR SECONDARY CELL (SCELL) ACTIVATION AND DEACTIVATION

(71) Applicant: Huawei Technologies Co., Ltd., Shenzhen (CN)

(72) Inventors: Jialing Liu, Palatine, IL (US); Weimin Xiao, Hoffman Estates, IL (US); Jialin Zou, Randolph, NJ (US); Qian Cheng, Naperville, IL (US)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 378 days.

(21) Appl. No.: 18/501,639

(22) Filed: Nov. 3, 2023

(65) Prior Publication Data

US 2024/0063991 A1 Feb. 22, 2024

Related U.S. Application Data

(63) Continuation of application No. PCT/US2022/026736, filed on Apr. 28, 2022.

(60) Provisional application No. 63/250,754, filed on Sep. 30, 2021, provisional application No. 63/229,902, filed on Aug. 5, 2021, provisional application No. 63/185,854, filed on May 7, 2021.

(51) Int. Cl.
*H04L 5/00* (2006.01)

(52) U.S. Cl.
CPC .......... *H04L 5/0098* (2013.01); *H04L 5/0048* (2013.01); *H04L 5/0057* (2013.01)

(58) Field of Classification Search
None
See application file for complete search history.

(56) References Cited

U.S. PATENT DOCUMENTS

| | | | |
|---|---|---|---|
| 2018/0007731 A1* | 1/2018 | Park | H04L 5/001 |
| 2024/0073813 A1* | 2/2024 | Sun | H04W 52/0206 |
| 2025/0097827 A1* | 3/2025 | Babaei | H04W 48/16 |

OTHER PUBLICATIONS

"3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 15)", 3GPP TS 36.300, V15.12.0, Technical Specification, Dec. 2020, 365 Pages.

(Continued)

*Primary Examiner* — Walter J Divito
(74) *Attorney, Agent, or Firm* — Slater Matsil, LLP

(57) ABSTRACT

According to embodiments, a UE receives a first signaling including a first configuration of a first CSI-RS for tracking for an SCell. The first configuration is associated with a first ID. The UE receives a second signaling including a second configuration of an RS for fast SCell activation of the SCell. The second configuration is associated with a second ID. The second configuration includes the first ID. The UE receives a MAC CE message including an SCell activation command indicating to activate the SCell and the second ID. The UE receives the RS for the fast SCell activation of the SCell. The RS includes a first burst of the first CSI-RS for tracking. The UE performs SCell activation for activating the SCell based at least on the RS upon receiving the SCell activation command. The UE sends a report indicating that the SCell is activated for the UE.

26 Claims, 20 Drawing Sheets

700

ACTIVATION OF A DEACTIVATED SCell WITH 4 POSSIBLE PROCEDURES:

THE SCell IS IN DEACTIVATION

RX A SCell ACTIVATION MAC COMMAND

RX AN AP TRS L1 TRIGGER FOR THE SCell

RX AN AP CSI-RS L1 TRIGGER FOR THE SCell

RX AN AP SRS L1 TRIGGER FOR THE SCell

START SCell ACTIVATION PROCEDURE

START SCell ACTIVATION PROCEDURE

START SCell ACTIVATION PROCEDURE

START SCell ACTIVATION PROCEDURE

RX THE ASSOCIATED AP TRS (RX/TX THE ASSOCIATED AP CSI-RS/SRS)

RX THE ASSOCIATED AP TRS AND AP CSI-RS (TX THE ASSOCIATED AP SRS)

RX THE ASSOCIATED AP TRS, TX THE ASSOCIATED AP SRS (RX THE ASSOCIATED AP CSI-RS)

(REPORT A VALID DL CSI) SCell ACTIVATED

DASHED LINE OR ( ):
OPTIONAL SUPPORT

(56)     References Cited

OTHER PUBLICATIONS

"5G; NR; Physical layer procedures for data (3GPP TS 38.214 version 16.4.0 Release 16)", Technical Specification, ETSI TS 138 214 V16.4.0 (Jan. 2021), 173 Pages.

Ericsson, "Reduced Latency SCell Activiation", 3GPP TSG RAN WG1 #104b-e, R1-2103646, Apr. 12-20, 2021, 8 Pages, e-Meeting.

Futurewei, "Support efficient activation/de-activation mechanism for SCells", 3GPP TSG RAN WG1 Meeting #105-e, R1-2104206, May 19-27, 2021, 15 Pages, e-Meeting.

Futurewei, "Support efficient activiation/de-activiation mechanism for SCells", 3GPP TSG RAN WG1 Meeting #104bis-e, R1-2102768, Apr. 12-20, 2021, 9 Pages, e-Meeting.

OPPO, "Discussion on efficient activation/de-activation for SCell", 3GPP TSG RAN WG1 #104b-e, R1-2102417, Apr. 12-Apr. 20, 2021, 8 Pages, e-Meeting.

RAN WG1, "LS on temporary RS for efficient SCell activation in NR CA", 3GPP TSG RAN WG1 Meeting #103-e, R1-2009798, Oct. 26-Nov. 13, 2020, 3 Pages, E-meeting.

VIVO, "Discussion on efficient activiation/de-activiation mechanism for SCells", 3GPP TSG-RAN WG1 Meeting #104bis-e, R1-2102545, Apr. 12-Apr. 20, 2021, 4 Pages, e-Meeting.

ZTE, "Discussion on Supporting Efficient Activiation/De-activiation Mechanism for SCells for NR CA", 3GPP TSG RAN WG1 #104b-e, R1-2102504, Apr. 12-20, 2021, 6 Pages, e-Meeting.

* cited by examiner

599

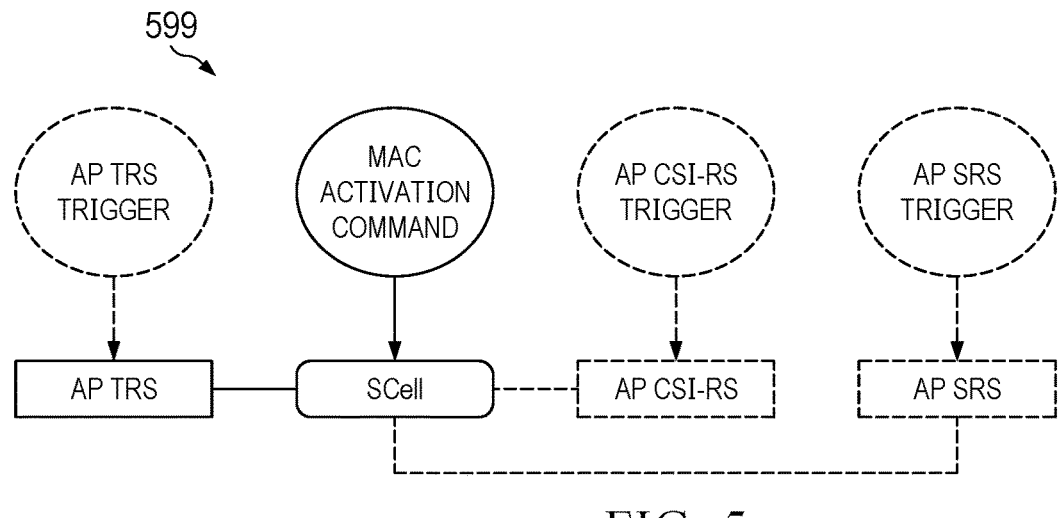

FOR A SCell:

602 — CONFIGURE TRS FOR THE SCell ACTIVATION

604 — CONFIGURE AP CSI-RS FOR THE SCell ACTIVATION

606 — CONFIGURE AP SRS FOR THE SCell ACTIVATION

608 — PERFORM SCell ACTIVATION WITH AT LEAST THE TRS

FOR A SCell:

802 — RX A L2 SCell ACTIVATION COMMAND   SLOT n

804 — TX ACK FOR THE L2 ACTIVATION COMMAND   n + t (e.g., t = 3)

806 — RX AP TRS   n + t + k_trs

808 — RX AP CSI-RS   n + t + k_csi-rs

810 — TX AP CSI REPORT WITH AT LEAST A VALID CQI   AP SRS MAY BE OPTIONALLY SENT

812 — SCell IS ACTIVATED

814 — RX P/SP TRS LINKED TO THE AP-TRS

FIG. 8

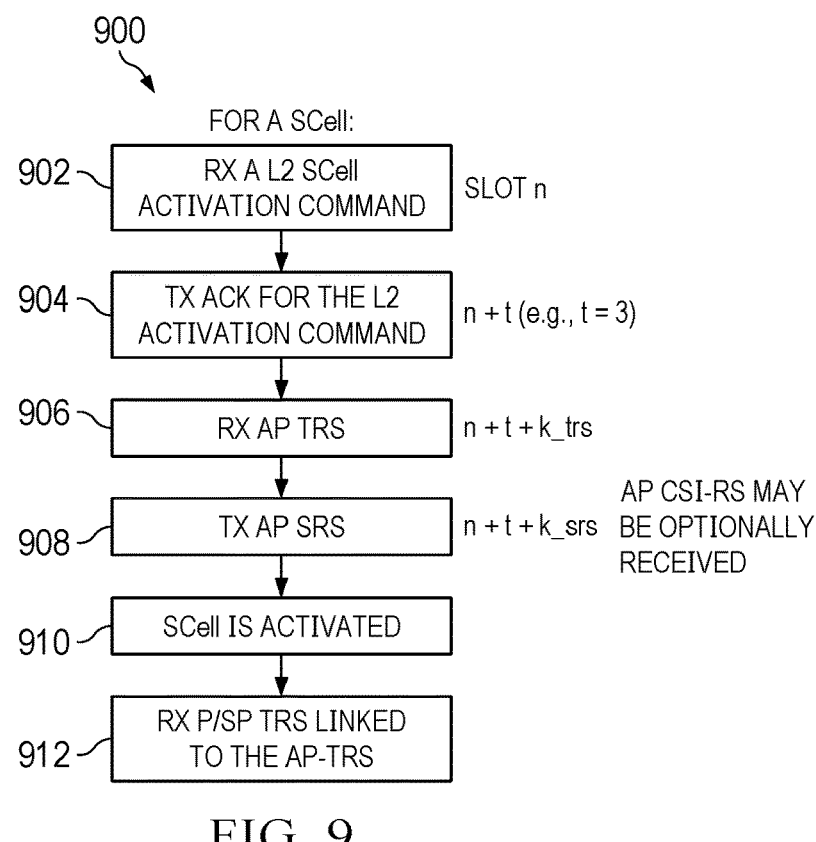

900

FOR A SCell:

902 — RX A L2 SCell ACTIVATION COMMAND        SLOT n

904 — TX ACK FOR THE L2 ACTIVATION COMMAND        n + t (e.g., t = 3)

906 — RX AP TRS        n + t + k_trs

908 — TX AP SRS        n + t + k_srs        AP CSI-RS MAY BE OPTIONALLY RECEIVED 910 — SCell IS ACTIVATED

912 — RX P/SP TRS LINKED TO THE AP-TRS

FIG. 9

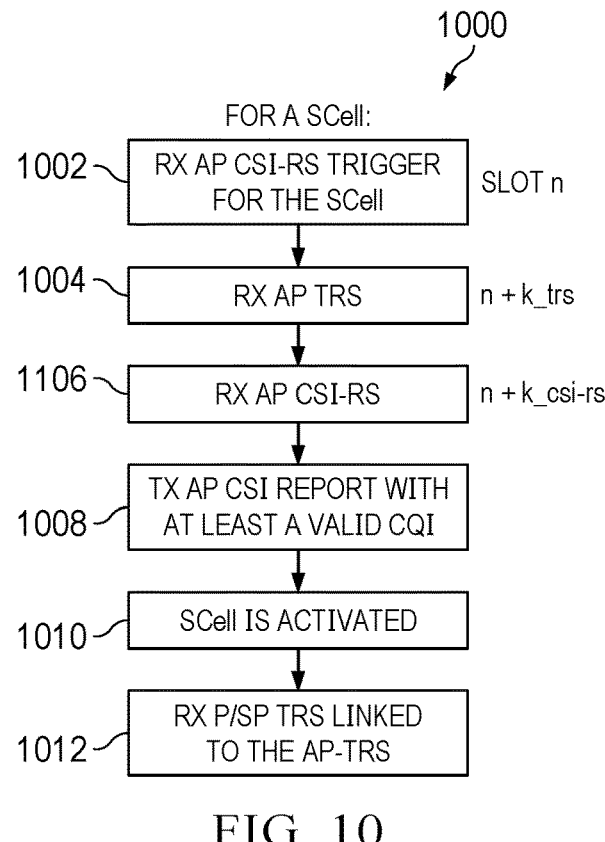

1000

FOR A SCell:

1002 — RX AP CSI-RS TRIGGER FOR THE SCell        SLOT n

1004 — RX AP TRS        n + k_trs

1106 — RX AP CSI-RS        n + k_csi-rs

1008 — TX AP CSI REPORT WITH AT LEAST A VALID CQI

1010 — SCell IS ACTIVATED

1012 — RX P/SP TRS LINKED TO THE AP-TRS

FIG. 10

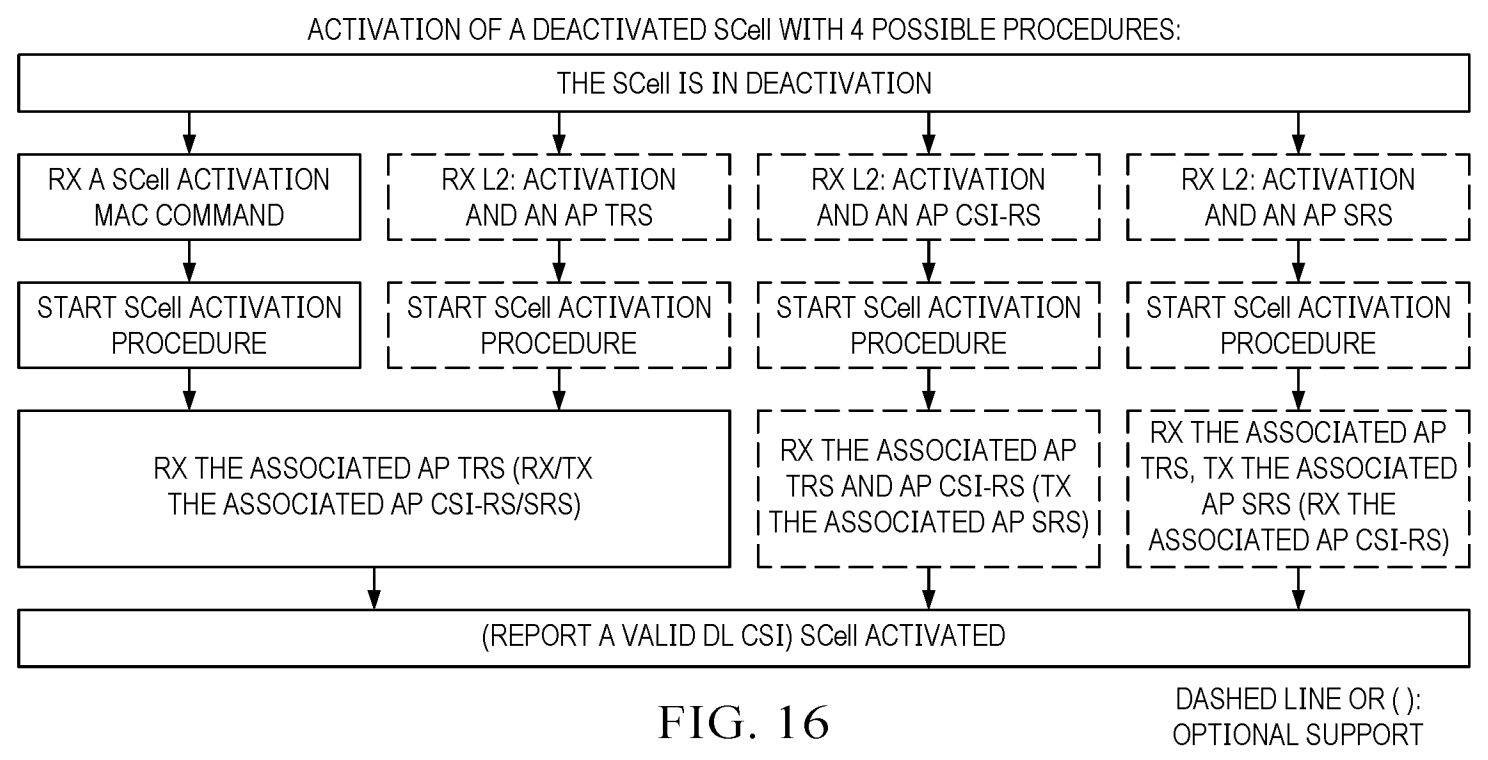

ACTIVATION OF A DEACTIVATED SCell WITH 4 POSSIBLE PROCEDURES:

THE SCell IS IN DEACTIVATION

RX A SCell ACTIVATION MAC COMMAND

START SCell ACTIVATION PROCEDURE

| RX L2: ACTIVATION AND AN AP TRS | RX L2: ACTIVATION AND AN AP CSI-RS | RX L2: ACTIVATION AND AN AP SRS |
|---|---|---|
| START SCell ACTIVATION PROCEDURE | START SCell ACTIVATION PROCEDURE | START SCell ACTIVATION PROCEDURE |

RX THE ASSOCIATED AP TRS (RX/TX THE ASSOCIATED AP CSI-RS/SRS)

RX THE ASSOCIATED AP TRS AND AP CSI-RS (TX THE ASSOCIATED AP SRS)

RX THE ASSOCIATED AP TRS, TX THE ASSOCIATED AP SRS (RX THE ASSOCIATED AP CSI-RS)

(REPORT A VALID DL CSI) SCell ACTIVATED

DASHED LINE OR ( ): OPTIONAL SUPPORT

FIG. 16

FOR A SCell:

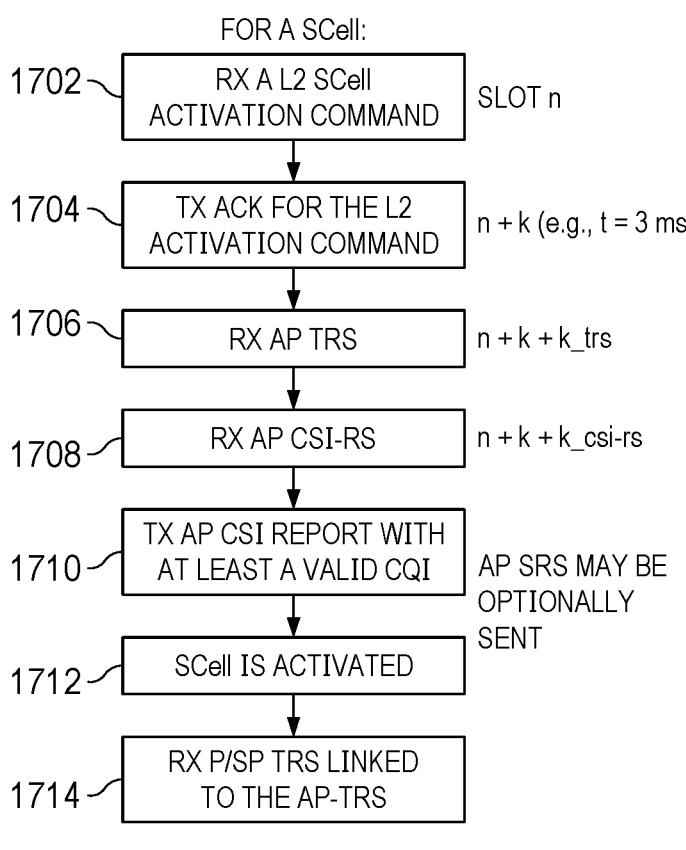

1702 — RX A L2 SCell ACTIVATION COMMAND    SLOT n

1704 — TX ACK FOR THE L2 ACTIVATION COMMAND    n + k (e.g., t = 3 ms)

1706 — RX AP TRS    n + k + k_trs

1708 — RX AP CSI-RS    n + k + k_csi-rs

1710 — TX AP CSI REPORT WITH AT LEAST A VALID CQI

AP SRS MAY BE OPTIONALLY SENT

1712 — SCell IS ACTIVATED

1714 — RX P/SP TRS LINKED TO THE AP-TRS

FIG. 17

FOR A SCell:

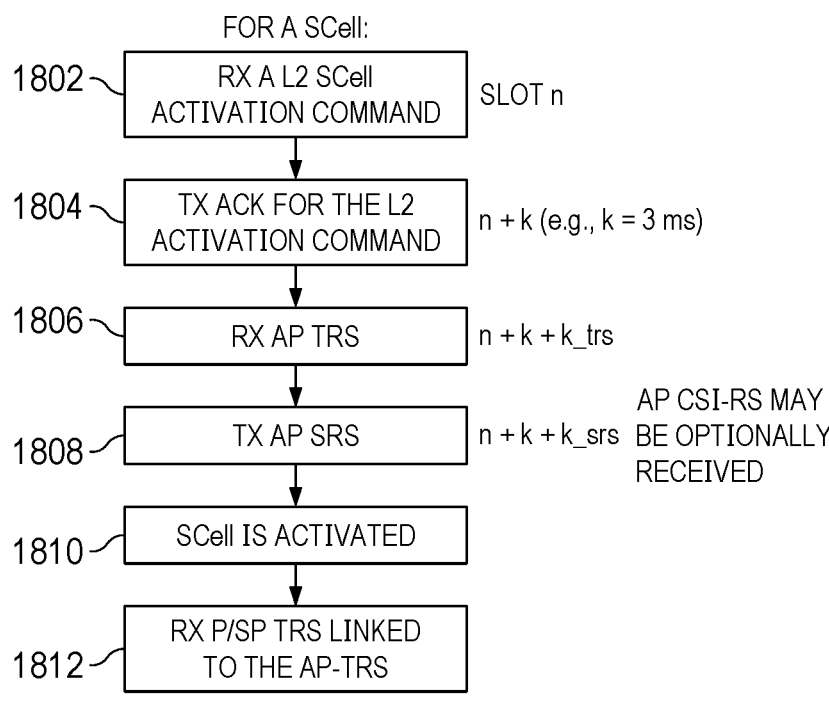

1802 — RX A L2 SCell ACTIVATION COMMAND    SLOT n

1804 — TX ACK FOR THE L2 ACTIVATION COMMAND    n + k (e.g., k = 3 ms)

1806 — RX AP TRS    n + k + k_trs

1808 — TX AP SRS    n + k + k_srs

AP CSI-RS MAY BE OPTIONALLY RECEIVED

1810 — SCell IS ACTIVATED

1812 — RX P/SP TRS LINKED TO THE AP-TRS

FIG. 18

FOR A SCell:

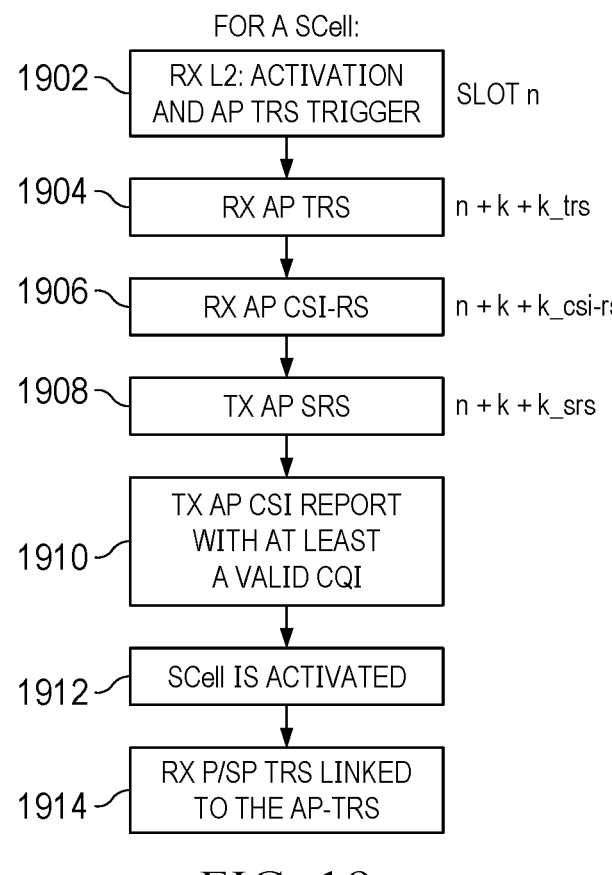

1902 — RX L2: ACTIVATION AND AP TRS TRIGGER — SLOT n

1904 — RX AP TRS — n + k + k_trs

1906 — RX AP CSI-RS — n + k + k_csi-rs

1908 — TX AP SRS — n + k + k_srs

1910 — TX AP CSI REPORT WITH AT LEAST A VALID CQI

1912 — SCell IS ACTIVATED

1914 — RX P/SP TRS LINKED TO THE AP-TRS

FIG. 19

FOR A SCell:

2002 — RX L2: ACTIVATION AND AP CSI-RS TRIGGER — SLOT n

2004 — RX AP TRS — n + k + k_trs

2006 — RX AP CSI-RS — n + k + k_csi-rs

2008 — TS AP CSI REPORT WITH AT LEAST A VALID CQI

2010 — SCell IS ACTIVATED

2012 — RX P/SP TRS LINKED TO THE AP-TRS

FIG. 20

FOR A SCell:

2102 — RX L2: ACTIVATION AND AP SRS TRIGGER    SLOT n

2104 — RX AP TRS    n + k + k_trs

2106 — TX AP TRS    n + k + k_srs

2108 — SCell IS ACTIVATED

2110 — RX P/SP TRS LINKED TO THE AP-TRS

FOR A SCell:

2202 — RX L2: ACTIVATION AND AN AP CSI TRIGGER    SLOT n

2204 — RX AP TRS    n + k + k_trs

2206 — RX AP CSI-RS AND CSI-IM RESOURCE    n + k + k_csi-rs

2208 — TX AP CSI REPORT WITH AT LEAST A VALID CQI

2210 — SCell IS ACTIVATED

2212 — RX P/SP TRS LINKED TO THE AP-TRS

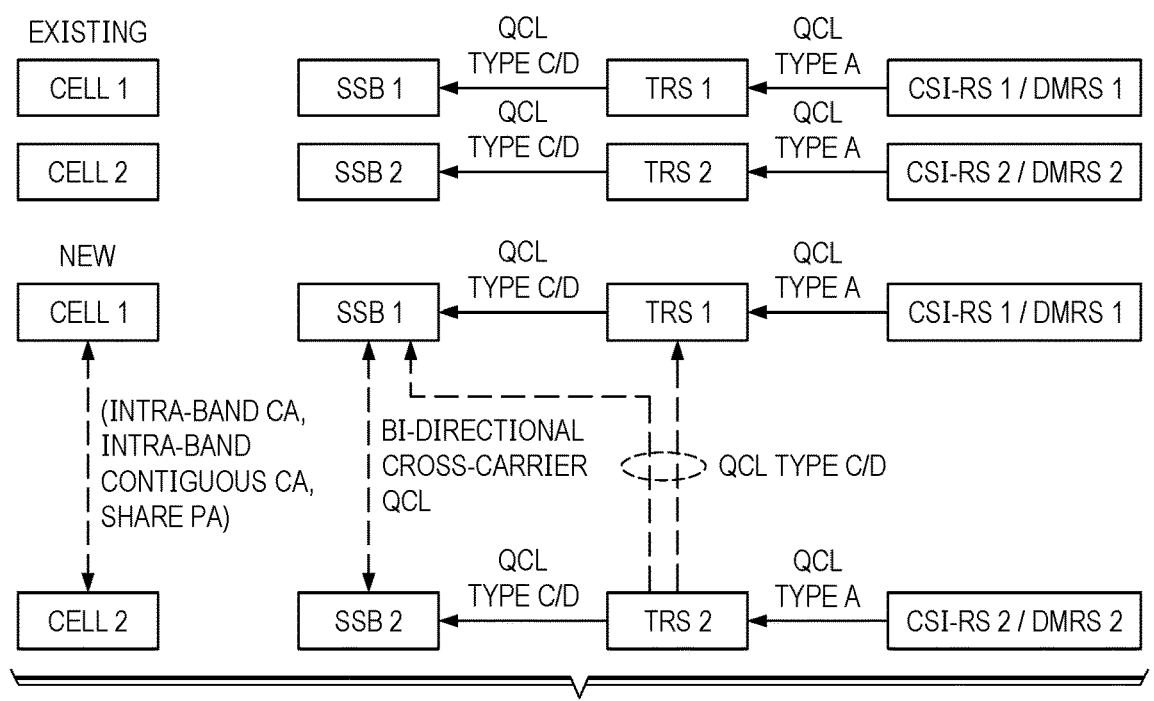
FIG. 23
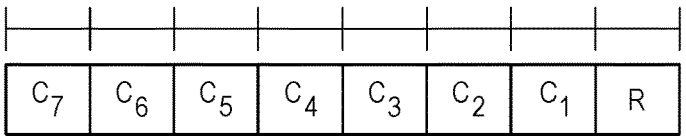
FIG. 24
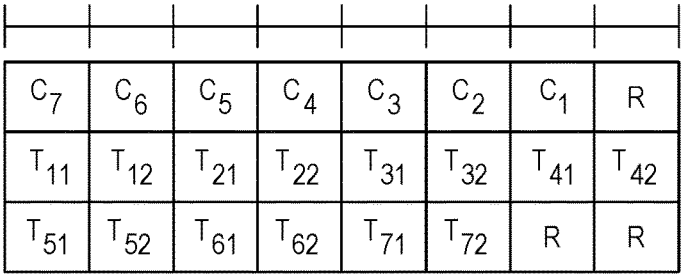
FIG. 25
FIG. 26

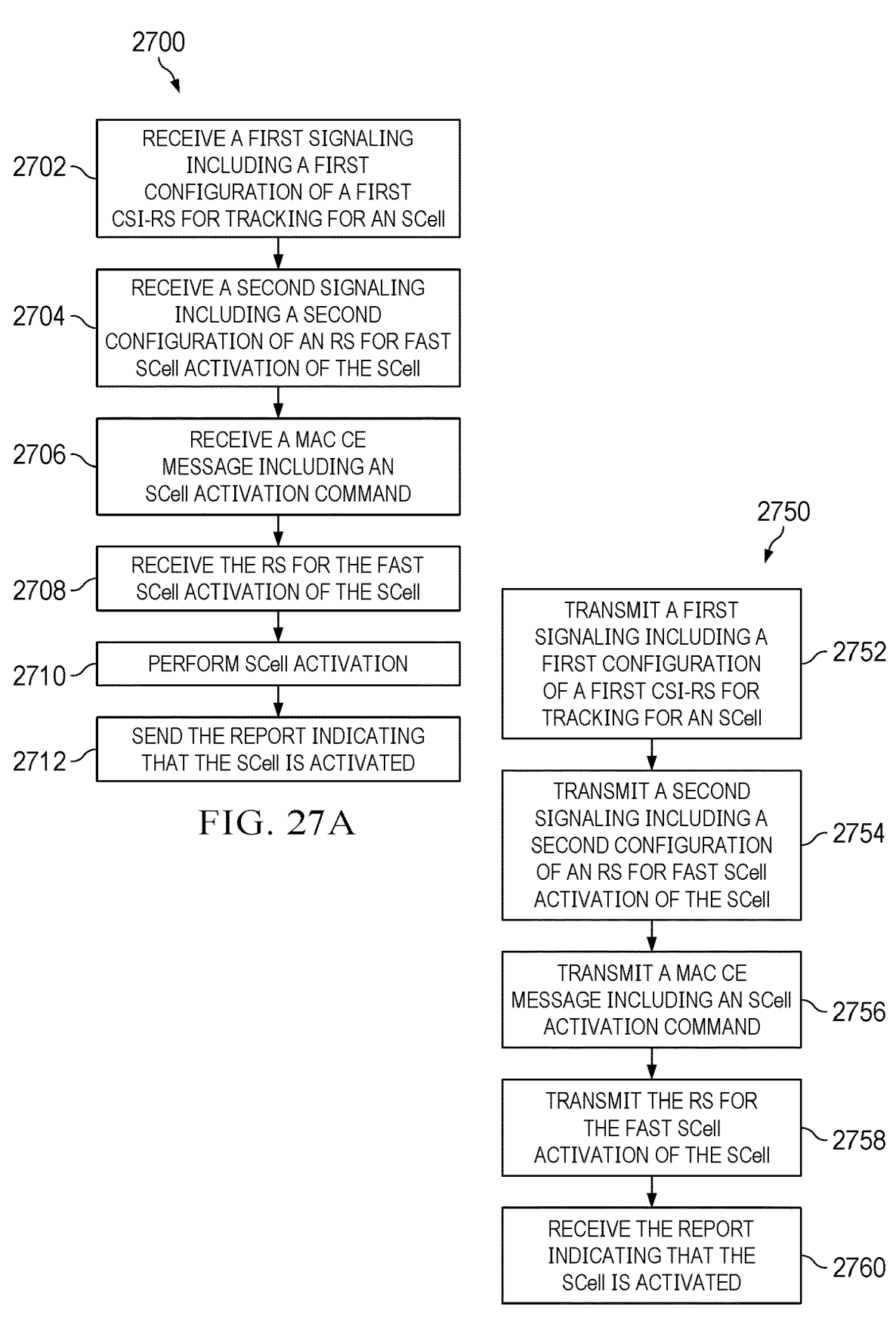

2700

2702 — RECEIVE A FIRST SIGNALING INCLUDING A FIRST CONFIGURATION OF A FIRST CSI-RS FOR TRACKING FOR AN SCell 2704 — RECEIVE A SECOND SIGNALING INCLUDING A SECOND CONFIGURATION OF AN RS FOR FAST SCell ACTIVATION OF THE SCell 2706 — RECEIVE A MAC CE MESSAGE INCLUDING AN SCell ACTIVATION COMMAND 2708 — RECEIVE THE RS FOR THE FAST SCell ACTIVATION OF THE SCell 2710 — PERFORM SCell ACTIVATION 2712 — SEND THE REPORT INDICATING THAT THE SCell IS ACTIVATED

TRANSMIT A FIRST SIGNALING INCLUDING A FIRST CONFIGURATION OF A FIRST CSI-RS FOR TRACKING FOR AN SCell — 2752

TRANSMIT A SECOND SIGNALING INCLUDING A SECOND CONFIGURATION OF AN RS FOR FAST SCell ACTIVATION OF THE SCell — 2754

TRANSMIT A MAC CE MESSAGE INCLUDING AN SCell ACTIVATION COMMAND — 2756

TRANSMIT THE RS FOR THE FAST SCell ACTIVATION OF THE SCell — 2758

RECEIVE THE REPORT INDICATING THAT THE SCell IS ACTIVATED — 2760

PROCESSING UNIT
3002

3014

CPU

3004

MASS STORAGE

NETWORKS

NETWORK INTERFACES

3006

3022

3020

3008

MEMORY

VIDEO ADAPTER

3010

I/O INTERFACE

3012

DISPLAY

3018

MOUSE/ KEYBOARD/ PRINTER

3016

METHODS AND APPARATUS FOR SECONDARY CELL (SCELL) ACTIVATION AND DEACTIVATION

CROSS-REFERENCE TO RELATED APPLICATIONS

This patent application is a continuation of International Patent Application No. PCT/US2022/026736, filed on Apr. 28, 2022 and entitled "Methods and Apparatus for Secondary Cell (SCell) Activation and Deactivation," which claims the benefit of priority to U.S. Provisional Application No. 63/185,854, filed on May 7, 2021 and entitled "Methods and Apparatus for Secondary Cell (SCell) Activation and Deactivation," to U.S. Provisional Application No. 63/229,902, filed on Aug. 5, 2021 and entitled "Methods and Apparatus for Efficient Secondary Cell (SCell) Activation and Deactivation," and to U.S. Provisional Application No. 63/250,754, filed on Sep. 30, 2021 and entitled "Methods and Apparatus for Efficient Secondary Cell (SCell) Activation and Reference Signals," applications of which are hereby incorporated by reference herein as if reproduced in their entireties.

TECHNICAL FIELD

The present disclosure relates generally to wireless communications, and, in particular embodiments, to methods and apparatus for secondary cell (SCell) enhancements in wireless communications.

BACKGROUND

Wireless communication systems include long term evolution (LTE), LTE-A, LTE-A-beyond systems, 5G LTE, 5G New Radio (NR), etc. A modern wireless communication system may include a plurality of NodeBs (NBs), which may also be referred to as base stations, network nodes, communications controllers, cells or enhanced NBs (eNBs), and so on. A NodeB may include one or more network points or network nodes using different radio access technologies (RATs) such as high speed packet access (HSPA) NBs or WiFi access points. A NodeB may be associated with a single network point or multiple network points. A cell may include a single network point or multiple network points, and each network point may have a single antenna or multiple antennas. A network point may correspond to multiple cells operating in multiple component carriers. Generally each component carrier in carrier aggregation is a serving cell, either a primary cell (PCell) or a secondary cell (SCell).

A cell or NodeB may serve a number of users (also commonly referred to as User Equipment (UE), mobile stations, terminals, devices, and so forth) over a period of time. A communication channel from a NB to a UE is generally referred to as a downlink (DL) channel, and a transmission from the NB to the UE is a downlink transmission. A communication channel from a UE to a NB is generally referred to an uplink (UL) channel, and a transmission from the UE to the NB is an uplink transmission.

It is widely observed that SCell activation in the current new radio (NR) systems is too slow (the SCell activation latency generally in the range of tens to hundreds of milliseconds). In many cases, the SCell activation latency in the current NR systems is even longer than that of the LTE systems. So, it is desirable to improve the SCell activation latency for the NR systems and beyond.

SUMMARY

According to embodiments, a UE receives from a base station a first signaling including a first configuration of a first channel state information reference signal (CSI-RS) for tracking for a secondary cell (SCell). The first configuration is associated with a first identifier (ID). The UE receives from the base station a second signaling including a second configuration of a reference signal (RS) for fast SCell activation of the SCell. The second configuration is associated with a second ID, and the second configuration includes the first ID. The UE receives from the base station a medium access control control element (MAC CE) message. The MAC CE message includes an SCell activation command indicating the UE to activate the SCell and the second ID. The UE receives from the base station the RS for the fast SCell activation of the SCell. The RS includes a first burst of the first CSI-RS for tracking. The UE performs SCell activation for activating the SCell based at least on the RS upon receiving the SCell activation command. The UE sends to the base station a report indicating that the SCell is activated for the UE.

In some embodiments, the MAC CE message may further include a bitmap of at least one of one or more activation commands or one or more deactivation commands for corresponding multiple SCells. The MAC CE message may exclude any ID for an RS or an RS configuration for each SCell of one or more SCells to be deactivated. In some embodiments, the MAC CE message may include RS configuration IDs of the one or more SCells to be activated corresponding to the one or more activation commands. The bitmap in the MAC CE message may include activation command bits corresponding to the one or more activation commands. The RS configuration IDs may follow the bitmap in the MAC CE message in an ascending order of the one or more SCells to be activated in the bitmap. In some embodiments, the UE may perform the SCell activation by at least one of setting automatic gain control (AGC) based on the first burst or performing time and frequency synchronization or tracking for the SCell based on the first burst. In some embodiments, the RS may further include a second burst of the first CSI-RS for tracking after the first burst. A time duration between the first burst and the second burst may be associated with a gap value indicated by the second configuration. In some embodiments, the UE may perform the SCell activation by setting AGC based on the first burst and performing time and frequency synchronization or tracking for the SCell based on the second burst. In some embodiments, the RS may be aperiodic and transmitted to the UE responsive to the SCell activation command being transmitted. In some embodiments, the UE may receive the RS by receiving from the base station the RS on a first bandwidth part (BWP) in one or more BWPs of the SCell. The first BWP may be associated with a firstActiveDownlinkBWP-Id. The firstActiveDownlinkBWP-Id may be configured in an RRC message when the SCell is configured. The first BWP is activated in conjunction with the SCell being activated. In some embodiments, the first CSI-RS for tracking may be configured as an aperiodic CSI-RS for tracking on the first BWP. In some embodiments, the second configuration may further indicate an offset value associated with a delay between slot (n+k) and the first burst, slot n denotes an ending slot for the MAC CE message, and slot (n+k) denotes one slot after decoding and processing of the MAC CE message. In some embodiments, the report may include a downlink (DL) CSI.

According to embodiments, a base station transmits to a UE a first signaling including a first configuration of a first channel state information reference signal (CSI-RS) for tracking for a secondary cell (SCell). The first configuration is associated with a first identifier (ID). The base station transmits to the UE a second signaling including a second configuration of a reference signal (RS) for fast SCell activation of the SCell. The second configuration is associated with a second ID, and the second configuration includes the first ID. The base station transmits to the UE a medium access control control element (MAC CE) message. The MAC CE message includes an SCell activation command indicating the UE to activate the SCell and the second ID. The base station transmits to the UE the RS for the fast SCell activation of the SCell. The RS includes a first burst of the first CSI-RS for tracking. The UE performs SCell activation for activating the SCell based at least on the RS upon receiving the SCell activation command. The base station receives from the UE a report indicating that the SCell is activated for the UE.

In some embodiments, the MAC CE message may further include a bitmap of at least one of one or more activation commands or one or more deactivation commands for corresponding multiple SCells. The MAC CE message may exclude any ID for an RS or an RS configuration for each SCell of one or more SCells to be deactivated. In some embodiments, the MAC CE message may include RS configuration IDs of the one or more SCells to be activated corresponding to the one or more activation commands. The bitmap in the MAC CE message may include activation command bits corresponding to the one or more activation commands. The RS configuration IDs may follow the bitmap in the MAC CE message in an ascending order of the one or more SCells to be activated in the bitmap. In some embodiments, the UE may perform the SCell activation by at least one of setting automatic gain control (AGC) based on the first burst or performing time and frequency synchronization or tracking for the SCell based on the first burst. In some embodiments, the RS may further include a second burst of the first CSI-RS for tracking after the first burst. A time duration between the first burst and the second burst may be associated with a gap value indicated by the second configuration. In some embodiments, the UE may perform the SCell activation by setting AGC based on the first burst and performing time and frequency synchronization or tracking for the SCell based on the second burst. In some embodiments, the RS may be aperiodic and transmitted to the UE responsive to the SCell activation command being transmitted. In some embodiments, the base station may transmit the RS by transmitting to the UE the RS on a first bandwidth part (BWP) in one or more BWPs of the SCell. The first BWP may be associated with a firstActiveDownlinkBWP-Id. The firstActiveDownlinkBWP-Id may be configured in an RRC message when the SCell is configured. The first BWP is activated in conjunction with the SCell being activated. In some embodiments, the first CSI-RS for tracking may be configured as an aperiodic CSI-RS for tracking on the first BWP. In some embodiments, the second configuration may further indicate an offset value associated with a delay between slot (n+k) and the first burst, slot n denotes an ending slot for the MAC CE message, and slot (n+k) denotes one slot after decoding and processing of the MAC CE message. In some embodiments, the report may include a downlink (DL) CSI.

BRIEF DESCRIPTION OF THE DRAWINGS

For a more complete understanding of the present disclosure, and the advantages thereof, reference is now made to the following descriptions taken in conjunction with the accompanying drawings, in which:

FIG. 5 illustrates a diagram of support for SCell activation according to example embodiments presented herein;

FIG. 6 illustrates a flow diagram of a configuration process according to example embodiments presented herein;

FIG. 8 illustrates a diagram for a second example embodiment for SCell activation triggering and activation according to example embodiments presented herein;

FIG. 9 illustrates a diagram for a third example for SCell activation triggering and activation according to example embodiments presented herein;

FIG. 10 illustrates a diagram for a fourth example for SCell activation triggering and activation according to example embodiments presented herein;

FIG. 16 illustrates SCell activation with several L2 signaling designs according to example embodiments presented herein;

FIG. 17 illustrates SCell activation and triggering according to example embodiments presented herein;

FIG. 18 illustrates SCell activation and RS triggering according to example embodiments presented herein;

FIG. 19 illustrates SCell activation and RS triggering according to example embodiments presented herein;

FIG. 20 illustrates SCell activation triggering and activation according to example embodiments presented herein;

FIG. 23 illustrates an existing QCL configuration example for carrier aggregation and new cross-carrier QCL relationship embodiment according to example embodiments presented herein;

FIG. 24 illustrates an SCell activation/deactivation MAC CE used for TRS activation according to example embodiments presented herein;

FIG. 25 illustrates a new SCell TRS activation MAC CE with TRS selection information according to example embodiments presented herein;

FIG. 26 illustrates an alternative new MAC CE including only the TRS selection bits corresponding to to-be activated SCell(s) according to example embodiments presented herein;

FIG. 27A illustrates a flowchart of a method for SCell activation according to example embodiments presented herein;

FIG. 27B illustrates a flowchart of a method for SCell activation according to example embodiments presented herein;

DETAILED DESCRIPTION OF ILLUSTRATIVE EMBODIMENTS

Figure 1A:
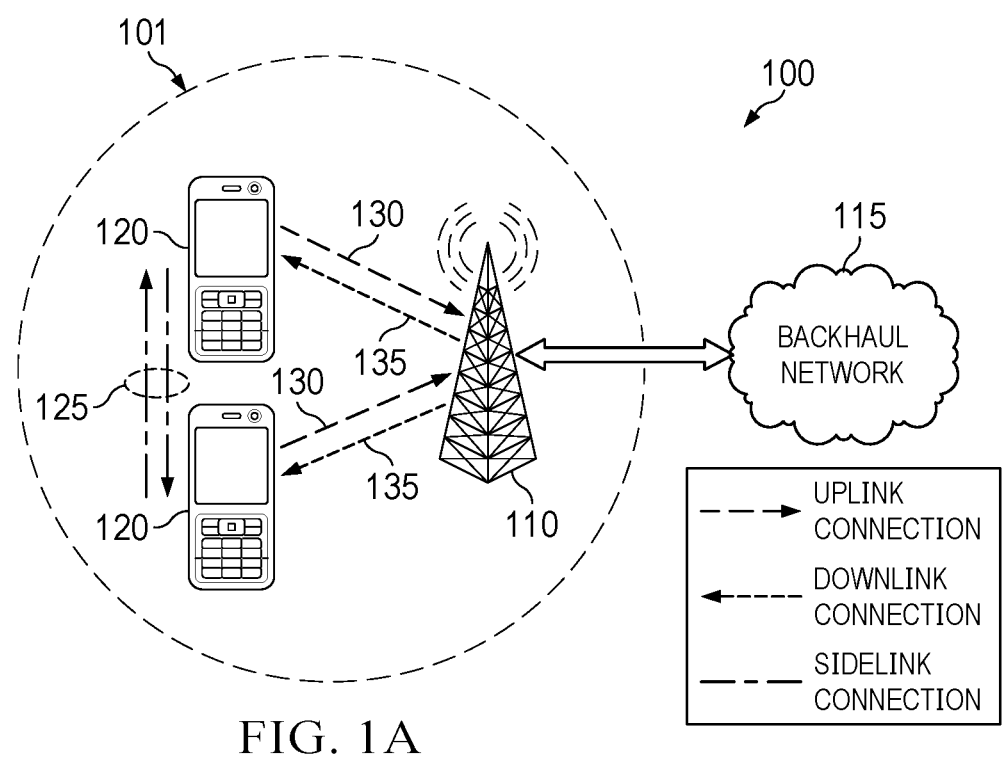
FIG. 1A illustrates an example wireless communication system, according to some embodiments.

FIG. 1A illustrates an example wireless communication system 100. Communication system 100 includes a base station 110 with coverage area 101. The base station 110 serves a plurality of user equipments (UEs), including UEs 120. Transmissions from the base station 110 to a UE is referred to as a downlink (DL) transmission and occurs over a downlink channel (shown in FIG. 1A as a solid arrowed line 135), while transmissions from a UE to the base station 110 is referred to as an uplink (UL) transmission and occurs over an uplink channel (shown in FIG. 1A as a dashed arrowed line 130). Data carried over the uplink/downlink connections may include data communicated between the UEs 120, as well as data communicated to/from a remote-end (not shown) by way of a backhaul network 115. Example uplink channels and signals include physical uplink shared channel (PUSCH), physical uplink control channel (PUCCH), an uplink sounding reference signal (SRS), or physical random access channel (PRACH). Services may be provided to the plurality of UEs by service providers connected to the base station 110 through the backhaul network 115, such as the Internet. The wireless communication system 100 may include multiple distributed access nodes 110.

In a typical communication system, there are several operating modes. In a cellular operating mode, communications to and from the plurality of UEs go through the base station 110, while in device to device communications mode, such as proximity services (ProSe) operating mode, for example, direct communication between UEs is possible. As used herein, the term "base station" refers to any component (or collection of components) configured to provide wireless access to a network. Base stations may also be commonly referred to as Node Bs, evolved Node Bs (eNBs), next generation (NG) Node Bs (gNBs), master eNBs (MeNBs), secondary eNBs (SeNBs), master gNBs (MgNBs), secondary gNBs (SgNBs), network controllers, control nodes, access nodes, access points (APs), transmission points (TPs), transmission-reception points (TRPs), cells, carriers, macro cells, femtocells, pico cells, relays, customer premises equipment (CPE), the network side, the network, and so on. In the present disclosure, the terms "base station" and "TRP" are used interchangeably unless otherwise specified. As used herein, the term "UE" refers to any component (or collection of components) capable of establishing a wireless connection with a base station. UEs may also be commonly referred to as mobile stations, mobile devices, mobiles, terminals, user terminals, users, subscribers, stations, communication devices, CPEs, relays, Integrated Access and Backhaul (JAB) relays, and the like. It is noted that when relaying is used (based on relays, picos, CPEs, and so on), especially multi-hop relaying, the boundary between a controller and a node controlled by the controller may become blurry, and a dual node (e.g., either the controller or the node controlled by the controller) deployment where a first node that provides configuration or control information to a second node is considered to be the controller. Likewise, the concept of UL and DL transmissions can be extended as well.

A cell may include one or more bandwidth parts (BWPs) for UL or DL allocated for a UE. Each BWP may have its own BWP-specific numerology and configuration, such as the BWP's bandwidth. It is noted that not all BWPs need to be active at the same time for the UE. A cell may correspond to one carrier, and in some cases, multiple carriers. Typically, one cell (a primary cell (PCell) or a secondary cell (SCell), for example) is a component carrier (a primary component carrier (PCC) or a secondary CC (SCC), for example). For some cells, each cell may include multiple carriers in UL, one carrier may be referred to as an UL carrier or non-supplementary UL (non-SUL, or simply UL) carrier which has an associated DL, and other carriers are called supplementary UL (SUL) carriers which do not have an associated DL. A cell, or a carrier, may be configured with slot or subframe formats comprising DL and UL symbols, and that cell or carrier may be seen as operating in a time division duplexed (TDD) mode. In general, for unpaired spectrum, the cells or carriers are in TDD mode, and for paired spectrum, the cells or carrier are in a frequency division duplexed (FDD) mode. A transmission time interval (TTI) generally corresponds to a subframe (in LTE) or a slot (in NR). Access nodes may provide wireless access in accordance with one or more wireless communication protocols, e.g., long term evolution (LTE), LTE advanced (LTE-A), 5G, 5G LTE, 5G NR, future 5G NR releases, 6G, High Speed Packet Access (HSPA), Wi-Fi 802.11a/b/g/n/ac, etc. While it is understood that communication systems may employ multiple access nodes (or base stations) capable of communicating with a number of UEs, only one access node, and two UEs are illustrated in FIG. 1 for simplicity.

A way to increase the network resources is to utilize more usable spectrum resources, which include not only the licensed spectrum resources of the same type as the macro, but also the licensed spectrum resources of different type as the macro (e.g., the macro is a FDD cell but a small cell may use both FDD and TDD carriers), as well as unlicensed spectrum resources and shared-licensed spectrums. Some of the spectrum resources lie in high-frequency bands, such as 6 GHz to 60 GHz. The unlicensed spectrums may be used by generally any user, subject to regulatory requirements. The shared-licensed spectrums are also not exclusive for an operator to use. Traditionally, the unlicensed spectrums are not used by cellular networks because it is generally difficult to ensure quality of service (QoS) requirements. Operating on the unlicensed spectrums mainly includes wireless local area networks (WLAN), e.g., the Wi-Fi networks. Due to the fact that the licensed spectrum is generally scarce and expensive, utilizing the unlicensed spectrum by the cellular operator may be considered. Note that on high-frequency bands and unlicensed/shared-licensed bands, typically TDD is used and hence the channel reciprocity can be exploited for the communications.

In a realistic deployment, a gNB may control one or more cells. Multiple remote radio units may be connected to the same base band unit of the gNB by fiber cable, and the latency between base band unit and remote radio unit is quite small. Therefore, the same base band unit can process the coordinated transmission/reception of multiple cells. For example, the gNB may coordinate the transmissions of multiple cells to a UE, which is called coordinated multiple point (CoMP) or multi-TRP (mTRP, M-TRP) transmission. The gNB may also coordinate the reception of multiple cells from a UE, which is called CoMP/M-TRP reception. In this case, the backhaul link between these cells with the same gNB is fast backhaul and the scheduling of data transmitted in different cells for the UE can be easily coordinated in the same gNB. The backhaul connections may also be ones with longer latency and lower transmission rates.

Figure 1B:
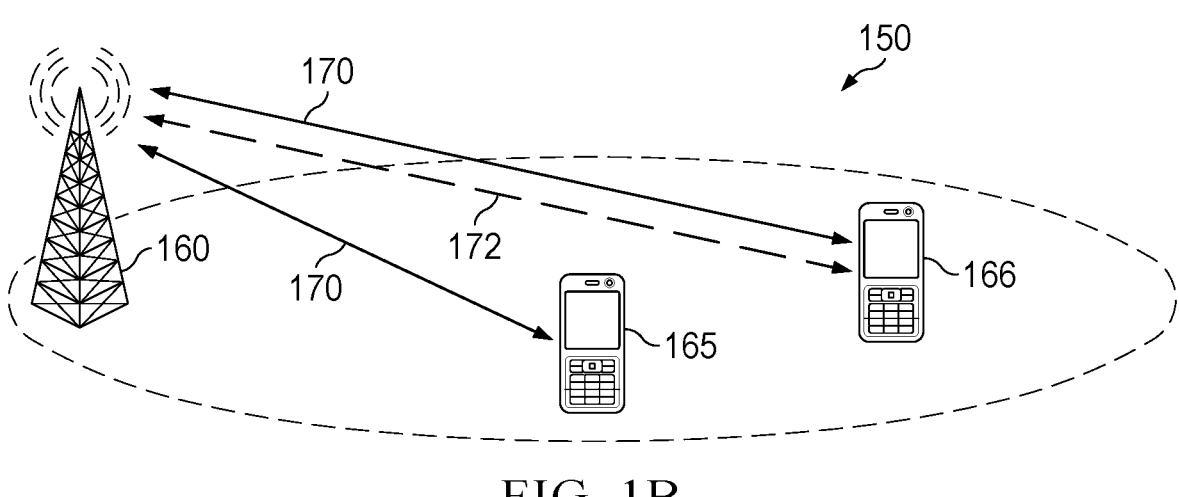
FIG. 1B illustrates the use of carrier aggregation (CA), according to some embodiments.

FIG. 1B illustrates the use of carrier aggregation (CA), which is another deployment strategy. As shown in FIG. 1B, system 150 is a typical wireless network configured with carrier aggregation (CA) where communications controller 160 communicates to wireless device 165 using wireless link 170 (solid line) and to wireless device 166 using wireless link 172 (dashed line) and using wireless link 170, respectively. In some example deployments, for wireless device 166, wireless link 170 can be called a primary component carrier (PCC) while wireless link 172 can be called a secondary component carrier (SCC). In some carrier aggregation deployments, the PCC can carry feedback from a UE device to a communications controller while the SCC can only carry data traffic. In the 3GPP specifications, a component carrier is called a cell. When multiple cells are controlled by a same eNB, cross scheduling of multiple cells can be implemented because there may be a single scheduler in the same eNB to schedule the multiple cells. With CA, one eNB may operate and control several component carriers forming primary cell (PCell) and secondary cell (SCell).

Figures 2A, 2B, 2C:
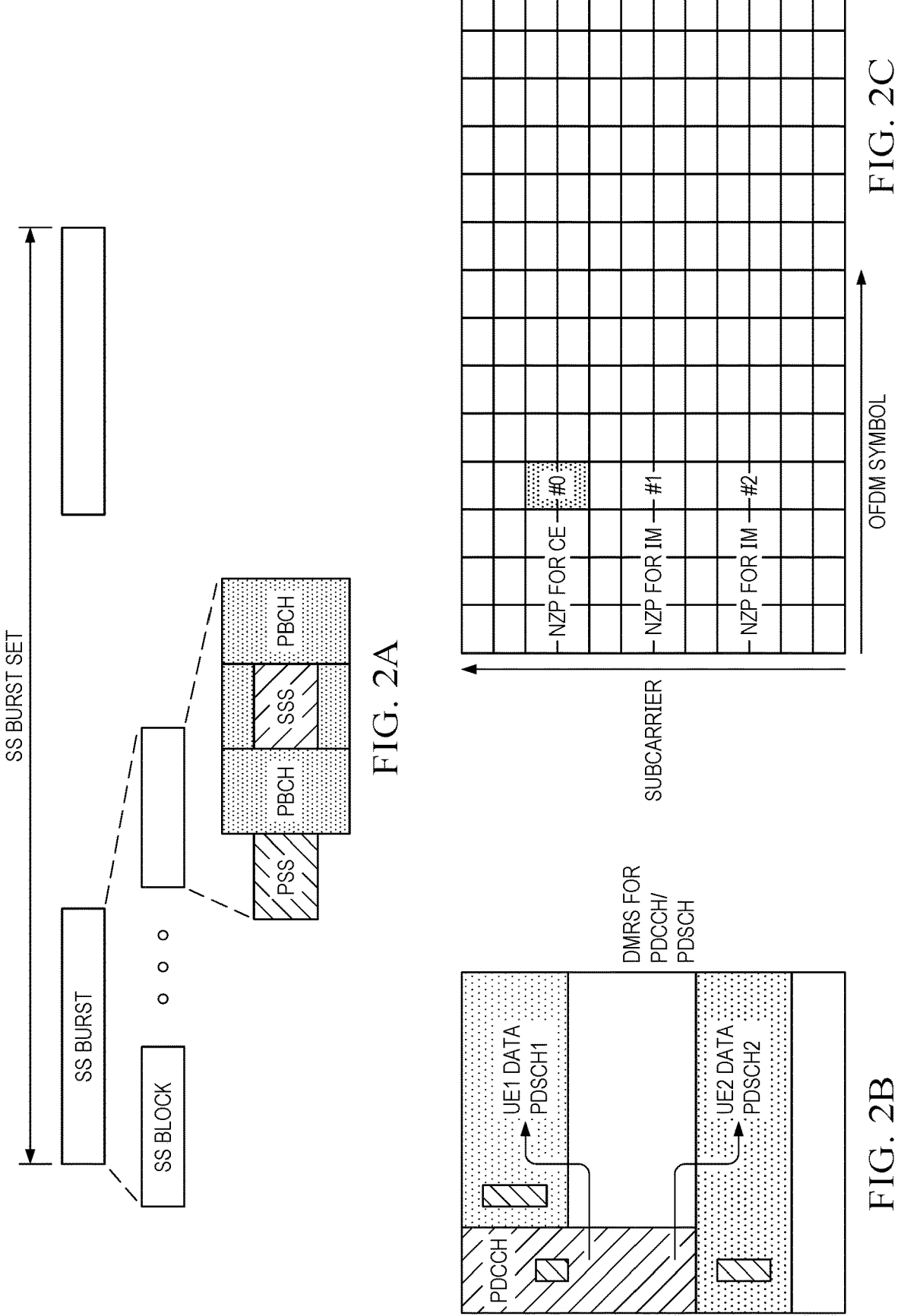
FIG. 2A illustrates physical layer channels and signals include PSS/SSS and PBCH, according to some embodiments.
FIG. 2B illustrates signals/channels which are multiplexed for more than one UE, according to some embodiments.
FIG. 2C illustrates examples of non-zero power (NZP) CSI-RS used for channel estimation, interference measurement, and so on, which are multiplexed with PDSCH and for one or more UEs, according to some embodiments.

Physical layer channels and signals include PSS/SSS, PBCH and its associated DMRS (see e.g., FIG. 2A, in which the SS bursts are multiplexed with PBCH around the SS bursts), PDSCH and its associated DMRS and phase tracking reference signal (PT-RS), PDCCH and its associated DMRS (see e.g., FIG. 2B for some of these signals/channels which are multiplexed for more than one UE), and CSI-RS which further include those used, for CSI acquisition, for beam management, and for tracking (see FIG. 2C for some examples of non-zero power (NZP) CSI-RS used for channel estimation, interference measurement, and so on, which are multiplexed with PDSCH and for one or more UEs). The CSI-RS for tracking is also called TRS.

The UE receives timing advance (TA) commands associated with the configured TA group (TAG) to adjust its uplink transmission timing to synchronize with the network for uplink transmission so that uplink transmissions from multiple UEs arrive at the base station at about the same time in a transmission time interval (TTI). Likewise, the UE needs to receive DL reference signals (RS) or synchronization signal (SS) blocks, also called SS/physical broadcast channel (PBCH) block SS/PBCH block (SSB) to acquire and maintain the DL synchronization, such as via maintaining a DL timing tracking loop, based on which the UE places the start of its FFT window inside the cyclic prefix (CP) for its DL reception. In addition, both UL and DL signals/channels are to be associated with some other signals for deriving the signal/channel properties, such as delay spread, Doppler shift, etc.

In wireless communications operations, tracking functionalities performed by a UE may include fine time tracking, fine frequency tracking, delay spread estimation, and Doppler spread estimation.

In fine time tracking, a UE may detect the first arriving path, and based thereon, the UE may generally optimally place its Fast Fourier transform (FFT) window to maximize a data signal to noise plus inter-symbol interference ratio. In a continuous operation, a FFT window position may drift due to UE mobility and a residual oscillator error between a transmitter and a receiver. The UE may adjust its FFT window position based on a detected change of path arriving (or arrival) time.

In fine frequency tracking, a UE may detect a frequency offset between a transmitter and a receiver, and adjust its oscillator accordingly. A residual frequency error may be estimated and compensated in the demodulation of data symbols. The residual frequency error compensation may be very critical, especially in the case of high signal-to-noise ratio (SNR) and high code rate data transmissions. Uncompensated frequency error may impose phase error on modulated data symbols and result in decoding performance degradation. Because temperature change affects output precision of an oscillator and Doppler shift caused by UE movement, a UE may periodically track the frequency offset and apply corresponding adjustment and compensation.

Delay spread determines how dispersive a wireless multipath channel that a UE experiences is. The longer the delay spread, the more frequency selective the channel is. To generally maximize processing gains along the frequency domain in channel estimation based on received pilot signals, the UE may apply linear filtering with a length as long as possible if within the coherent bandwidth of the channel. Coherent bandwidth is inversely proportion to channel selectiveness. Thus, delay spread estimation plays an important role in forming channel estimation filter coefficients and length, hence affecting the performance of channel estimation and data demodulation.

Doppler spread is usually proportional to UE movement speeds and multi-path spatial distribution. Larger Doppler spread corresponds to a faster changing wireless multi-path fading channel. Channel estimation usually applies filtering in the time domain with longer filter length to suppress noise plus interference if within the channel coherent time constraint. Doppler spread estimation is thus another factor along the time domain affecting UE channel estimation performance.

The quasi co-location (QCL) types corresponding to each DL RS (more specifically, the port(s) or antenna port(s) of the DL RS) are given by the higher layer parameter qcl-Type in QCL-Info and may take one of the following values: 1)'QCL-TypeA': {Doppler shift, Doppler spread, average delay, delay spread}; 2) 'QCL-TypeB': {Doppler shift, Doppler spread}; 3) 'QCL-TypeC': {Doppler shift, average delay}; and 4) 'QCL-TypeD': {Spatial Rx parameter}. The QCL types may be configured/indicated in transmission configuration indication (TCI) states for a RS. The QCL assumptions are mainly used for DL RS, but can be generalized for UL RS if the association via pathloss RS and spatial relation are specified. The QCL assumption may be specified as: {RS1: QCL Type C to RS2}, {RS1: QCL Type C to RS2 and QCL Type D to RS3}. Then, RS1 (destination RS) derives the properties specified according to the QCL types from the associated (i.e., source) RSs (e.g., RS2). Note that the source RS may be a SSB. Note also that the source RS and destination RS may be on the same carrier or different carriers (i.e., cross-carrier QCL).

Figure 3A:
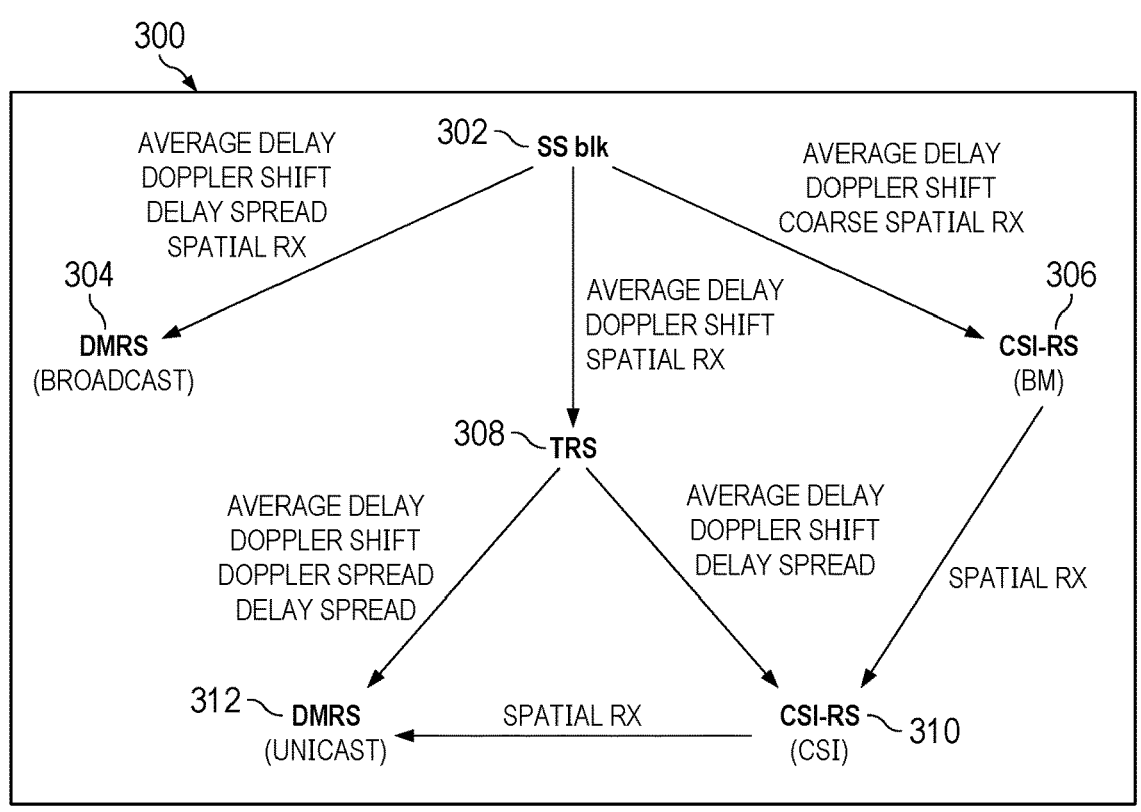
FIG. 3A is a diagram showing QCL assumptions among NR reference signals when wide beams are used for communications, according to some embodiments.

FIG. 3A is a diagram 300 showing QCL assumptions among NR reference signals when wide beams are used for communications. For example, a TRS, a SS block or a broadcast DMRS may be transmitted using a wide beam. FIG. 3A shows QCL configurations among a SS block 302, a DMRS 304, a CSI-RS 306, a TRS 308, a CSI-RS 310 and a DMRS 312. The DMRS 304 is for a broadcast channel. That is, the DMRS 304 is a DMRS used for demodulation of a system information block (SIB), radio resource control (RRC) signaling, paging, and etc. before a TRS is configured. The CSI-RS 306 is transmitted for beam forming. The CSI-RS 310 is transmitted for channel estimation. The DMRS 312 is used for demodulation of signals transmitted in a unicast channel. An arrow starting from a first reference signal (e.g., the SS block 302) and ending at a second reference signal (e.g., the DMRS 304) indicates that the second reference signal has a QCL relationship with the first reference signal with respect to one or more QCL parameters. The one or more QCL parameters (e.g., an average delay, a Doppler shift, a delay spread, and a spatial RX) are shown on the arrow, indicating that the one or more QCL parameters required by the second reference signal may be derived using the first reference signal.

As shown, the DMRS 304 is configured to have a QCL relationship with the SS block 302. The average delay, Doppler shift, delay spread, and spatial RX for the DMRS 304 may be derived based on the SS block 302. Similarly, the CSI-RS 306 and the TRS 308 has a QCL relationship with the SS block 302, respectively. An average delay, a Doppler shift, and a coarse spatial RX required by the CSI-RS 306 may be derived based on the SS block 302. An average delay, a Doppler shift, and a spatial RX required by the TRS 308 may be derived from the SS block 302. The CSI-RS 310 has a QCL relationship with the CSI-RS 306 and the TRS 308, respectively. The CSI-RS 310 may be received using a spatial RX derived based on the CSI-RS 306, and use an average delay, a Doppler shift, and a delay spread from the TRS 308. The DMRS 312 has a QCL relationship with the TRS 308 and the CSI-RS 310, respectively. The DMRS 312 may be received using a spatial RX derived based on the CSI-RS 310. The DMRS 312 may also be received an average delay, a Doppler shift, a Doppler spread and a delay spread derived based on the TRS 308.

Figure 3B:
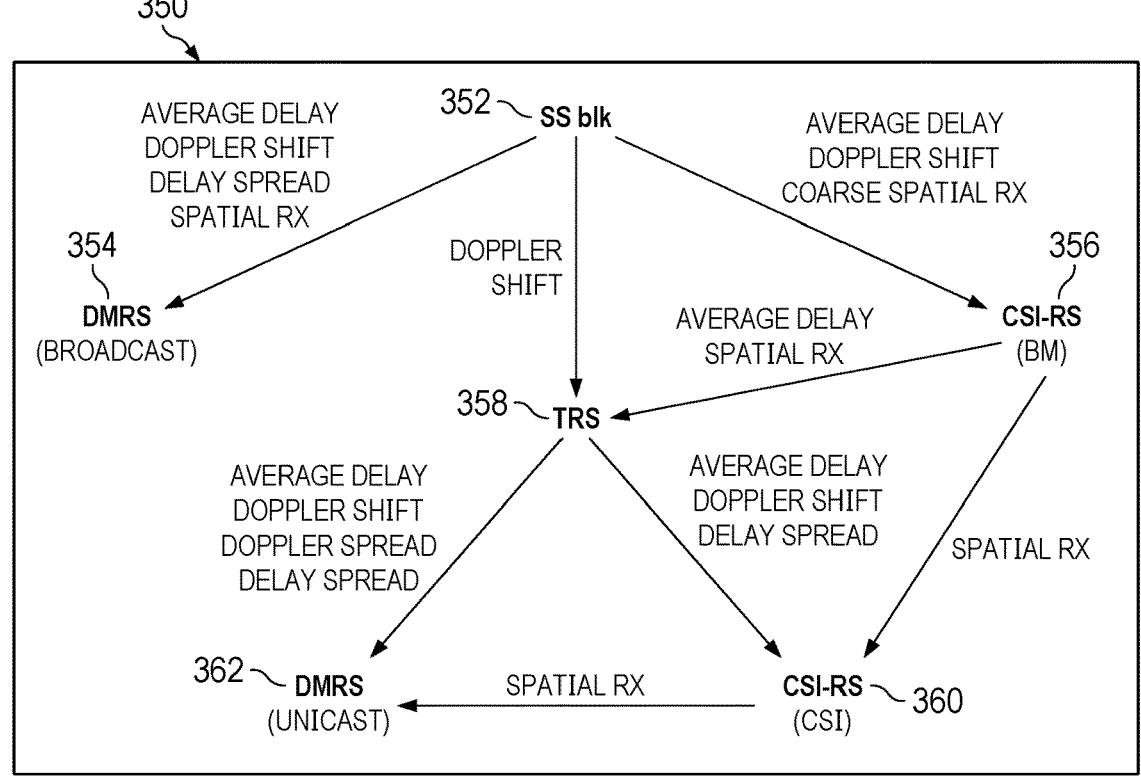
FIG. 3B is a diagram showing QCL assumptions among NR reference signals when narrow beams are used for communications, according to some embodiments.

FIG. 3B is a diagram 350 showing QCL assumptions among NR reference signals when narrow beams are used for communications. FIG. 3B shows QCL configurations among a SS block 352, a DMRS 354, a CSI-RS 356, a TRS 358, a CSI-RS 360 and a DMRS 362. Similar to FIG. 3A, the DMRS 354 is for demodulation of signals in a broadcast channel, e.g., a physical broadcast channel (PBCH), that is transmitted before a TRS is configured. The CSI-RS 356 is transmitted for beam forming. The CSI-RS 360 is transmitted for channel estimation. The DMRS 362 is used for demodulation of signals transmitted in a unicast channel. An arrow starting from a first reference signal and ending at a second reference signal indicates that the second reference signal has a QCL relationship with the first reference signal with respect to one or more QCL parameters. The one or more QCL parameters shown on the arrow indicate that the one or more QCL parameters required by the second reference signal may be derived using the first reference signal. FIG. 3B shows that the reference signals have QCL configurations similar to those illustrated in FIG. 3A, except for TRSs. In FIG. 3B, the TRS 358 has a QCL relationship with the SS block 352 and the CSI-RS 356, respectively. The TRS 358 may be received using a Doppler shift derived based on the SS block 352, and may be received using an average delay and a spatial RX derived based on the CSI-RS 356. Data transmission may employ multiple narrow beams, and multiple narrow TRS beams may be required for tracking. To support both of the scenarios, configuration of TRSs and their QCL assumptions or association should be flexible.

Sounding reference signals (SRSs) are reference signals transmitted by the user equipment (UE) in the uplink for the purpose of enabling uplink channel estimation over a certain bandwidth. As such, the network may be able to perform communication with the UEs based on the uplink channel estimation. Moreover, due to channel reciprocity between the uplink and the downlink present in a time division duplex (TDD) communication system, the network may utilize the SRSs to perform dynamic scheduling. That is, the network may exploit channel-dependent scheduling. In this case, the time-frequency resources are dynamically scheduled, taking into account the different traffic priorities and quality of services requirements. Typically, the UEs monitor several Physical Downlink Control Channels (PDCCHs) to acquire the scheduling decisions, which are signaled to the UEs by the network. Upon the detection of a valid PDCCH, the UE follows the scheduling decision and receives (or transmits) data.

The configuration of SRS related parameters of a SRS to be transmitted in the uplink (such as SRS transmission ports, SRS transmission bandwidth, SRS resources sets, transmission comb and cyclic shift, etc.) are semi-static in nature and may be provided through higher layer signaling, such as radio resource control signaling. Moreover, the association between the downlink reference signals, such as Channel State Information Reference Signals (CSI-RS) or demodulation reference signals (DMRS), and the uplink SRS should be conveyed to the UE to accurately reflect the interference situation and perform optimal beamforming. Thus, there is a need for apparatus and methods for signaling control information that accurately indicates a more dynamic configuration (not semi-static) of the aforementioned parameters, such as, for example, a portion of the transmission bandwidth required to transmit a subset of the SRS resource set (thereby implicitly indicating a transmission comb and cyclic shift) using a subset of the transmission ports associated with a particular set of downlink reference signals. The signaling of the control information may be closely tied to an actual data transmission. The transmission of the SRS may be periodic (i.e., periodic SRS, P-SRS or P SRS) as configured by Layer 3 RRC configuration signaling, semi-persistence (i.e., semi-persistent SRS, SP-SRS or SP SRS) activated/deactivated via Layer 2 MAC CE, or aperiodic (i.e., aperiodic SRS, A-SRS or AP-SRS or A SRS or AP SRS) indicated by Layer 1 DCI in PDCCH.

Network adaptation, or adaptive transmission, has been studied in 3GPP, such as cell on/off, fast SCell activation/deactivation, SCell layer-1 dormancy, etc., to achieve efficient network adaptation for various purposes, such as network/UE power saving, interference management, network/UE complexity reduction, and so on. It is widely observed that NR Rel-15 SCell activation latency is generally in the range of tens to hundreds of milliseconds, which is even longer than LTE for many cases. It is thus desirable to reduce the SCell activation latency. The large latency in activating an SCell is primarily dominated by the time gap associated with the SSB measurement timing configuration (SMTC), which configures the UE to monitor and process SSB once every typically tens of milliseconds. Based on SSB, the UE can gain necessary information to set its AGC, acquire timing, and perform frequency synchronization. In contrast, in LTE SCell activation, these operations are based on the always-on CRS (e.g., periodic CRSs with short intervals in between) and hence may be completed faster.

Figure 4:
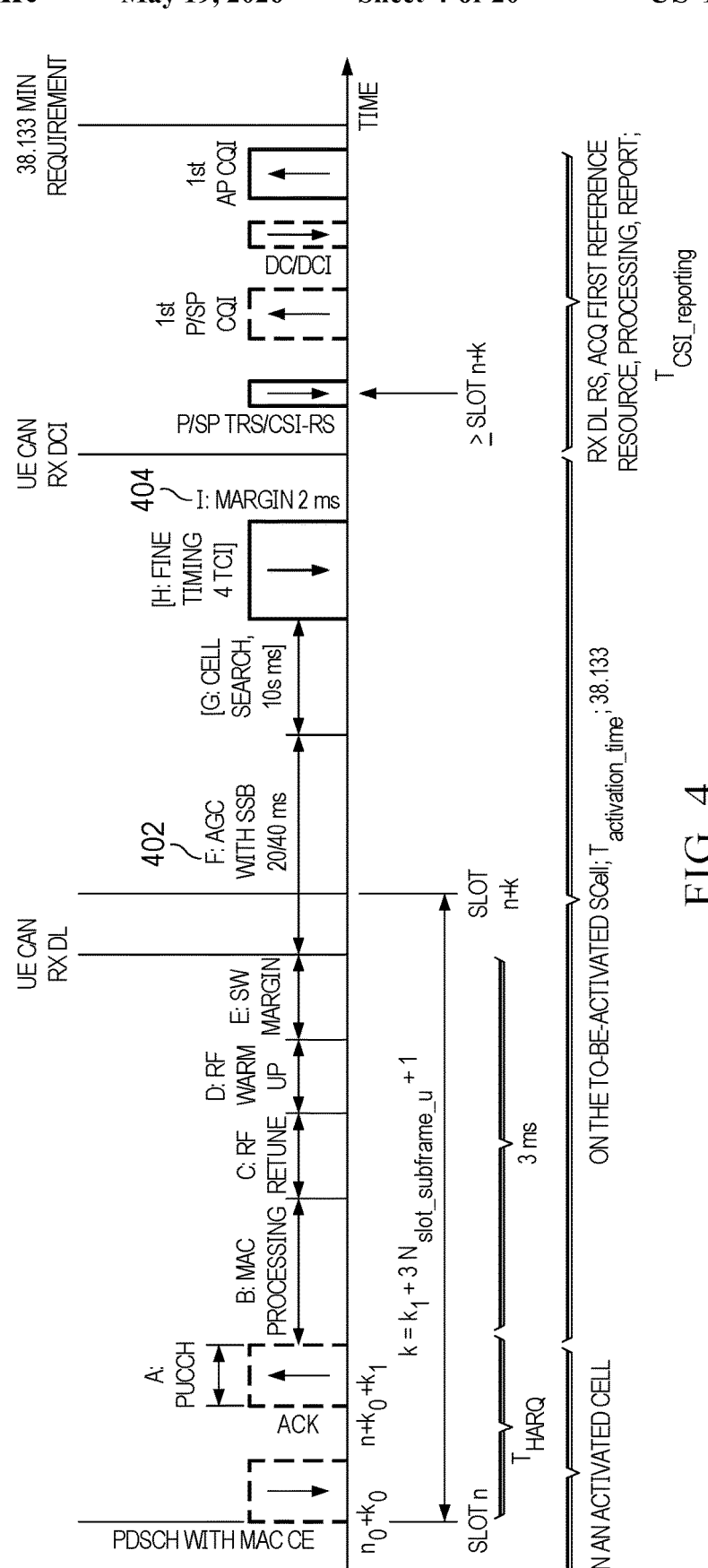
FIG. 4 shows the 5G NR Rel-15/16 SCell activation timeline example.

FIG. 4 shows an example of the current 5G NR Rel-15/16 SCell activation timeline. In FIG. 4, with reference to slots for PUCCH transmissions, when a UE receives in a PDSCH an activation command for a secondary cell ending in slot n, the UE applies the corresponding actions defined in TS 38.321 no later than the minimum requirement defined in TS 38.133 and no earlier than slot n+k, except for the following:

the actions related to CSI reporting on a serving cell that is active in slot n+k, the actions related to the sCellDeactivationTimer associated with the secondary cell that the UE applies in slot n+k the actions related to CSI reporting on a serving cell which is not active in slot n+k that the UE applies in the earliest slot after n+k in which the serving cell is active. The value of k is $$k_1 + 3 \cdot N_{slot}^{subframe,\mu} + 1$$

where $k_1$ is a number of slots for a PUCCH transmission with HARQ-ACK information for the PDSCH reception and is indicated by the PDSCH-to-HARQ_feedback timing indicator field in the DCI format scheduling the PDSCH reception as described in Clause 9.2.3 in TS38.213 and $$N_{slot}^{subframe,\mu}$$

is a number of slots per subframe for the SCS configuration $\mu$ of the PUCCH transmission.

With reference to slots for PUCCH transmissions, if a UE receives a deactivation command (see e.g., TS 38.321, which is hereby incorporated herein by reference in its entirety) for a secondary cell ending in slot n, the UE applies the corresponding actions in (see e.g., TS 38.321) no later than the minimum requirement defined in TS 38.133, which are hereby incorporated herein by reference in their entirety, except for the actions related to CSI reporting on an activated serving cell which the UE applies in slot n+k.

If the sCellDeactivationTimer associated with the secondary cell expires in slot n, the UE applies the corresponding actions in TS 38.321 no later than the minimum requirement defined in TS 38.133, except for the actions related to CSI reporting on an activated serving cell which the UE applies in the first slot that is after slot $$n + 3 \cdot N_{slot}^{subframe,\mu}$$

where $\mu$ is the SCS configuration for PDSCH reception on the secondary cell.

TABLE 1

| Number of OFDM symbols per slot, slots per frame, and slots per subframe for normal cyclic prefix | | | |
|---|---|---|---|
| $\mu$ | $N_{symb}^{slot}$ | $N_{slot}^{frame,\,\mu}$ | $N_{slot}^{subframe,\,\mu}$ |
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

On and after slot n+k, the following are performed:
1> SCell Activation/Deactivation MAC CE is received activating the SCell:
  2> if the SCell was deactivated prior to receiving this SCell Activation/Deactivation MAC CE; or
  2> if the SCell is configured with sCellState set to activated upon SCell configuration:
    3> if firstActiveDownlinkBWP-Id is not set to dormant BWP:
      4> activate the SCell according to the timing defined in TS 38.213 for MAC CE activation and according to the timing defined in TS 38.133 for direct SCell activation; i.e. apply normal SCell operation including:
        5> SRS transmissions on the SCell;
        5> CSI reporting for the SCell;
        5> PDCCH monitoring on the SCell;
        5> PDCCH monitoring for the SCell;
        5> PUCCH transmissions on the SCell, if configured.
    3> else (i.e. firstActiveDownlinkBWP-Id is set to dormant BWP):
      4> stop the bwp-InactivityTimer of this Serving Cell, if running.
    3> activate the DL BWP and UL BWP indicated by firstActiveDownlinkBWP-Id and firstActiveUplinkBWP-Id respectively.
  2> start or restart the sCellDeactivationTimer associated with the SCell according to the timing defined in TS 38.213 for MAC CE activation and according to the timing defined in TS 38.133 for direct SCell activation;
  2> if the active DL BWP is not the dormant BWP:
    3> (re-)initialize any suspended configured uplink grants of configured grant Type 1 associated with this SCell according to the stored configuration, if any, and to start in the symbol according to rules in clause 5.8.2.2 of TS38.321;

3> trigger PHR according to clause 5.4.6 of TS38.321.

FIG. 4 shows that the long latency SCell activation is partially due to: 1) SSB duty cycle is long, and one or more SSBs may be needed (e.g. time F (402)); 2) AP CSI reporting (and possibly the CSI measurement for that) can only be triggered after time I (404); 3) if SRS is needed, further delay may be expected. Note that the first P/SP CQI may be optional; the first AP CQI may be optional and may be same-/cross-carrier triggering/reporting.

To reduce the SCell activation latency, a key is to reduce or avoid the reliance on SSB for obtaining necessary information about these operations during the SCell activation procedure. How much reduction of latency can be achieved depends on the scenarios and mechanisms applied. The following aspects are under consideration. First, if no information at all about the SCell is known to the UE, the potential activation latency reduction depends on how to make the SCell known to the UE, such as providing SCell SSB related information. More generally, even if the SCell is known to the UE, still other functionalities are needed during the activation, such as AGC settling, time/frequency tracking, CSI measurement/acquisition, etc. For these purposes, generally transmission(s) of one or more RS during the activation procedure can be considered so that the UE/network can acquire the necessary information for activation. These RS may be called temporary RS. On the other hand, if a good amount of information about the SCell is already known by the UE but not yet fully utilized in Rel-15 mechanisms, the expected latency reduction via new standard support would then be more substantial. The information may be from past activation duration, such as timing, which slowly drifts away after deactivation but may still be used as a reference. The information may also be from another cell as described later. In either case, necessary information unavailable to a UE can be made available to the UE to shorten the activation latency, which can be based on network signaling of information to the UE or based on network signals (mainly reference signals, RS, which sometimes also include PSS/SSS) that are sent specifically for efficient activation purposes, which may be referred to as temporary RS (tempRS or temp RS), or X based temporary RS if the temporary RS is based on RS X, or temporary AP TRS or temporary TRS if the temporary RS is based on AP TRS, or AP TRS or TRS if the temporary RS consists only TRS, etc.

As seen above, different scenarios exist and different functionalities required. The scenarios include at least known SCell and unknown SCell, which implies that the activation procedure may or may not need SSB. In addition, for AGC settling, usually it needs TRS and/or CSI-RS. For time/frequency tracking, usually it needs TRS. And for CSI measurement/acquisition, usually it needs CSI-RS and CSI reporting, and/or SRS. However, to mandate all these RSs be transmitted and processed during the activation may not be realistic due to the high RS overhead and processing complexity. This means that under different circumstances, different RSs and different procedures may be adopted. Therefore, it is needed to provide a flexible framework for configuration and triggering temporary RS with reasonable overhead and complexity.

At least for the case of known cell, temporary RS is supported to expedite the activation process during the SCell activation procedure for efficient SCell activation for both frequency range 1 (FR1) and frequency range 2 (FR2). The temporary RS may provide at least the functionalities of AGC settling and time/frequency tracking during SCell activation procedure. TRS may also have potential functionalities of CSI measurement/acquisition and cell search.

TRS is selected as temporary RS for SCell activation. Other RS candidates, e.g. aperiodic CSI-RS, P/SP-CSI RS, SRS and RS based on SSS/PSS, may also be considered. The TRS should be triggered by DCI or MAC-CE. UEs measure the triggered temporary RS during SCell activation procedure no earlier than a slot m.

In addition to the TRS as a temporary RS, the following candidate RS may be considered.

Aperiodic CSI-RS for a Deactivated SCell

CSI acquisition is a necessary component of SCell activation, and hence in LTE and NR, it is always required that a valid CSI report is transmitted as part of the RAN4 SCell activation delay requirements. Reducing the CSI acquisition time can reduce the SCell activation delay. CSI acquisition may be done by DL CSI-RS (and CSI-IM resource; to be further discussed) and UE CSI reporting, or alternatively by UL SRS (to be further discussed). For DL based CSI acquisition, aperiodic CSI-RS and periodic/semi-persistent CSI-RS may be considered. However, periodic/semi-persistent CSI-RS can only be transmitted with predetermined periodicity and slot offset, which may not lead to activation delay reduction in general. On the other hand, aperiodic CSI-RS are more flexible and can be triggered right when the activation procedure starts. Therefore, aperiodic CSI-RS may be included as an optional temporary RS.

Aperiodic CSI-RS as temporary RS may not have to be triggered every time during an SCell activation. If a quick report of DL CSI is desirable by the network, then the network should be able to trigger an optional aperiodic CSI-RS, but otherwise the network can decide not to trigger it.

If one transmission of aperiodic CSI-RS is not enough, multiple aperiodic CSI-RS can be triggered (via one trigger if overhead reduction is considered). The total energy consumption associated with receiving the aperiodic CSI-RS is lower than periodic CSI-RS, and especially so if the deactivation duration is long and the periodicity is short. With a sufficient triggering offset guaranteed by MAC CE based CSI-RS triggering (with at least 3 ms timing offset and additional Ko slot offset), the UE does not have to be ready for receiving an aperiodic CSI-RS and generating an aperiodic CSI-RS report all the time. The triggering offset can allow enough time for the UE to respond to the aperiodic trigger.

Aperiodic CSI-IM and Aperiodic CSI

In order for the UE to generate a valid CSI report, CSI-IM resource is needed. Therefore, each aperiodic (AP) CSI-RS may also be configured with an AP CSI-IM resource(s), and the AP CSI-IM resource(s) is also transmitted when the AP CSI-RS is transmitted. Therefore, the AP CSI-IM resource(s) is also viewed as a part of a temporary RS or temporary RS resource. In this sense, the L1 AP CSI-RS trigger discussed in RAN1 so far may be better interpreted as an L1 AP CSI trigger. An AP CSI trigger triggers a combination of an AP CSI-RS(s) and an AP CSI-IM resource(s), and a CQI and/or L1 SINR is to be reported according to the CSI-RS/CSI-IM. The timing relation and configurations for the AP CSI trigger, the AP CSI-RS, the AP CSI-IM, and the AP CSI report are generally the same as the conventional ones.

SRS for a Deactivated SCell

It is known that SRS can be useful for providing DL full MIMO CSI in TDD systems, UL CSI in TDD/FDD, maintaining UL timing advance (TA), UL power control, and UL/DL beam. Therefore, SRS can be very important for a to-be-activated SCell to re-acquire CSI, TA, power control, and beam. In the case that the pathloss RS for the SRS is on an activated cell, the UE may be able to transmit the SRS on the to-be-activated SCell without waiting for the DL AGC to settle. In fact, an SCell may not be fully usable as a "fully activated" SCell until its UL is also ready, which can be achieved by SRS transmissions. In addition, utilizing SRS in activation can shift some of the processing from the UE to the network, thus reducing UE processing complexity. Regarding aperiodic SRS versus periodic SRS, similar to the CSI-RS analysis, aperiodic SRS is more suitable for SCell activation delay reduction. Hence, SRS may be also be considered as an optional temporary RS.

Aperiodic SRS as temporary RS may not have to be configured/triggered for every deactivated SCell. If UL CSI for FDD/TDD, or DL CSI for TDD, or UL TA, or UL power control, or UL beam management is required by the network, then the network should be able to configure/trigger an optional aperiodic SRS, but otherwise the network can decide not to configure/trigger it.

SSB

A to-be-activated SCell may be known to the UE or unknown to the UE.

If the to-be-activated SCell is known to the UE, there is no need for cell search/cell detection. In addition, the SSB and associated P/SP TRS as the QCL sources for a temporary RS can provide UE at least the functionalities such as coarse time/frequency tracking during activation, based on which the UE may be able to receive AP TRS and further improve AGC and time/frequency tracking. The existing QCL types between the SSB and other RSs can be reused and no further enhancement of QCL types is necessary. For example, AP TRS can be QCLed to P TRS which can be further QCLed to the SSB with Type C (and optionally Type D), a NZP CSI-RS can be QCLed to the SSB with Type A (and optionally Type D), AP TRS can be the QCL source for other RS(s) (including P/SP TRS) following the AP TRS if any during and after activation procedure, and so on. The embodiments with SP TRS in the disclosure may be interpreted as "if SP TRS is also supported".

If the to-be-activated SCell is not known to the UE, however, then the SSB may be triggered and transmitted as a temporary RS for cell search/cell detection. According to RAN4 reply, in some cases, the cell detection is not needed, but for other cases when the cell detection is needed, SSB can be used as in legacy procedures, and aperiodic SSB which is transmitted on demand can reduce the latency compared with periodic SSB. Thus, aperiodic SSB should be considered as temporary RS for unknown cells.

For the aperiodic triggering of SSB, due to the potential timing uncertainty, the precise timing of the RS based SSS/PSS may not be known to the UE. Hence, a search time window for the RS based on SSS/PSS may be configured or signaled to the UE for the case of activation of an unknown SCell.

Cross-Carrier RS for Cases Relying on an Activated Intra-Band Cell, e.g., Case 2 and Case 3

An AP TRS may rely on a cross-carrier signal such as if the to-be-activated SCell is unknown, the AP TRS may be seen as QCLed with a cross-carrier SSB or a cross-carrier P/SP TRS. The cross-carrier SSB or P/SP TRS should be on an activated carrier which is generally an intra-band carrier (or even stronger, intra-band contiguous/adjacent carrier), and should be configured/received for the UE before the activation process starts.

Proper network assistance information to the UE and/or UE assumptions on the common properties for multiple serving cells can lead to highly efficient SCell activation and should be considered for standardization. Based on network configuration and standard specification, the UE can assume some common properties across multiple serving cells, and thus a good amount of information about a to-be-activated SCell can already be derived by the UE but not yet fully utilized in Rel-15 mechanisms. One reason for multiple serving cells sharing some common properties in practice is that the cells may be co-located and are associated with the same hardware, such as the same set of antennas, same RF components, etc. This is especially so if the carriers of the cells are in the same band (e.g., intra-band CA) or in bands close to each other. 3GPP has already defined several types of quasi co-located (QCL) relationship between antenna ports of different signals so that a property derived from one signal can be extended to another signal. This concept can be utilized and generalized to effectively reduce SCell activation latency in applicable scenarios.

Two quasi co-located serving cells may share one or more of the following properties, and each property may be exploited by the UE to gain side information about the to-be-activated SCell to reduce the latency.

Pathloss, Coupling Loss, or RSRP

If the carriers of two cells are close in frequency domain such as in intra-band CA (contiguous or even non-contiguous), the pathloss values and shadow fading values, respectively, are essentially the same for the two cells. Moreover, if the same set of antennas are used, the antenna gains, and hence the coupling loss values and RSRP values, respectively, are also very close for the two cells. For cells whose carriers are not so close but not too far to be highly uncorrelated, the difference between the pathloss values may be a predictable value which may be derived by UE and/or gNB.

The side information of pathloss, coupling loss, or RSRP for the to-be-activated SCell can be useful to set the (initial) AGC, which can help speed up the activation. Further embodiments are provided below.

Frequency/Timing Offset

Likewise, frequency/timing information about the to-be-activated SCell may be inferred from another cell. Even if such information is not sufficient for fine tracking, it can still be useful for reducing the latency involved in achieving frequency/time tracking. For example, if the symbol boundaries for two cells are roughly aligned such as within a CP length (or with a fixed offset), the UE may be able to set its FFT window for one based on the other, and further refinement based on temporary RS can be done.

Note that SCell without SSB already utilizes this mechanism, as specified in TS 38.213: "For a serving cell without transmission of SS/PBCH blocks, a UE acquires time and frequency synchronization with the serving cell based on receptions of SS/PBCH blocks on the PCell, or on the PS Cell, of the cell group for the serving cell."

However, the UE cannot assume any common properties across serving cells without network assistance or standardized UE behavior, including UE capability reporting, further embodiments are to be provided. This embodiment technique may specify network signaling to the UE about the side information and the UE assumptions with the side information. There are some approaches (not mutually exclusive) to support this.

Configure Cross-Carrier QCL Properties

A RS sent by a cell may be configured to QCL with another RS sent by another cell. For example, the TRS on a deactivated SCell may be QCLed to the SSB on an activated serving cell, where the activated serving cell may be on a carrier that is intra-band and contiguous (adjacent) with the to-be-activated SCell for FR1, or intra-band with the to-be-activated SCell for FR2.

Introduce New QCL Types for Pathloss, RSRP, and Frequency/Time Synchronization Across Carriers The existing QCL types can be generalized to define that new properties as listed above may be assumed by the UE if signaled by the network. The QCL relationship may be signaled based on reference to cell index, SSB, or RS. For example cell 1's SSB may be configured as QCL with cell 2's SSB. Since such a relationship is reciprocal between cell 1 and cell 2, it is not necessary to configure the reverse direction and it can be assumed by the UE. If no additional signaling is to be adopted, then the relationship may be specified in standards for intra-band and contiguous carriers for FR1 and intra-band carriers for FR2.

Introduce Cell Sets Sharing Common Properties

More generally, the above described common properties are shared among multiple cells, such as intra-band adjacent cells (for FR1, for example), intra-band cells (for FR2), or cells in adjacent bands if they share the same PA/RF. Therefore, it may be useful to introduce cell sets with common properties. This may be done resembling TAGs, that is, the cells are configured into multiple TAGs, and the cells within the same TAG share the same TA.

Introducing Offset Values

Even if some properties are not the same between two cells, there may be a fixed offset (or an offset with an upper bound) between them and known to the network or can be derived by the UE. The network can signal the offset value to the UE. For example, if the symbol boundary of cell 1 is x ms ahead of that of cell 2, the x value can be signaled to the UE and the UE can apply it for acquiring rough timing. For another example, if the pathloss for cell 1 is y dB higher than that for cell 2, the y value can be signaled to the UE for estimating its initial AGC setting. Alternatively, the UE may derive the offset value, e.g., based on the separation of the cells.

Thus, efficient SCell activation may be supported via enhanced UE assumptions to reduce latency associated with estimating pathloss, coupling loss, RSRP, frequency/timing offset, and/or initial UL TA on a to-be activated SCell. Examples include at least the following:

Utilizing cross-carrier QCL assumptions (e.g., a to-be-activated SCell relies on an activated QCLed cell for initial pathloss/RSRP estimate), Utilizing configured cell sets with common properties (e.g., cells within a band or bands close to each other in frequency are configured in a cell set with similar pathloss/timing), Utilizing specified cross-carrier offset values (e.g., network specifies the pathloss/timing offsets between two cells or between two cell sets).

Nevertheless, there are always some cases where the UE cannot derive all necessary information from available UE assumptions. Then, temporary RS may be reused to support efficient SCell activation by providing UE with information that cannot be derived based on available UE assumptions.

A certain number of bursts of temporary RS may be required for different cases. For example:

SCell to be activated is known and belongs to FRA

If SCell measurement cycle is equal to or smaller than 160 ms, temporary RS can be used for time/frequency tracking.

1 burst (2-slot with four CS-RS resources) is required based on RAN working assumptions on temporary RS design provided in the LS R1-2009798 (3GPP TSG RAN WG1 Meeting #103-e E-meeting, Oct. 26-Nov. 13, 2020), incorporated by reference herein in its entirety and partly reproduced below.

As working assumption, with respect to efficient SCell activation, reuse existing Rel-15/16 TRS structure for temporary RS FFS: how many burst/symbols are required for both AGC settling and Time/Frequency tracking for different cases, e.g. FR1 and FR2, known and unknown SCell A burst of temporary RS is notated as in S5.1.6.1.1 of TS 38.214

"2-slot with four CSI-RSs resources (4 samples)" for FR1.

either "1-slot with two CSI-RSs resources (2 samples)" or "2-slot with four CSI-RSs resources (4 samples)" for FR2

The working assumption can be confirmed after RAN4 check. (A LS for such request is planned).

Working Assumption:

At least for the case of known cell, temporary RS is supported to expedite the activation process during the SCell activation procedure for efficient SCell activation for both FR1 and FR2:

The temporary RS should provide at least the functionalities of AGC settling and time/frequency tracking during SCell activation procedure.

FFS potential functionalities of CSI measurement/acquisition and cell search

If SCell measurement cycle is larger than 160 ms, temporary RS can be used for AGC.

1 burst (2-slot with four CSI-RS resources) may be required.

temporary RS can be used for time/frequency tracking.

1 separate burst (2-slot with four CSI-RS resources) may be required in addition to the one burst required for AGC.

The agreements above may apply based on RAN1 working assumptions on temporary RS design provided in the LS R1-2009798.

Minimum gap between the RS symbol(s) for AGC and the RS symbols for time/frequency acquisition is needed to account for UE AGC application time delay. The minimum gap length may be:

Option 1: 2 slots,

Option 2: 2 ms.

SCell is unknown and belongs to FR1.

When SCell is contiguous to an active serving cell in the same band (Intra-band continuous CA), UE can perform AGC adjustment based on temporary RS.

One temporary RS burst with only "2-slot with four CSI-RSs resources (4 samples)" may be required when the power difference in serving cell and to be activated SCell is smaller than or equal to 6 dB.

No cell detection provided the conditions specified for intra-band contiguous CA case in TS38.133 section 8.3.2 are satisfied.

UE can perform time-frequency tracking based on temporary RS.

One temporary RS burst with only "2-slot with four CSI-RSs resources (4 samples)" may be required.

The agreements above apply based on RAN1 working assumptions on temporary RS design provided in the LS R1-2009798.

SCell to be activated belongs to FR2.

If there is at least one active serving cell on that FR2 band and temporary RS for the target SCell is provided, no matter whether the SCell to be activated is known or unknow, Temporary RS can be used for time/frequency tracking.

1 burst with only "2-slot with four CSI-RSs resources (4 samples)" may be required.

If there is no active serving cell on that FR2 band, and the SCell to be activated is known to UE, temporary RS can be used for fine timing tracking.

1 burst with only "2-slot with four CSI-RSs resources (4 samples)" may be required.

If the SCell being activated is unknown and there is no active serving cell on that FR2 band, temporary RS cannot be used for AGC.

No conclusion on whether to consider the case for temporary RS based time/frequency tracking to enhance SCell activation latency.

The following Table 2 provides a summary on the needed number of TRS bursts for several cases.

TABLE 2

Summary of RAN4 requirements on the number of 2-slot TRS bursts

| Cases for the number of TRS bursts needed | | | AGC | Cell detection | Time-frequency tracking | Fine timing tracking |
|---|---|---|---|---|---|---|
| Known cell | FR1 | Meas cycles ≤ 160 ms | 0 | 0 | 1 | N/A |
| | | Meas cycles > 160 ms | 1 | 0 | 1 | N/A |
| | FR2 | w/activated intra-band cell | 0 | 0 | 1 | TBD |
| | | w/o activated intra-band cell | 0 | 0 | 0 | 1 |
| Unknown cell | FR1 | w/activated intra-band contiguous cell, $\Delta$TxP ≤ 6 dB, $\hat{E}s/Iot$ ≥ −2 dB | 1 | 0 | 1 | N/A |
| | | w/activated intra-band contiguous cell, $\Delta$TxP ≤ 6 dB, $\hat{E}s/Iot$ < −2 dB | 1 | Needed | 1 | N/A |
| | FR2 | w/activated intra-band cell | 0 | Needed | 1 | TBD |

The cases with complete RAN4 inputs are summarized in Table 3 below, which may be the priority for RAN1 design.

TABLE 3

Summary of all cases with complete RAN4 inputs (the values are the numbers of 2-slot TRS bursts)

| | | AGC | Cell detection | Time-frequency tracking | Fine timing tracking |
|---|---|---|---|---|---|
| Case 1a | FR1 known SCell, meas cycle ≤ 160 ms | 0 | 0 | 1 | N/A |
| Case 1b | FR1 known SCell, meas cycle > 160 ms | 1 | 0 | 1 | N/A |
| Case 2a | FR1 unknown SCell with an activated intra-band contiguous cell, $\Delta$TxP ≤ 6 dB, $\hat{E}s/Iot$ ≥ −2dB | 1 | 0 | 1 | N/A |

TABLE 3-continued

Summary of all cases with complete RAN4 inputs (the values are the numbers of 2-slot TRS bursts)

| | | AGC | Cell detection | Time-frequency tracking | Fine timing tracking |
|---|---|---|---|---|---|
| Case 2b | FR1 unknown SCell with an activated intra-band contiguous cell, $\Delta$TxP ≤ 6 dB, $\hat{E}s/Iot$ < −2 dB | 1 | Needed | 1 | N/A |
| Case 3 | FR2 known SCell with an activated intra-band cell | 0 | 0 | 0 | 1 |

Proposal 1: Prioritize the following cases with complete RAN4 inputs:

Case 1: FR1 known SCell

Case 1a: meas cycle≤160 ms

Case 1b: meas cycle>160 ms

Case 2: FR1 unknown SCell with an activated intra-band contiguous cell, $\Delta$TxP≤6 dB Case 2a: $\hat{E}s/Iot$≥−2 dB Case 2b: $\hat{E}s/Iot$<−2 dB Case 3: FR2 known SCell with an activated intra-band cell Embodiment triggering configuration, triggering command, and triggering procedure are discussed herein. The current activation procedure uses L2 signaling. With various enhancements proposed in Rel-17 that may significantly shorten the latency, it may be meaningful to further reduce the delay due to the L2 signaling. L1 signaling may be used for its low latency. Note that the L1 activation does not necessarily mean a newly designed L1 signaling or L1 procedure; rather, existing L1 signaling may be reused just as the reuse of existing aperiodic RS. Once the UE receives the L1 signaling associated with a deactivated SCell, the L2 activation procedure may start. Therefore, if the activation procedure involves aperiodic CSI-RS resource trigger and/or aperiodic CSI reporting trigger, the network and UE can then use one or more of these triggers associated with a deactivated SCell as the activation command for the SCell. This approach not only reduces the delay due to L2 signaling and possibly multiple signaling to complete one activation, but also limits the control channel overhead. The potential issue of this approach is the reliability of the DCI, which does not have ACK/NACK/HARQ while MAC command does. Thus, if the DCI is missed or incorrectly decoded, the network and UE may be temporarily out of sync until the network and/or the UE finds the problem and corrects it. Nevertheless, the probability of such error occurring is small (<1% in general), and the DCI based approach may still be beneficial to most of the scenarios.

Note that in this case, there may not be a need to transmit the MAC signaling for activation. For embodiments using MAC signaling, the MAC signaling is also accompanied with an L1 signaling, which makes the MAC signaling unnecessary.

According to an example embodiment, efficient SCell activation is supported via existing L1 AP RS (e.g., TRS/CSI-RS/SRS based temporary RS if agreed) triggers with enhanced activation procedure, and SCell activation procedure may be initiated when UE receives a temporary RS trigger associated with the SCell.

Embodiments for SCell activation triggering (i.e., activation command) configuration and temporary RS configuration are provided. For a configured SCell, a TRS is configured, and optionally an AP CSI-RS is configured, and optionally an AP SRS is configured. These RSs may be useful during the SCell activation procedure. At least the TRS may be always transmitted during the SCell activation, for all the possible ways that the SCell activation is triggered: via a MAC signaling, via an AP TRS L1 trigger for the TRS, via an AP CSI-RS L1 trigger for the CSI-RS which is associated with the SCell and hence the TRS, or via an AP SRS L1 trigger for the SRS which is associated with the SCell and hence the TRS. Therefore, there are the following components and possible ways:

Mandatory components for SCell activation may be the following:

MAC activation command to activate the SCell is always supported (but not necessarily sent);

an AP TRS is always configured with the SCell, so it is always transmitted during the SCell activation.

Optional components for SCell activation may be the following:

AP TRS trigger (sent on another cell) to trigger the AP TRS. When received, the SCell activation starts without MAC activation command;

An AP CSI-RS may be configured with the SCell, so if the SCell activation starts, the AP CSI-RS is also sent;

AP CSI-RS trigger (sent on another cell) to trigger the AP CSI-RS. When received, the SCell activation starts without MAC activation command;

an AP SRS may be configured with the SCell, so if the SCell activation starts, the AP SRS is also sent;

AP SRS trigger (sent on another cell) to trigger the AP SRS. When received, the SCell activation starts without MAC activation command.

FIG. 5 illustrates a diagram 599 of support for SCell activation. As shown in FIG. 5, mandatory components for SCell activation may include:

MAC activation command to activate the SCell is always supported (but not necessarily sent), and an AP TRS is always configured with the SCell, so it is always transmitted during the SCell activation.

Optional components for SCell activation may include:

AP TRS trigger (sent on another cell) to trigger the AP TRS. When received, the SCell activation starts without MAC activation command;

an AP CSI-RS may be configured with the SCell, so if the SCell activation starts, the AP CSI-RS is also sent;

AP CSI-RS trigger (sent on another cell) to trigger the AP CSI-RS. When received, the SCell activation starts without MAC activation command;

an AP SRS may be configured with the SCell, so if the SCell activation starts, the AP SRS is also sent; and AP SRS trigger (sent on another cell) to trigger the AP SRS. When received, the SCell activation starts without MAC activation command.

FIG. 6 illustrates a flow diagram 600 of an embodiment configuration process, according to some embodiments. At operation 602, the TRS is configured for the SCell activation. At operation 604, the AP CSI-RS is configured configured for the SCell activation. At operation 606, the AP SRS is configured configured for the SCell activation. At operation 608, the UE may perform the SCell activation based on at least the configured TRS, and optionally based on at least one of the configured AP CSI-RS or the configured AP SRS. So, configuration operations 604 and 606 may be optional. Further, configuring here may be transmitting high layer signaling (e.g., RRC signaling) to the UE to configure the TRS, AP CSI-RS, or AP ARS.

Embodiments for SCell activation triggering and activation procedures are provided. In one embodiment, during SCell activation, an a-periodic (AP) TRS is transmitted. The SCell activation may be initiated by a MAC command (L2 signaling), during which an AP TRS is transmitted. The SCell activation may be initiated by a DCI (L1 signaling), during which an AP TRS is transmitted. An AP TRS trigger may not be needed. Since the SCell activation is linked to an AP TRS, the AP TRS may be configured for the SCell for its activation. The AP TRS may be independent of the SCell BWP configuration, that is, regardless which BWP the SCell would be activated into, the same AP TRS is transmitted, which could simplify the activation design. Alternatively, the AP TRS may be specific for an SCell BWP, and the triggering of the AP TRS leads to the activation of the associated BWP. If no explicit signaling of AP TRS or BWP may be expected, then a default BWP and its associated default AP TRS may be sent. Four embodiments are shown below.

Figure 7:
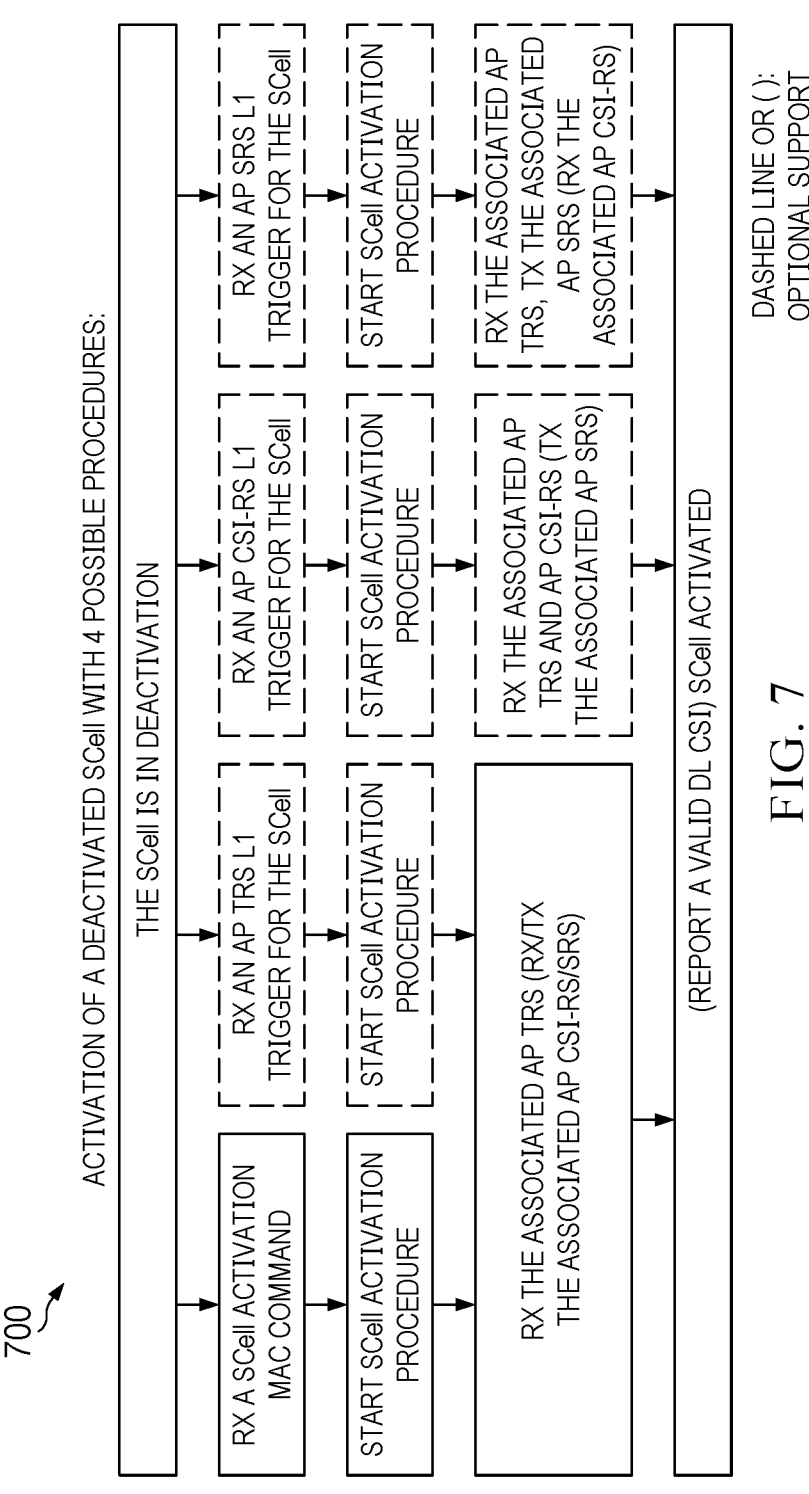
FIG. 7 illustrates a diagram for a first example for SCell activation triggering and activation according to example embodiments presented herein.

FIG. 7 illustrates a diagram 700 for a first example embodiment for SCell activation triggering and activation. As shown in FIG. 7, the gNB sends MAC activation command for a deactivated SCell, which is configured with a default AP TRS plus optionally a default AP CSI-RS and/or AP SRS. This initiates the SCell activation process. The MAC activation command may use existing design, in which no information of the TRS/CSI-RS/SRS is provided, but the associated default TRS/CSI-RS/SRS as configured by RRC signaling are automatically triggered. There may be more than one AP TRS (or CSI-RS/SRS) configured for the SCell or SCell activation process, but one is configured as the default. The default may be explicitly configured, or implicitly through a BWP configuration, e.g., several AP TRSs are associated with the several BWPs, respectively, for the SCell, and one BWP is signaled as the default for this activation, then the default AP TRS associated with the default BWP is triggered. This reduces MAC/DCI signaling overhead and avoids a new design for the MAC activation command. Alternatively, the MAC activation command may be using an enhanced design, such as further including one or more fields to trigger one or more of TRS/CSI-RS/SRS or one of the BWPs. This requires more MAC overhead, but it provides more flexibility for the network. For example, if two or more TRSs are associated with the SCell, the MAC command can activate/select one of them (e.g., one TRS is linked to a BWP, and by selecting a TRS or selecting a BWP, the linked BWP/TRS are also activated/selected) or more of them. Then, after the AP TRS, according to the network configuration/activation, the associated RSs (CSI-RS/SRS) are also transmitted/received/processed. The CSI-RS, SRS, and TRS are associated with the same BWP, and one is QCLed to another. For example, the CSI-RS may be QCLed to the TRS with QCL Type A, and SRS uses the TRS and/or CSI-RS for its pathloss RS. Then, a valid DL CSI is reported from the UE to the gNB, which generally includes at least a valid CQI value. Some embodiments on this aspect will be further discussed later. After that, the SCell activation is completed and the SCell is activated.

FIG. 7 also shows that the gNB sends an L1 AP TRS trigger associated with a deactivated SCell. Without receiving an L2 command, the UE still understands that this initiates an SCell activation process. The AP TRS associated with the trigger may or may not be the default AP TRS, which provides the network more flexibility to select which AP TRS to transmit or which BWP to activate. For example, the default TRS (TRS1) may be associated with the default BWP1, but the L1 AP TRS trigger is for TRS2 and BWP2, then the UE understands that this SCell activation is to make BWP2 active. Then, after the AP TRS, according to the network configuration/activation, the associated RSs (CSI-RS/SRS) are also transmitted/received/processed. The CSI-RS, SRS, and TRS are associated with the same BWP, and one is QCLed to another. For example, the CSI-RS may be QCLed to the TRS with QCL Type A, and SRS uses the TRS and/or CSI-RS for its pathloss RS. Then, a valid DL CSI is reported from the UE to the gNB, which generally includes at least a valid CQI value. Some embodiments on this aspect will be further discussed below in this disclosure. After that, the SCell activation is completed and the SCell is activated.

FIG. 7 also shows that the gNB sends an L1 AP CSI-RS trigger associated with a deactivated SCell. Without receiving an L2 command, the UE still understands that this initiates an SCell activation process. The AP CSI-RS associated with the trigger may or may not be the default AP CSI-RS. It is associated with a certain default TRS and optionally a default SRS and BWP, which provides the network more flexibility to select which AP CSI-RS/TRS/SRS to transmit or which BWP to activate. For example, the default TRS (TRS1) may be associated with the default BWP1 and default CSI-RS1, but the L1 AP CSI-RS trigger is for CSI-RS2, which is linked to BWP2 and TRS2, then the UE understands that this SCell activation is to make BWP2 active and TRS2/CSI-RS2 are to be expected. Then, after the AP TRS2, the AP CSI-RS2 is sent and received. Optionally an AP SRS is transmitted according to configuration/activation, and optionally a valid DL CSI is reported from the UE to the gNB, which generally includes at least a valid CQI value. The CSI-RS, SRS, and TRS are associated with the same BWP, and one is QCLed to another. For example, the CSI-RS may be QCLed to the TRS with QCL Type A, and SRS uses the TRS and/or CSI-RS for its pathloss RS. Some embodiments on this aspect will be further discussed below in this disclosure. After that, the SCell activation is completed and the SCell is activated.

FIG. 7 also shows the gNB sends an L1 AP SRS trigger associated with a deactivated SCell. Without receiving an L2 command, the UE still understands that this initiates an SCell activation process. The AP SRS associated with the trigger may or may not be the default AP SRS. It is associated with a certain default TRS and optionally a default CSI-RS and BWP, which provides the network more flexibility to select which AP CSI-RS/TRS/SRS to transmit or which BWP to activate. For example, the default TRS (TRS1) may be associated with the default BWP1 and default SRS1, but the L1 AP SRS trigger is for SRS2, which is linked to BWP2 and TRS2, then the UE understands that this SCell activation is to make BWP2 active and TRS2 is to be expected and SRS2 is to be sent. Then, after the AP TRS2, the AP SRS2 is sent. Optionally an AP CSI-RS is transmitted according to configuration/activation, and optionally a valid DL CSI is reported from the UE to the gNB, which generally includes at least a valid CQI value. Some embodiments on this aspect will be further discussed below in this disclosure. After that, the SCell activation is completed and the SCell is activated.

FIG. 8 illustrates a diagram 800 for a second example embodiment for SCell activation triggering and activation. As shown in FIG. 8, at operation 802, the gNB sends MAC activation command for a deactivated SCell at slot n. The MAC CE may be carried in a PDSCH sent on an activated serving cell. At operation 804, the UE needs to send ACK/NACK for the PDSCH with the MAC CE. If the PDSCH with the MAC CE is successfully decoded, an ACK may be sent, and this initiates the SCell activation process; otherwise a NACK may be sent, and the gNB may have to transmit another PDSCH with the MAC CE, and the SCell activation process may start in the slot that an ACK is sent. From the reception of the PDSCH with the MAC CE to the ACK, it may take t slots. In some cases, t=3 (i.e., the time needed for the UE to decode MAC signaling). The value t may also be other UE capability related values, which may be reported by the UE to the network before the UE sends the ACK. The value t may also include other latency that the UE needs to process the MAC CE and act in L1. In any case, the network and UE need to have a common reference timing for the rest of the signals to be transmitted/received without other signaling, and one embodiment for the common reference timing is the slot of ACK, and another embodiment for the common reference timing is the slot after the ACK so that the UE L1 is ready. Then, at operation 806, the gNB may transmit an AP TRS to the UE at slot n+t+k_trs, where k_trs is the triggering offset associated with UE receiving an AP TRS in terms of number of slots. This could be related to UE capability, and after the UE reports the capability, the gNB configures AP TRS triggering offset. This allows the UE to have sufficient time to prepare for receiving the AP TRS. The AP TRS is configured for the SCell activation beforehand. No triggering for the TRS is needed, which reduces signaling overhead and latency. In case that multiple AP TRSs are configured for the SCell activation, one of them is configured as the default, and the default AP TRS is sent while other AP TRSs will not be sent; some embodiments are described before. The MAC CE may also be enhanced to include a trigger for one of the AP TRSs to be selected. Based on the received AP TRS, the UE can perform AGC settling, time/frequency tracking, etc. The AP TRS may be repeated within one slot or across different slots. At least one of a default AP CSI-RS and a default AP SRS should be configured for the SCell activation. Then, if the SCell's activation process is also configured with a default AP CSI-RS with triggering offset k_csi-rs, at operation 808, an AP CSI-RS may also be transmitted to the UE in slot n+t+k_csi-rs. The default AP CSI-RS may be identified based on that it is the default AP CSI-RS for the BWP associated with the triggered AP TRS. No triggering for the CSI-RS is needed, which reduces signaling overhead and latency. The CSI-RS may be received after the TRS so that the AGC/tracking achieved from the TRS can be applied to the CSI-RS reception and processing, so in general the network should ensure k_csi-rs>k_trs. An alternative is that the AP CSI-RS is sent in slot n+t+k_trs+k_csi-rs, which ensures that the CSI-RS is later than the TRS. If the TRS is transmitted in multiple slots, the AP CSI-RS may be sent in slot n+t+k_trs+k+k_csi-rs, where k is a number of slots with AP TRS transmissions and k is specified in a RRC configuration or standard, such as k=2, 4, etc., which ensures that the CSI-RS is based on sufficient time-domain samples of the TRS. Based on the CSI-RS, the UE may generate AP CSI report, which should include at least a valid CQI. Then, at operation 810, the UE may send the report the gNB. The slot that the report with the valid CQI is sent can be viewed as the time that the SCell activation is completed (i.e., the SCell is activated at operation 812). Note that if a default AP SRS is also configured/identified for the SCell activation process, the UE should send an AP SRS, which may be after the TRS, before or after the CSI-RS. No triggering for the SRS is needed, which reduces signaling overhead and latency. An embodiment of the AP SRS transmission will be described further. In addition, an AP TRS is generally not a standalone RS (i.e., it relies on a P/SP TRS), and the AP and P/SP TRS are QCLed with each other, in particular the AP TRS should be dependent on the P/SP TRS. However, in some cases, for the deactivated SCell, the AP TRS could not depend on a P/SP TRS on the SCell. There are a few embodiments here. One embodiment is that the AP TRS relies on a cross-carrier signal, such as the AP TRS is QCLed with a cross-carrier SSB or a cross-carrier P/SP TRS with QCL Type A and QCL Type D (for FR2). The cross-carrier SSB or P/SP TRS should be on an activated carrier which is generally an intra-band carrier, and should be configured/received for the UE before the activation process starts. In another embodiment, in case of the cross-carrier SSB or P/SP TRS not configured or not transmitted as that carrier is also deactivated, the AP TRS may be repeated in consecutive slots after n+t+k_trs so that the UE can derive sufficient tracking information from the AP TRS. The AP TRS is still QCLed with a P/SP TRS, and that P/SP TRS automatically starts at operation 814, after the SCell activation is completed if the P/SP TRS is configured with the AP TRS.

FIG. 9 illustrates a diagram 900 for a third example embodiment for SCell activation triggering and activation. As shown in FIG. 9, at operation 902, the gNB sends MAC activation command for a deactivated SCell at slot n. At operation 904, the MAC CE is carried in a PDSCH sent on an activated serving cell. The UE needs to send ACK/NACK for the PDSCH with the MAC CE. If the PDSCH with the MAC CE is successfully decoded, an ACK may be sent, and this initiates the SCell activation process; otherwise a NACK may be sent, and the gNB may have to transmit another PDSCH with the MAC CE, and the SCell activation process may start in the slot that an ACK is sent. From the reception of the PDSCH with the MAC CE to the ACK, it may take t slots. The value t may also include other latency that the UE needs to process the MAC CE and take action in L1. Then, at operation 906, the gNB may transmit an AP TRS to the UE at slot n+t+k_trs, where k_trs is the triggering offset associated with UE receiving an AP TRS in terms of number of slots. The AP TRS is configured for the SCell activation beforehand. No triggering for the TRS is needed, which reduces signaling overhead and latency. In case that multiple AP TRSs are configured for the SCell activation, one of them is configured as the default, and the default AP TRS is sent while other AP TRSs will not be sent; some embodiments are described before. The MAC CE may also be enhanced to include a trigger for one of the AP TRSs to be selected. The AP TRS may be repeated within one slot or across different slots. Then, if the SCell's activation process is also configured with a default AP SRS with triggering offset k_srs, at operation 908, an AP SRS may also be transmitted by the UE in slot n+t+k_srs. The default AP SRS may be identified based on that it is the default AP SRS for the BWP associated with the triggered AP TRS. No triggering for the SRS is needed, which reduces signaling overhead and latency. It may be preferred to have the SRS to be sent after the TRS so that the tracking achieved from the TRS can be applied to the SRS transmission, so in generally the network could ensure k_srs>k_trs. An alternative is that the AP SRS is sent in slot n+t+k_trs+k_srs, which ensures that the SRS is later than the TRS. If the TRS is transmitted in multiple slots, the AP SRS may be sent in slot n+t+k_trs+k+k_srs, where k is a number of slots with AP TRS transmissions and k is specified in a RRC configuration or standard, such as k=2, 4, etc., which ensures that the SRS is based on sufficient time-domain samples of the TRS, such as for pathloss estimation purpose discussed later. However, in either case, the time gap between receiving the TRS and sending the SRS can be shorter than the time gap between receiving the TRS and receiving an AP CSI-RS since the SRS can be sent without waiting for AGC to settle (which is needed for receiving CSI-RS in general). As long as the tracking is acquired by the UE from the AP TRS, the UE is ready to send the SRS. Thus, in an embodiment, the AP SRS slot is n+t+k_trs+t_srs, where t_srs<k_srs and is a value specified by the network. For example, t_srs may be 1 slot (i.e., the SRS can be sent the slot right after the TRS if the frame structure allows (e.g., it is an UL slot or a flexible slot with UL symbols)). Based on the SRS, the gNB can derive partial DL MIMO CSI for FDD system, full DL MIMO CSI for TDD system, and full UL MIMO CSI and UL power control/timing advance information for FDD/TDD. The slot that the SRS is sent can be viewed as the time that the SCell activation is completed (i.e., the SCell is activated at operation 910) if no default AP CSI-RS is configured for the SCell activation. Note that if a default AP CSI-RS is also configured/identified for the SCell activation process, the UE could also receive an AP CSI-RS, which may be after the TRS, before or after the CSI-RS, but the SCell activation is done before the AP CSI report is sent, that is, the SRS-based CSI acquisition and SCell activation could be faster than the CSI-RS based CSI acquisition and SCell activation. However, in some cases, the UL slots/symbols are sparse in time, and then the SRS-based activation may be slower. Comparing the SRS-based activation and CSI-RS based activation, depending on how the slots/parameters are configured and at what time the activation command is sent, one could be faster than the other, which is known to the gNB and the gNB can choose. In addition, if the gNB needs CQI and/or DL interference information, the CSI-RS based activation can provide such information and can be used. If the gNB needs DL full MIMO CSI, UL CSI/TA/power control information but not DL interference information, the SRS based activation can provide such information and can be used; the activation is done after the SRS is sent, but a CSI report may still be sent after the activation is done. The AP TRS relies on a cross-carrier signal, such as the AP TRS is QCLed with a cross-carrier SSB or a cross-carrier P/SP TRS with QCL Type A and QCL Type D (for FR2). The cross-carrier SSB or P/SP TRS could be on an activated carrier which is generally an intra-band carrier, and could be configured/received for the UE before the activation process starts. In another embodiment, in case of the cross-carrier SSB or P/SP TRS not configured or not transmitted as that carrier is also deactivated, the AP TRS may be repeated in consecutive slots on or after n+k_trs so that the UE can derive sufficient tracking information from the AP TRS. Finally, if the AP TRS is QCLed with a P/SP TRS, then that P/SP TRS automatically starts after the SCell activation is completed if the P/SP TRS is configured with the AP TRS at operation 912.

FIG. 10 illustrates a diagram 1000 for a fourth example embodiment for SCell activation triggering and activation. As shown in FIG. 10, at operation 1002, the gNB sends an AP TRS trigger for a deactivated SCell at slot n. The AP TRS and its triggering information are configured for the SCell beforehand. In case that multiple AP TRSs are configured for the SCell activation and one default AP TRS is configured, the AP TRS trigger can indicate one AP TRS different from the default. The AP TRS trigger is carried in a PDCCH sent on an activated serving cell. If the PDCCH with the AP TRS trigger is successfully decoded, the UE understands that this TRS is on a deactivated SCell, and this means the gNB initiates the SCell activation process from slot n. Then, at operation 1004, the gNB may transmit an AP TRS to the UE at slot n+k_trs, where k_trs is the triggering offset associated with UE receiving an AP TRS in terms of number of slots. This could be related to UE capability, and after the UE reports the capability, the gNB configures AP TRS triggering offset. This allows the UE to have sufficient time to prepare for receiving the AP TRS. Though the SCell activation process is generally an L2 process, the reception of the AP TRS trigger, interpretation of the trigger information, and reception of the AP TRS for the SCell activation process can be pre-prepared by the UE in L1 and do not have to wait for L2 to be ready. Nevertheless, the L1 of the UE has to inform the L2 which may take some time, and it may be done in parallel to the AP TRS triggering process, that is, the TRS triggering offset may overlap with the L1-to-L2 processing, and the latter may not cause any additional latency in L1 processing of the RS transmissions/receptions/processing. Based on the received AP TRS, the UE can perform AGC settling, time/frequency tracking, etc. The AP TRS may be repeated within one slot or across different slots. Then, if the SCell's activation process is also configured with a default AP CSI-RS with triggering offset k_csi-rs, at operation 1006, an AP CSI-RS may also be transmitted to the UE in slot n+k_csi-rs. No triggering for the CSI-RS is needed, which reduces signaling overhead and latency. It may be preferred to have the CSI-RS to be received after the TRS so that the AGC/tracking achieved from the TRS can be applied to the CSI-RS reception and processing, so in generally the network could ensure k_csi-rs>k_trs. An alternative is that the AP CSI-RS is sent in slot n+k_trs+k_csi-rs, which ensures that the CSI-RS is later than the TRS. If the TRS is transmitted in multiple slots, the AP CSI-RS may be sent in slot n+t+k_trs+k+k_csi-rs, where k is a number of slots with AP TRS transmissions and k is specified in a RRC configuration or standard, such as k=2, 4, etc., which ensures that the CSI-RS is based on sufficient time-domain samples of the TRS. If the SCell's activation process is also configured with a default AP SRS with triggering offset k_srs, an AP SRS may also be transmitted by the UE in slot n+k_srs. No triggering for the SRS is needed, which reduces signaling overhead and latency. It may be preferred to have the SRS to be sent after the TRS so that the tracking achieved from the TRS can be applied to the SRS transmission, so in generally the network could ensure k_srs>k_trs. An alternative is that the AP SRS is sent in slot n+k_trs+k_srs, which ensures that the SRS is later than the TRS. The CSI-RS could be before the SRS or after the SRS if both are configured, depending on the parameters. Based on the CSI-RS, the UE may generate AP CSI report, which could include at least a valid CQI. Then, at operation 1008, the UE may send the report the gNB. The slot that the report with the valid CQI is sent can be viewed as the time that the SCell activation is completed (i.e., the SCell is activated at operation 1010). One embodiment is that the AP TRS relies on a cross-carrier signal, such as the AP TRS is QCLed with a cross-carrier SSB or a cross-carrier P/SP TRS with QCL Type A and QCL Type D (for FR2). The cross-carrier SSB or P/SP TRS could be on an activated carrier which is generally an intra-band carrier, and could be configured/received for the UE before the activation process starts. In another embodiment, in case of the cross-carrier SSB or P/SP TRS not configured or not transmitted as that carrier is also deactivated, the AP TRS may be repeated in consecutive slots on or after n+k_trs so that the UE can derive sufficient tracking information from the AP TRS. The AP TRS is still QCLed with a P/SP TRS, and that P/SP TRS automatically starts after the SCell activation is completed if the P/SP TRS is configured with the AP TRS at operation 1012.

Figures 11, 12, 13:
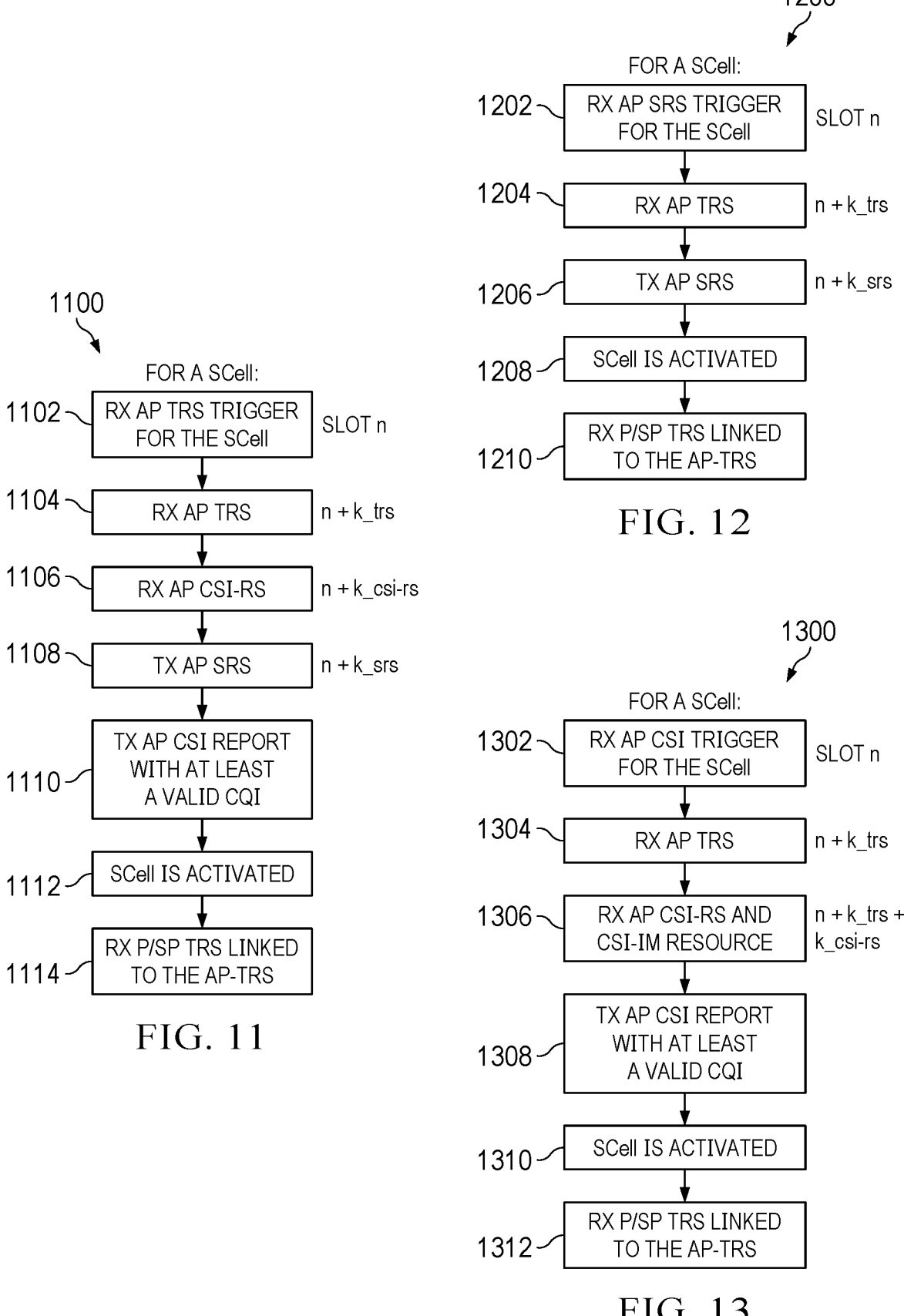
FIG. 11 illustrates a diagram for a fifth example for SCell activation triggering and activation according to example embodiments presented herein.
FIG. 12 illustrates a diagram for a sixth example for SCell activation triggering and activation according to example embodiments presented herein.
FIG. 13 illustrates a diagram for a seventh example for SCell activation triggering and activation according to example embodiments presented herein.

FIG. 11 illustrates a diagram 1100 for a fifth example embodiment for SCell activation triggering and activation. As shown in FIG. 11, at operation 1102, the gNB sends an AP CSI-RS trigger for a deactivated SCell at slot n. The AP CSI-RS and its triggering information are configured for the SCell beforehand. In case that multiple AP CSI-RSs are configured for the SCell activation and one default AP CSI-RS is configured, the AP CSI-RS trigger can indicate one AP CSI-RS different from the default. The AP CSI-RS trigger is carried in a PDCCH sent on an activated serving cell. If the PDCCH with the AP CSI-RS trigger is successfully decoded, the UE understands that this CSI-RS is on a deactivated SCell, and this means the gNB initiates the SCell activation process from slot n. Then, at operation 1104, the gNB may transmit an AP TRS to the UE at slot n+k_trs, where k_trs is the triggering offset associated with UE receiving an AP TRS in terms of number of slots, and the AP TRS is configured for the SCell beforehand. No triggering for the TRS is needed, which reduces signaling overhead and latency. There may be some L1-to-L2 processing, but it may be done in parallel with the L1 steps and may not cause any additional latency in L1 processing of the RS transmissions/receptions/processing. Based on the received AP TRS, the UE can perform AGC settling, time/frequency tracking, etc. The AP TRS may be repeated within one slot or across different slots. Then, at operation 1106, the AP CSI-RS may be transmitted to the UE in slot n+k_csi-rs. It may be preferred to have the CSI-RS to be received after the TRS so that the AGC/tracking achieved from the TRS can be applied to the CSI-RS reception and processing, so in generally the network could ensure k_csi-rs>k_trs. An alternative is that the AP CSI-RS is sent in slot n+k_trs+k_csi-rs, which ensures that the CSI-RS is later than the TRS. If the TRS is transmitted in multiple slots, the AP CSI-RS may be sent in slot n+t+k_trs+k+k_csi-rs, where k is a number of slots with AP TRS transmissions and k is specified in a RRC configuration or standard, such as k=2, 4, etc., which ensures that the CSI-RS is based on sufficient time-domain samples of the TRS. If the SCell's activation process is also configured with a default AP SRS with triggering offset k_srs, at operation 1108, an AP SRS may also be transmitted by the UE in slot n+k_srs. No triggering for the SRS is needed, which reduces signaling overhead and latency. It may be preferred to have the SRS to be sent after the TRS so that the tracking achieved from the TRS can be applied to the SRS transmission, so in generally the network could ensure k_srs>k_trs. An alternative is that the AP SRS is sent in slot n+k_trs+k_srs, which ensures that the SRS is later than the TRS. The CSI-RS could be before the SRS or after the SRS if both are configured, depending on the parameters. Based on the CSI-RS, the UE may generate AP CSI report, which could include at least a valid CQI. Then, at operation 1110, the UE may send the report the gNB. The slot that the report with the valid CQI is sent can be viewed as the time that the SCell activation is completed (i.e., the SCell is activated at operation 1112). Note that even if the SRS is sent before the CSI-RS, in the case of SCell activation initiated by an AP CSI-RS trigger, the activation is done only after the CSI report is sent. One embodiment is that the AP TRS relies on a cross-carrier signal, such as the AP TRS is QCLed with a cross-carrier SSB or a cross-carrier P/SP TRS with QCL Type A and QCL Type D (for FR2). The cross-carrier SSB or P/SP TRS could be on an activated carrier which is generally an intra-band carrier, and could be configured/ received for the UE before the activation process starts. In another embodiment, in case of the cross-carrier SSB or P/SP TRS not configured or not transmitted as that carrier is also deactivated, the AP TRS may be repeated in consecutive slots on or after n+k_trs so that the UE can derive sufficient tracking information from the AP TRS. The AP TRS is still QCLed with a P/SP TRS, and that P/SP TRS automatically starts after the SCell activation is completed if the P/SP TRS is configured with the AP TRS at operation 1114.

FIG. 12 illustrates a diagram 1200 for a sixth example embodiment for SCell activation triggering and activation. As shown in FIG. 12, at operation 1202, the gNB sends an AP SRS trigger for a deactivated SCell at slot n. The AP SRS and its triggering information are configured for the SCell beforehand. In case that multiple AP SRSs are configured for the SCell activation and one default AP SRS is configured, the AP SRS trigger can indicate one AP SRS different from the default. The AP SRS trigger is carried in a PDCCH sent on an activated serving cell. If the PDCCH with the AP SRS trigger is successfully decoded, the UE understands that this SRS is on a deactivated SCell, and this means the gNB initiates the SCell activation process from slot n. Then, at operation 1204, the gNB may transmit an AP TRS to the UE at slot n+k_trs, where k_trs is the triggering offset associated with UE receiving an AP TRS in terms of number of slots, and the AP TRS is configured for the SCell beforehand. No triggering for the TRS is needed, which reduces signaling overhead and latency. There may be some L1-to-L2 processing, but it may be done in parallel with the L1 steps and may not cause any additional latency in L1 processing of the RS transmissions/receptions/processing. Based on the received AP TRS, the UE can perform AGC settling, time/ frequency tracking, etc. The AP TRS may be repeated within one slot or across different slots. Then, at operation 1206, the AP SRS may be transmitted by the UE in slot n+k_srs. It may be preferred to have the SRS to be sent after the TRS so that the tracking achieved from the TRS can be applied to the SRS transmission, so in generally the network could ensure k_srs>k_trs. An alternative is that the AP SRS is sent in slot n+k_trs+k_srs, which ensures that the SRS is later than the TRS. If the TRS is transmitted in multiple slots, the AP SRS may be sent in slot n+t+k_trs+k+k_srs, where k is a number of slots with AP TRS transmissions and k is specified in a RRC configuration or standard, such as k=2, 4, etc., which ensures that the SRS is based on sufficient time-domain samples of the TRS, such as for pathloss estimation purpose discussed later. Then, if the SCell's activation process is also configured with a default AP CSI-RS with triggering offset k_csi-rs, an AP CSI-RS may also be transmitted to the UE in slot n+k_csi-rs. It may be preferred to have the CSI-RS to be received after the TRS so that the AGC/tracking achieved from the TRS can be applied to the CSI-RS reception and processing, so in generally the network could ensure k_csi-rs>k_trs. An alternative is that the AP CSI-RS is sent in slot n+k_trs+k_csi-rs, which ensures that the CSI-RS is later than the TRS. The CSI-RS could be before the SRS or after the SRS if both are configured, depending on the parameters. Based on the CSI-RS, the UE may generate AP CSI report, which could include at least a valid CQI. Then, the UE may send the report the gNB. The slot that the AP SRS is sent can be viewed as the time that the SCell activation is completed (i.e., the SCell is activated at operation 1208). Note that even if the SRS is sent after the CSI-RS, in the case of SCell activation initiated by an AP SRS trigger, the activation is done only after the SRS is sent. One embodiment is that the AP TRS relies on a cross-carrier signal, such as the AP TRS is QCLed with a cross-carrier SSB or a cross-carrier P/SP TRS with QCL Type A and QCL Type D (for FR2). The cross-carrier SSB or P/SP TRS could be on an activated carrier which is generally an intra-band carrier, and could be configured/received for the UE before the activation process starts. In another embodiment, in case of the cross-carrier SSB or P/SP TRS not configured or not transmitted as that carrier is also deactivated, the AP TRS may be repeated in consecutive slots on or after n+k_trs so that the UE can derive sufficient tracking information from the AP TRS. The AP TRS is still QCLed with a P/SP TRS, and that P/SP TRS automatically starts after the SCell activation is completed if the P/SP TRS is configured with the AP TRS at operation 1210.

FIG. 13 illustrates a diagram for a seventh example embodiment for SCell activation triggering and activation. As shown in FIG. 13, gNB sends an AP CSI reporting trigger for a deactivated SCell at slot n. The AP CSI reporting and its associated CSI-RS/CSI-IM and its triggering information are configured for the SCell beforehand. The operations 1302-1312 of the timeline in FIG. 13 are similar to the embodiment with AP CSI-RS trigger of operations 1002- 1012 in FIG. 10, with the addition that the CSI-IM is sent at the same slot as the CSI-RS at operation 1306 in FIG. 13. Since both CSI-RS and CSI-IM are triggered jointly, the trigger is no longer called an AP CSI-RS trigger but an AP CSI reporting trigger. In an embodiment, the CSI-IM may be in a different slot from the CSI-RS.

Table 4 illustrates the criteria for a deactivated SCell to be considered as activated in the above embodiments. There are 4 possibilities in each column, listed as the sub-columns, and those with N/A are invalid configurations. Note that the AP temporary RS trigger may or may not indicate the default one.

TABLE 4

| Criteria for considering a deactivated SCell as activated | | | | | | | | | | | | | | | |
|---|---|---|---|---|---|---|---|---|---|---|---|---|---|---|---|
| Activation signaling: | MAC CE | | | | AP TRS trigger | | | | AP CSI-RS trigger | | | | AP SRS trigger | | | |
| Default AP CSI-RS configured for SCell activation or not: | Yes | Yes | No | No | Yes | Yes | No | No | Yes | Yes | No | No | Yes | Yes | No | No |
| Default AP SRS configured for SCell activation or not: | Yes | No | Yes | No | Yes | No | Yes | No | Yes | No | Yes | No | Yes | No | Yes | No |
| SCell activated when this is sent: | CQI | CQI | SRS | N/A | CQI | CQI | SRS | N/A | CQI | CQI | N/A | N/A | SRS | N/A | SRS | N/A |

The example of the first sub-column ("Yes," "Yes," "CQI") show that, if Activation signaling is: MAC CE, and if Default AP CSI-RS configured for SCell activation or not is: Yes, and if Default AP SRS configured for SCell activation or not is: Yes, SCell activated when CQI is sent.

Other sub-columns can also be understood likewise.

Some embodiments for the CSI reporting associated with the SCell activation are as follows. In one embodiment, the CSI report includes at least a valid CQI report, which is the same as the legacy design. In one embodiment, the CSI report includes at least a valid L1 SINR report but not necessarily a CQI. The derivation of the L1 SINR is more efficient and faster than derivation of the CQI value, and can therefore shorten the activation latency. Both the CQI report and the L1 SINR report have to rely on CSI-RS (and CSI-IM resource(s)) as described later. The activation completes when the L1 SINR is sent. To differentiate the cases of sending a CQI and sending an L1 SINR, one embodiment is that all Rel-17 enhanced activation requires L1 SINR but not CQI, or alternatively, for L2 command initiated activation, CQI is to be sent but for L1 RS trigger initiated activation, L1 SINR is to be sent. In another embodiment, the CSI report includes a valid L1 RSRP report but not necessarily a SINR or CQI. This is especially useful for FR2 beam-based operations. The derivation of the L1 RSRP is even more efficient and faster than derivation of the L1 SINR value, and can therefore further shorten the activation latency. The L1 RSRP report relies on CSI-RS but not CSI-IM resource(s). So if no default CSI-IM is configured or no CSI-IM is signaled in an AP RS trigger, the UE may assume that an L1 RSRP is to be reported, and the activation completes when the L1 RSRP is sent. Also for L2 command initiated activation, CQI is to be sent but for L1 RS trigger initiated activation, L1 RSRP is to be sent if no CSI-IM is available but L1 SINR is to be sent if CSI-IM is also available.

In some embodiments, the SRS transmission may need to have a proper TA offset. The TA offset may be based on the TAG that the SCell is in if the TA is valid for that TAG. If no valid TA is available for the TAG, then an initial TA offset may be obtained from another TAG, possibly with an offset signaled from the network for the timing differences between the TAGs estimated by the network. In some embodiments, the SRS transmission needs to have a proper transmission power. The pathloss RS for the SRS may be configured as a SSB, CSI-RS, or TRS. If the SSB is available and configured as the pathloss RS for the SRS, then the pathloss can be estimated from the SSB. If the CSI-RS is available as an AP CSI-RS and configured as the pathloss RS for the SRS, then the pathloss can be estimated from the AP CSI-RS. The network may configure the pathloss (or the associated RSRP measurement) based on at least k transmission occasions of the AP CSI-RS, the k transmission occasions may be on k OFDM symbols, k slots, or shorter or longer than k slots based on its configuration and slot configuration, and the AP SRS trigger offset starts in the slot that the k-th transmission is on. If the AP TRS is configured as the pathloss RS for the SRS, then the pathloss can be estimated from the AP TRS. The network may configure the pathloss (or the associated RSRP measurement) based on at least k transmission occasions of the AP TRS, the k transmission occasions may be on k OFDM symbols, k slots, or shorter or longer than k slots based on its configuration and slot configuration, and the AP SRS trigger offset starts in the slot that the k-th transmission is on. In on embodiment, the AP TRS is the default pathloss RS for the SRS during the activation procedure even if the SRS is configured with another pathloss RS; this is because the AP TRS is certain to be transmitted while a CSI-RS may be optional, and the AP TRS provides wideband information which is better than a SSB for pathloss estimation purpose. Alternatively, information from other carriers may be used to set the transmission power of the SRS, such as the pathloss for SCell 1 is derived from the pathloss for another cell with an offset signaled to the UE or derived by the UE. If SCell 1 is in a TAG with an activated serving cell, then in addition to acquire TA information from that cell, the UE may also be able to acquire initial pathloss/RSRP values from that cell with proper signaling from the network. For example, if an offset for pathloss/RSRP is signaled to for the cells, then the UE can apply the offset for pathloss/RSRP and hence the initial SRS power control. For another example, the network signaling does not have an offset but just enables the derivation of pathloss/RSRP from the activated cell (possibly with an offset estimated by the UE).

In some embodiments, fast SCell activation is via existing L2 signaling with enhanced activation procedure which may be variations of some of the above embodiments or may be combined with above embodiments:

SCell activation procedure initiated when UE receives the L2 signaling;

Temporary RS is triggered with the L2 signaling, with triggering offset started at the slot according to the required MAC decoding time (typically n+3), or with triggering offset started at the slot of the ACK to the PDSCH carrying the MAC command is sent. The temporary RS include at least an AP TRS configured for the SCell activation, and include at least one of an AP CSI-RS and an AP SRS (or both).

In some embodiments, fast SCell activation is via L1 or L2 signaling. In any case, an AP TRS is always triggered:

In one embodiment, the gNB sends MAC activation command for the SCell activation, which is configured with a default AP TRS plus a default AP CSI-RS and/or a default AP SRS. The triggering offset for the AP RS starts at the slot according to the required MAC decoding time (typically n+3); or the triggering offset starts in the slot when the UE sends an ACK associated with the MAC activation command; or Network sends an L1 AP TRS trigger for the deactivated SCell, which is configured jointly with a default AP CSI-RS and/or a default AP SRS. The triggered AP TRS may or may not be the default AP TRS configured for the SCell activation; or NW sends an L1 AP CSI-RS trigger for the deactivated SCell, which is configured jointly with a default AP TRS, and the AP CSI-RS triggered could be different from the default AP CSI-RS configured for the SCell activation. The SCell may also be configured with a default SRS, and the default SRS is also transmitted; or NW sends an L1 AP SRS trigger for the deactivated SCell, which is configured jointly with a default AP TRS, and the AP CSI-RS triggered could be different from the default AP CSI-RS configured for the SCell activation. The SCell may also be configured with a default CSI-RS, and the default SRS is also transmitted.

In some embodiments with L1 AP trigger for activation of a deactivated SCell, to prevent that the UE and network from being out of sync, an ACK to the L1 triggering PDCCH may be sent from the UE if the PDCCH is correctly decoded. The ACK may be carried in a PUCCH in the immediately next slot with UL symbols to accommodate the PUCCH. In this case, the triggering offset starting time may be the slot of the PUCCH. However, a con for this embodiment is that the L1 triggering process may be prolonged since it may have to wait for a flexible/UL slot in TDD.

In addition to TRS which has been agreed as a temporary RS and the aperiodic CSI-RS/SRS/SSB as optional temporary RS as described above, the following candidate RS can be considered.

Periodic CSI-RS for a Deactivated SCell

In essence, periodic CSI-RS (or likewise, SP CSI-RS) act like LTE CRS and thus can shorten the activation latency. The pros include that their occurrences are fully predictable, which can help reduce PDCCH monitoring and PDCCH overhead, and simplify UE design. The cons include that it is difficult to set the periodicity: if it is too long then the latency reduction is not significant, but if it is too short then the overhead and energy consumption are high. Long-periodicity CSI-RS (also including long-periodicity TRS) of periodicity at least 100 TTIs may be configured for a deactivated SCell to reduce energy consumption. The P/SP TRS configured for the deactivated SCell can also serve as the source RS for the AP TRS during the activation process. If multiple AP TRSs are configured for the SCell activation, the AP TRS associated with the P/SP TRS transmitted before the activation starts is assumed as the default AP TRS and may be transmitted during the activation.

A Combination of P/SP/AP CSI-RS for a Deactivated SCell

This provides the network with most flexibility/capability but the complexity may be high.

Comparing CSI-RS with TRS, it is noted that CSI-RS is needed for CSI measurement, while TRS is for tracking. Since in almost all SCell activation CSI measurement and reporting are needed, even when TRS is used as a temporary RS for activation, CSI-RS is still needed. Thus, at least one of AP CSI-RS and P/SP CSI-RS could be supported as temporary RS, and a combination of long-periodicity P/SP CSI-RS and AP CSI-RS may be able to achieve the best tradeoff among fast activation and reduced UE power consumption.

Periodic SRS for a Deactivated SCell During Activation

SRS can be useful for providing DL full MIMO CSI in TDD systems, UL CSI in TDD/FDD, maintaining UL TA, UL power control, and UL/DL beam. Therefore, SRS can be very important for a to-be-activated SCell to re-acquire CSI, TA, power control, and beam. In the case that the pathloss RS for the SRS is on an activated cell, the UE may be able to transmit the SRS on the to-be-activated SCell without waiting for the DL AGC to settle. In fact, an SCell may not be fully usable as a "fully activated" SCell until its UL is also ready, which can be achieved by SRS transmissions. In addition, utilizing SRS in activation can shift some of the processing from the UE to the network, thus reducing UE processing complexity. Hence, embodiments in this disclosure supports that SRS is also considered as temporary RS.

Periodic/Aperiodic RS Based on SSS/PSS (e.g., P/AP SSB) During Activation for Case 2b (w/Activated Intra-Band Contiguous Cell, $\Delta T \times P \leq 6$ dB, $\hat{E}s/Iot < -2$ dB) and Other Unknown Cell Cases A to-be-activated SCell may be known to the UE or unknown to the UE. If it is known, the TRS as a temporary RS can provide UE at least the functionalities such as time/frequency tracking during activation. If the SCell is not known, however, TRS may not be sufficient, and RS based on SSS/PSS is needed. Thus, RS based on SSS/PSS could be considered as temporary RS for unknown cells.

To prevent an SCell become unknown to a UE, periodic RS based on SSS/PSS may be configured for a deactivated SCell. In addition, if lower power consumption is intended, long-periodicity RS based on SSS/PSS of periodicity at least 100 TTIs may be configured for a deactivated SCell. Periodic RS may help maintain the connection between the UE and the deactivated SCell, which may in turn facilitate SCell activation. Whether periodic RS may be included as "temporary RS" can be further discussed, but (only) long-periodicity RS may be considered for a deactivated SCell to avoid frequency monitoring of the RS while avoiding the SCell to become unknown.

In some embodiments that the deactivated SCell becomes unknown to the UE, aperiodic triggering of RS based on SSS/PSS may be sent. However, due to the timing uncertainty, the precise timing of the RS based SSS/PSS may not be known to the UE. Hence, a search time window for the RS based on SSS/PSS may be configured or signaled to the UE for the case of activation of an unknown SCell. For example, if the search time window is x OFDM symbols or x slots or x microseconds, and the triggering offset for the RS is k slot, then the UE may perform a search for the RS after the RS trigger is received, and the search starts after the k slots and ends before the k slots plus the x. The RS may be repeated multiple times in a slot or in multiple slots based on the configuration to the UE. After the RS based on SSS/PSS is sent for k times, where k is value configured for the UE, the rest of the activation process starts similar to the embodiments described for a known cell.

So AP CSI-RS, P/SP CSI-RS, SRS, and RS based on SSS/PSS may be configured as temporary RS. Note that the temporary RS may not be always needed for activation, and whether a specific temporary RS is supported/used or not depends on network configuration/UE capability.

In embodiments that AP CSI-RS is transmitted, each AP CSI-RS may also be configured with an AP CSI-IM resource(s), and the AP CSI-IM resource(s) is also transmitted when the AP CSI-RS is transmitted. Therefore, the AP CSI-IM resource(s) is also viewed as a part of a temporary RS or temporary RS resource. In some embodiments, the L1 AP CSI-RS trigger described elsewhere is replaced by an L1 AP CSI trigger. An AP CSI trigger triggers a combination of an AP CSI-RS(s) and an AP CSI-IM resource(s), and a CQI and/or L1 SINR is to be reported according to the CSI-RS/ CSI-IM. The timing relation among the AP CSI trigger, the AP CSI-RS, the AP CSI-IM, and the AP CSI report are generally the same as the conventional one, but in some embodiments, to ensure that the AP CSI-RS/CSI-IM are after the AP TRS, the triggering offset(s) for the AP CSI-RS/CSI-IM begins with the first or last AP TRS slot. FIG. 13 described above illustrates a diagram 1300 for a seventh example embodiment for SCell activation triggering and activation.

TRS has been selected as temporary RS for SCell activation. The design of Rel-15/16 TRS structure and configuration may be generally sufficient and may be reused as much as possible for Rel-17. When utilizing TRS for SCell activation, the network may ensure that the RS/SSB that the TRS is QCLed with (i.e., the source RS for TRS) may be present and valid for the UE to use. For example, if the TRS's source RS is SSS/PSS and the SCell is unknown to the UE, then the network may make sure the SSS/PSS is transmitted to the UE before the TRS is sent. With proper network implementation/configuration, the existing TRS design may work fine for SCell activation. As described before, the TRS trigger may be served also as the SCell activation command, which does not seem to require a new design of the triggering command. Some embodiments of the AP TRS have been provided before. In addition, the AP TRS may also be a cross-carrier TRS for the would-be-activated SCell. In this case, the P/SP/AP TRS is on an activated serving cell, and the P/SP TRS is being constantly monitored by the UE. The periodicity may be long (such as longer than 100 TTIs) to reduce overhead, and the AP TRS is on the activated cell based on the MAC command for activation or L1 RS trigger for activation. The previous embodiment procedures can still work, except that the L1 AP TRS trigger may require additional information to the UE to determine if it is intended for a cross-carrier SCell activation, which may be accompanied with an additional indication of the SCell ID if the AP TRS is also for a cross-carrier SCell activation. The advantage of the cross-carrier TRS includes that it can be repeated fewer times for the UE to gain sufficient information about tracking and/or pathloss estimate as the P/SP TRS is monitored by the UE, which reduces the latency between the TRS and the CSI-RS/SRS in the next steps. However the AGC information may not be able to be acquired from the cross-carrier TRS. For this reason, the following CSI-RS may need more repetitions, or the cross-carrier TRS is primarily used with AP SRS which does not require AGC. That is, an AP SRS trigger is sent to the UE for the SCell activation, and that SRS is linked to an AP TRS on an activated SCell, and the AP TRS is sent with the TRS triggering offset after the AP SRS trigger and without extra repetitions, based on which the pathloss estimate is updated by the UE, and the AP SRS is sent on the to-be-activated SCell. Then, the SCell is considered as activated.

Some of the above embodiments allow the possibilities of using L1 and/or L2 signaling. In the following embodiments, the focus is on L2 signaling based designs and procedures.

A general L2 triggering signaling design and its associated triggering mechanism can provide such flexibility with low triggering overhead and complexity, which is described below.

SCell activation triggering (i.e., activation command) configuration and temporary RS configuration are supported. For a configured SCell, a TRS as the default temporary RS is always configured, and optionally an AP CSI-RS (and CSI-IM resource) is configured, and optionally an AP SRS is configured. These RSs may be useful during the SCell activation procedure. At least the TRS may be always transmitted during the SCell activation, and other RS(s) may be optionally transmitted. Therefore, there are the following components and possible ways:

Minimum standardized components for SCell activation:
Legacy MAC CE activation command to activate the SCell is supported.
An (a default) AP TRS is configured with the SCell, and it may be transmitted during the SCell activation (i.e., triggered by the same legacy MAC CE for activation).

Additional components that can be optionally configured and used for SCell activation:
One or more non-default AP TRS may be additionally configured for the SCell. A new MAC CE may select an AP TRS to be triggered during the SCell activation (depending on the design, this MAC CE or another MAC CE initiates SCell activation). In an embodiment, a default AP TRS is configured and no MAC CE payload is needed for triggering the default AP TRS, and the new MAC CE only selects a non-default AP TRS. In an embodiment, no default AP TRS is configured and it is always needed that the new MAC CE selects and triggers an AP TRS to facilitate the activation.
One or more AP CSI-RS may be configured for the SCell. MAC CE may select an AP CSI-RS to be triggered during the SCell activation. One CSI-RS may be the default, so if the SCell activation starts without additional indication, the default AP CSI-RS is also sent.
One or more AP SRS may be configured for the SCell. MAC CE may select an AP SRS to be triggered during the SCell activation. One SRS may be the default, so if the SCell activation starts without additional indication, the default AP SRS is also sent.

Figure 14A:
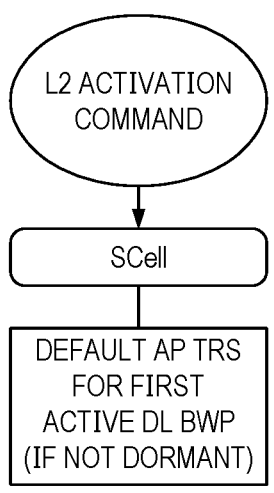
FIG. 14A illustrates minimum components for L2 signaling based design according to example embodiments presented herein.
Figure 14B:
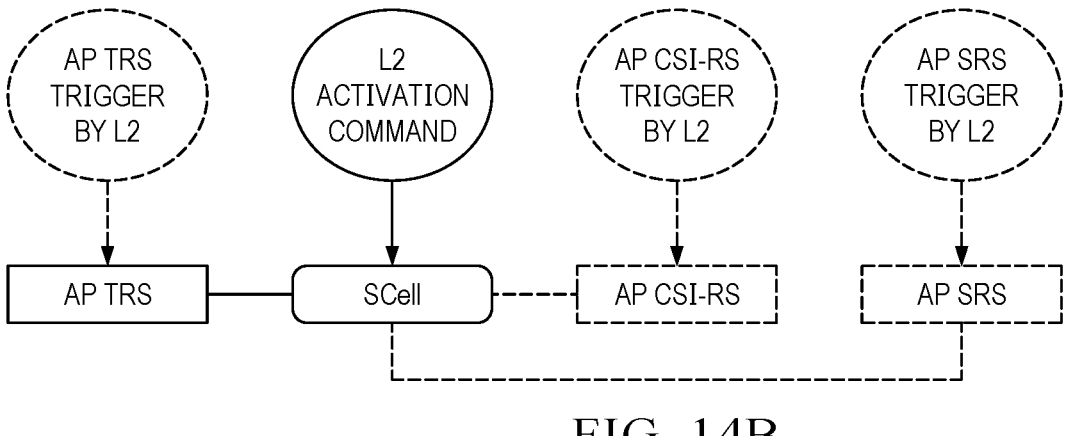
FIG. 14B illustrates minimum and optional components for L2 signaling based design according to example embodiments presented herein.

FIGS. 14A and 14B illustrate the framework for SCell activation.
The SCell supports the minimum standardized components and mechanism for SCell activation, including that legacy MAC activation command to activate the SCell is always supported, and a default AP TRS is always configured with the SCell, so it is always transmitted during the SCell activation, regardless of how the activation starts.
The minimum components can be standalone. See FIG. 14A, which illustrates minimum components for L2 signaling based design.

Additional components that can be optionally configured and used for SCell activation include AP TRS L2 trigger, AP CSI-RS, AP CSI-RS L2 trigger, AP SRS, AP SRS L2 trigger.

If an AP TRS L2 trigger is received, in which the TRS selected by the TRS trigger may be different from the default TRS configured for the SCell, then the TRS selected by the TRS trigger is sent and the default TRS is not sent.

If an AP CSI-RS L2 trigger is received, then the selected AP CSI-RS may be sent during the SCell activation, and the default AP TRS may also be sent.

If an AP SRS L2 trigger is received, then the selected AP SRS may be sent during the SCell activation, and the default AP TRS may also be sent.

Similarly, if AP RS for SSS/PSS is supported, the above framework can also incorporate the AP RS for SSS/PSS and its associated trigger.

The minimum and optional components can be combined. See FIG. 14B, which illustrates minimum and optional components for L2 signaling based design.

Regarding the details of L2 activation and triggering design, several possibilities may be considered, such as one new MAC CE for both activation and temporary RS selection/triggering, new MAC CE(s) only for temporary RS selection/triggering, etc. The following embodiments can be considered.

Embodiment 1: One Legacy MAC CE for Activation+Default Temporary RS Triggering No new MAC CE is introduced, but the legacy MAC CE for SCell activation also triggers the default temporary RS (e.g., AP TRS). To avoid ambiguity of the legacy behavior of no temporary RS triggering and new behavior of temporary RS triggering, RRC configuration and/or side information may be used so that the UE/network have common understanding of the behavior. In an embodiment, when no default temporary RS is configured for the SCell or SCell activation, the legacy behavior is expected, and otherwise the new behavior is expected. In an embodiment, a RRC field/information element is used to specify which behavior is to be expected.

Embodiment 2: One Legacy MAC CE for Activation+One New MAC CE for Temporary RS Triggering (b Bits Per SCell)

The new MAC CE may be for:
TRS triggering; and/or
CSI-RS triggering; and/or
For SRS triggering.

Clearly, several embodiments exist for each RS triggering and joint RS triggering. The new MAC CE(s) for RS triggering is only expected to be accompanied with an SCell activation MAC CE in the same PDSCH, because the new MAC CE is not needed in non-activation scenarios (L1 DCI triggering in those scenarios is more efficient).

Embodiment 3: One Legacy MAC CE for Activation and Temporary RS Triggering

The new joint MAC CE may be just concatenating the MAC CEs in Embodiment 2.

Note that MAC CE for temporary RS triggering is not the same as MAC CE activation of the temporary RS. The former is a one-shot triggering and the latter activates periodic/semi-persistent transmission of the RS with multiple shots.

Common to the embodiments, to trigger temporary RS, MAC-CE at least may provide the following information. For the M SCells configured by the UE, information for 0, 1, or more temporary RSs may be provided/configured for each configured SCell. Suppose N (M≥N) SCells are currently deactivated. Out of the N deactivated SCells, suppose Y (N≥Y) SCells are to be activated. Then, a MAC CE may be sent to activate the Y SCells. The same or a different MAC CE may indicate that temporary RSs are to be triggered on X out of the Y (Y≥X) to-be-activated SCells, respectively, while no temporary RS is to be triggered on the other Y−X to-be-activated SCells.

The parameters that may be included in MAC CE for temporary RS triggering are analyzed below.

Whether or not temporary RS is to be triggered, or which resources are to be used for triggered temporary RS These two questions are related. If n different temporary RS are to be configured for a SCell, then ceiling (log(n+1)) bits are needed in the MAC CE to indicate which one or none is triggered. However, if 0 temporary RS is configured, then temporary RS is not triggered (i.e., legacy activation procedure). Furthermore, if only 1 temporary RS is configured, or a default temporary RS is to be configured, then this field is optional in MAC CE if the new Rel-17 temporary RS based activation procedure is to be used, or one bit can be used to indicate whether the one temporary RS is triggered or not if both legacy and new Rel-17 activation procedures are to be used. The default temporary RS may be the first temporary RS in the configured list.

Triggering time offset

The candidate value(s) of triggering offset(s) may be RRC configurable. If c value(s) is configured, ceiling(log(c)) bit may be needed in the MAC CE. If c=1 or a default can be configured, 0 bit is needed (i.e., the field may be optional. The default value may be the first value in the configured list). An upper bound for c should be decided, such as at most 4 or 8 offset values.

QCL source

QCL source may be configured by RRC for each temporary RS and may not need to be present in the MAC CE. However, if needed, more than one TCI state may be configured and one of them is selected by the MAC CE.

The description below analyses the MAC CE designing options/alternatives.

Although in general, some parameters may be included in the MAC CE for temporary RS triggering, none of the parameters needs to be always presented in the MAC CE. At least for some cases, all the parameters may be RRC configured, and the default may be triggered by the legacy MAC CE without any new design of MAC CE. So, in this case, when only the legacy MAC CE is sent, it may imply that the default temporary RS with its default parameters is triggered, provided that the default temporary RS and parameters are configured. If no default temporary RS is configured, then no temporary RS is triggered.

A new MAC CE to only trigger a temporary RS, if supported, would not be sent if it is not within a PDSCH carrying the legacy SCell activation MAC CE. The temporary RS triggering may only be for SCell activation, so a temporary RS triggering MAC CE would not be expected by the UE without accompanying the SCell activation MAC CE.

A new MAC CE design can balance between high flexibility (too many parameters) and high overhead. To this end, the RRC configuration may limit the temporary RS parameters (resources, time offset, etc.) in the MAC Ce to a few combinations, and the MAC CE selects one combination, which is described below with more details.

The activation and triggering procedures, timeline, and UE behavior with an L2 signaling can be enhanced. There can be many cases and not all of them have to be explicitly handled in RAN1 standards (they are to be explicitly handled in RAN4 TS 38.133). RAN1 provides an overall timeline for RAN2 TS 38.321 activation timing and refers to RAN4 TS 38.133 for activation delay requirement.

Figure 15:
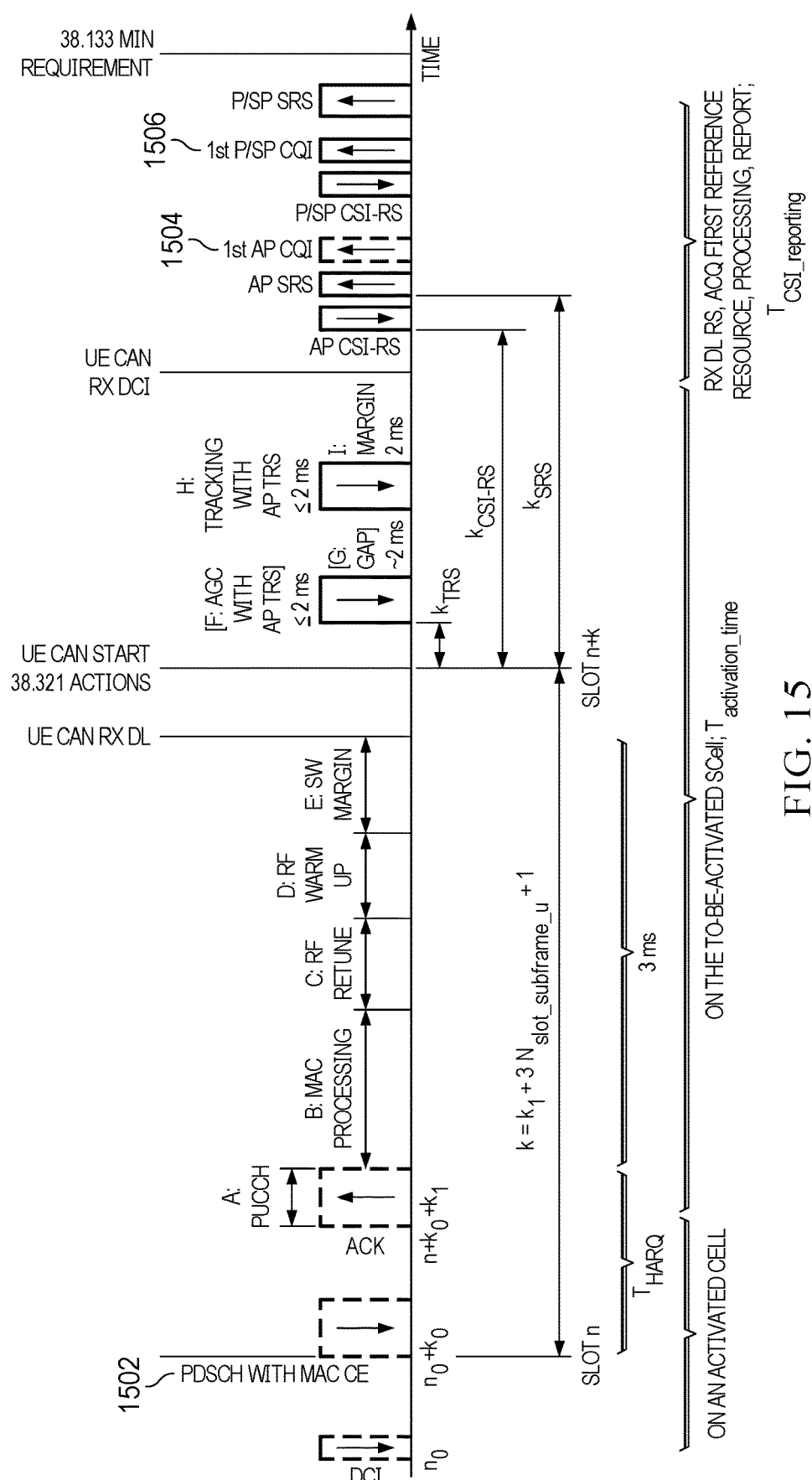
FIG. 15 illustrates example triggering procedure and timeline (for FR1 known cell with 15 kHz SCS) according to example embodiments presented herein.

FIG. 15 illustrates example triggering procedure and timeline (e.g., for FR1 known cell with 15 kHz SCS).

The first P/SP CQI 1506 may be optional; and first AP CQI 1504 may be optional and may be triggered by new MAC CE 1502 (or legacy DCI in another embodiment).

The new procedure leads to much reduced activation latency due to: 1) one or more temporary RS (AP TRS) can be made available immediately after slot n+k; 2) AP CSI measurement and reporting may be immediately after time I (triggered by the MAC CE 1502); and 3) AP SRS may be immediately after slot n+k (triggered by the MAC CE 1502, not waiting for AGC, e.g., in case of intra-band CA).

Details of some components are described below.

MAC CE Triggering Time: Ending in Slot n

This is the slot when the PDSCH carrying MAC CE(s) for activation and temporary RS selection/triggering ends. Note that before the PDSCH reception, there is DCI reception.

HARQ, Initial MAC Processing, and RF Delays: Ending in Slot n+k

The slot n+k is still defined as one slot after the required MAC decoding and processing time, which is the same as the current TS 38.213 of slot n+k (i.e., slot $n+k_1+3$ $N_{slot,subframe,\mu}+1$). The initial MAC processing refers to MAC CE decoding and other MAC related operations but not those specified in clause 5.9 of TS 38.321 for CSI/ PDCCH/SRS/PUCCH/etc. operations.

By this time, temporary RS is not transmitted.

AGC, Gap, Time/Frequency Tracking, Fine Timing, Cell Search, Etc., after Slot n+k Temporary RS needs to be transmitted after slot n+k. RAN1 had an earlier agreement "UEs measure the triggered temporary RS during SCell activation procedure no earlier than a slot m: FFS timeline values m which may need coordination with RAN4". Thus, m should be equal to n+k (i.e., m=n+k).

For FR1 known cell, if the measurement cycle is no more than 160 ms, then AGC is not needed, but otherwise 1 burst of AP TRS is needed. After the AGC is set, a minimum gap of 2 slots is also needed.

Then, time/frequency tracking based on another burst of AP TRS may be needed.

In some cases, fine timing may be needed, cell search for an unknown cell is needed, some uncertainties (for MAC, RRC, etc.) are also needed as defined in TS 38.133.

Some details of these operations are not to be specified in RAN1. The role of RAN1 here may be to ensure 1 or more AP TRS bursts with desired design are provided. RAN1 may inform RAN2/RAN4 about X AP TRS bursts with some gaps in between, and the X may be 1, 2, or more, and the TRS bursts could be for the same BWP, not for different BWPs. The MAC signaling details and timing details can be left to RAN2/RAN4.

For the gap between the bursts, it may be defined as the time duration between the start slots of the bursts, or it may be defined as the time duration after the last slot of the first burst till the start slot of the second burst. These two definitions may lead to 2-slot difference in time if a burst lasts 2 slots. The embodiments in this disclosure assume the latter until otherwise specified.

Time Offset for the First AP TRS

In order for the UE to receive an AP TRS, the TRS should not be sent before the initial MAC processing and RF delays are done. So the earliest possible timing may be immediately on or after slot n+k (e.g., slot n+k+1). However, it may be useful to allow some flexibility here, such as the UE may take some time to get ready for the AP TRS, which may be related to UE capability and considerations such as power saving. This is a bit similar to L1 AP TRS triggering offset; a larger offset can allow the UE to have more time to respond. Therefore, the AP TRS may be transmitted in slot $n+k+k_{TRS}$, where $k_{TRS}$ is an additional slot offset for AP TRS (also referred to as Ko or aperiodicTriggeringOffset for CSI-RS/TRS) and may be configured by RRC signaling or specified by MAC signaling. The $k_{TRS}$ may also be a fixed value specified by the standards, or may take one value out of several specified by the standards, and the selection is via RRC or MAC signaling. As fast activation is desirable, the offset may be set to the minimum scheduling offset for CSI-RS (e.g., the smallest within MinSchedulingOffsetKo-Values or the first value within MinSchedulingOffsetKo-Values). This value may be used as the default AP TRS offset and does not need to be signaled to the UE in the MAC CE. The earliest slot for a UE to receive a triggered temporary RS may be slot n+k.

The $k_{TRS}$ slot offset may also be modified to consider only the "available slot" or "admissible slot" or "valid slot," such as the slots configured as downlink by MIB/SIB/RRC by TDD-UL-DL-ConfigCommon or TDD-UL-DL-ConfigDedicated but not those flexible slots. Such slots may also be restricted to those DL slots that the AP TRS can fit. Furthermore, such slots may be restricted to those DL slots no earlier than n+k+minimumSchedulingOffsetKo.

In more details, the current mechanism for TRS triggering offset may be largely reused. In the current mechanism, the maximum possible triggering slot offset for a CSI-RS is 24 or 31, and MinSchedulingOffsetKo-Values can take one or two values up to 16, where each minimum Ko parameter denotes minimum applicable value(s) for the TDRA table for PDSCH and for A-CSI RS triggering Offset(s). When multiple minimum Ko parameters are configured, one of them is indicated in the triggering DCI. When no minimum Ko parameter is configured, the default offset specified by the standard specification is to be used, or 0 offset is used. Then, for AP TRP triggering via MAC CE, 0, 1, or more minimum Ko parameters may be configured for the configured TRS, and the MAC CE can select one which may be the $k_{TRS}$ described in the above. If only "available slots" are counted for determining the AP TRS offset, then it would be sufficient to support only a few candidate values for the offset, or just even one offset value that corresponds to the first DL slot that can accommodate the AP TRS and no earlier than n+k+minimumSchedulingOffsetKo. In some cases, minimumSchedulingOffsetKo may be 0, and then the temporary RS can be sent in slot n+k for the smallest activation latency.

SRS, CSI, PDCCH, PUCCH, Etc.

At the final stage of activation on or after slot n+k, according to TS 38.133, operations related to SRS, CSI, PDCCH, PUCCH, etc., can start. Note that CSI reporting related operations can start as early as slot n+k.

Other temporary RS, such as AP CSI-RS/SRS and even more AP TRS may be transmitted, and AP CSI reporting with a valid CQI may be performed.

Time Offset for AP CSI-RS

Similar to the timing offset design for AP TRS above, the AP CSI-RS may be transmitted in slot $n+k+k_{CSI-RS}$, where $k_{CSI-RS}$ is an additional slot offset for AP TRS, and the AP SRS in slot $n+k+k_{SRS}$, where $k_{SRS}$ is an additional slot offset for AP SRS. These offsets may be configured by RRC signaling or specified by MAC signaling. These offsets may also be a fixed value specified by the standards, or may take one value out of several specified by the standards, and the selection is via RRC or MAC signaling.

In general, the offset for CSI-RS could be larger than that for TRS, and ensure that the CSI-RS is sent only after any prerequisite TRS burst(s) is completed. For example, if 2-slot AGC with TRS is needed, followed by 2-slot gap and another TRS burst of 2 slots for tracking, the CSI-RS offset could be after the TRS burst for tracking, e.g., $k_{CSI-RS} \geq k_{TRS}+6$ slots. Generally, as the network controls the activation process and temporary RS transmissions under various conditions (e.g., those specified in TS 38.133), the network could guarantee that the offsets for the signals can meet appropriate signal transmission/reception requirements.

The CSI-RS triggering offset mechanism may be similar to the above TRS triggering offset mechanism. To have more flexibility, the configured AP CSI-RS may be allowed to have a different offset than the AP TRS triggering offset. Generally, the offsets may be configured differently for different TRS/CSI-RS resources in RRC, and may be indicated differently/separately for different TRS/CSI-RS resources in the MAC CE.

Time Offset for AP SRS

The offset for SRS generally may be larger than that for TRS, but if the prerequisites are already available/valid for the SRS, the SRS may be sent as early as the TRS. For example, for SRS with usage "antennaSwitching" or "codebook" in FR1, if the pathloss RS for the SRS and other prerequisites (e.g., timing advance) are available/valid, the SRS may be sent without waiting for AGC or tracking to be completed; note that the RSRP/pathloss estimate may still be available/valid for the SRS especially if long-periodicity SSB/CSI-RS are still transmitted during deactivation, or if the pathloss RS is allowed to be configured on a different serving cell which is activated, and the TA may be valid if the SCell is in a TAG with an activated serving cell. However, for "nonCodebook", a prerequisite is the associated CSI-RS (on the same carrier as the SRS) to be transmitted, so the SRS with "nonCodebook" can only be after the associated CSI-RS. Again, the network can guarantee the proper time order with sufficient flexibility in selecting the offsets.

The AP SRS triggering offset may be based on one or more configured slot offset values, and one value is to be selected by the MAC CE. However, as the SRS can only be transmitted in UL slot or on UL symbols in a flexible slot in TDD, the triggering slot offset may also be only accounting for UL slots and flexible slots with sufficient OFDM symbols to fit the AP SRS transmission.

CSI Reporting

CSI reporting, based on AP/P/SP CSI-RS and the associated CSI-IM, may be done after the CSI-RS transmission(s) and an additional time delay for UE processing. The time relation between the CSI-RS transmission and the CSI reporting as defined in current standards can be reused.

The CSI reporting may be on a different carrier or on the carrier being activated. For P/SP CSI reporting, current standardized procedures can be followed. For AP CSI reporting triggered by MAC CE, the reporting parameters could be mainly configured by RRC and the rest few (if any) by the MAC CE. A straightforward design is to add a CSI request field in the MAC CE and the design of the field is similar to that in a DCI.

BWP

By default, when the SCell is activated, the UL BWP and DL BWP that are being activated are based on firstActiveDownlinkBWP-Id and firstActiveUplinkBWP-Id. Therefore, the above signals and operations, e.g., the configured TRS and its transmission could be on the first active BWPs. If the gNB needs to activate a different DL BWP or UL BWP, it may also indicate so in the MAC CE, and the signals and operations may be for the indicated BWP(s). Alternatively, as a configured TRS is associated with a BWP ID, when a specific TRS is selected by the MAC CE, the BWP associated with the TRS is selected to be the active BWP.

Regarding the embodiments that, if a UE measures a temporary RS triggered by a MAC-CE during SCell activation procedure, the measurement is performed within the BWP bandwidth of BWP indicated by firstActiveDownlinkBWP-Id, the embodiments do not specify that a temporary RS has to be on the BWP with firstActiveDownlinkBWP-Id; it only says that the measurement of the temporary RS, e.g., a TRS, is within the bandwidth of the BWP with firstActiveDownlinkBWP-Id. Thus, it may be possible that, say, the BWP with firstActiveDownlinkBWP-Id is BWP 1 but the TRS is configured on BWP 2, and the UE just performs measurement of the TRS on the overlapped bandwidth of BWP 1 and BWP 2. This may create some issues below.

If BWP 1 and BWP 2 have no overlap, then the TRS may not be a useful TRS.

If BWP 1 and BWP 2 have overlap but the overlapped bandwidth is small, the measurement results may not be reliable.

If BWP 1 and BWP 2 have overlap but have different numerologies, it may be unclear how the UE can perform measurement on the TRS or need a BWP switching. A BWP switching during activation at least before CSI-RS for CSI measurement and reporting may be needed. In an embodiment, the operations based on the TRS may be performed before the BWP switching, and operating based on CSI-RS such as for CSI measurement and reporting are done after the BWP switching. The BWP to switch to may need to be signaled, and the time offset for the BWP switching may need to be signaled.

Restrictions may be added to the embodiment, such as only TRS configured for the BWP with firstActiveDownlinkBWP-Id may be configured as temporary RS. Alternatively, the embodiment technique may allow activation into other BWPs. There can be benefit of having the flexibility to activate into other BWPs, for example, different BWPs may be used by the network for different traffic demands or spectrum utilization considerations. Then, activation into only BWP 1 and measuring/reporting CSI for BWP 1 may not help much if the gNB wishes to use BWP 2 but BWP 1 and BWP 2 may have different bandwidths and numerologies; even worse, the BWPs may be on orthogonal frequencies in this carrier.

To summarize the embodiments with additional restriction above:

All TRS(s) as temporary RS(s) can only be configured on the BWP with firstActiveDownlinkBWP-Id;

The SCell always activates into the BWP with firstActiveDownlinkBWP-Id.

So, the following may need to be supported: for to-be-activated SCell, if any BWP ID is configured as part of temporary RS(s) configuration, the value of the BWP ID may be expected to be equal to firstActiveDownlinkBWP-Id.

For SCell activation, embodiments support:

on and after slot n+k (according to current TS 38.213)+ $k_{TRS}$, transmission of X AP TRS bursts with a gap between the bursts, the value of X includes at least 1 and 2; additional values may be from RAN4;

$k_{TRS}$ may correspond to the first DL slot that can accommodate the AP TRS and no earlier than n+k+ minimumSchedulingOffsetKo.

on slot n+k+$k_{SRS}$, transmission of AP SRS if configured or triggered by MAC CE;

on slot n+k+$k_{CSI-RS}$ which is also after a number of AP TRS bursts, transmission of AP CSI-RS/CSI-IM if configured or triggered by MAC CE, and reporting a valid CQI based on existing reporting mechanism.

The values of $k_{TRS}$, $k_{SRS}$, and $k_{CSI-RS}$ may be determined by the network and provided to the UE by RRC or MAC signaling.

FIG. 16 illustrates embodiments for SCell activation with several L2 signaling designs. FIG. 16 illustrates a diagram for a first example embodiment for SCell activation triggering and activation. As shown in FIG. 16, the gNB sends MAC activation command for a deactivated SCell, which is configured with a default AP TRS plus optionally a default AP CSI-RS and/or AP SRS. This initiates the SCell activation process. The MAC activation command may use existing design, in which no information of the TRS/CSI-RS/SRS is provided, but the associated default TRS/CSI-RS/SRS as configured by RRC signaling are automatically triggered. There may be more than one AP TRS (or CSI-RS/SRS) configured for the SCell or SCell activation process, but one is configured as the default. The default may be explicitly configured, or implicitly through a BWP configuration, e.g., several AP TRSs are associated with the several BWPs, respectively, for the SCell, and one BWP is signaled as the default for this activation, then the default AP TRS associated with the default BWP is triggered. This reduces MAC/DCI signaling overhead and avoids a new design for the MAC activation command. Alternatively, the MAC activation command may be using an enhanced design, such as further including one or more fields to trigger one or more of TRS/CSI-RS/SRS or one of the BWPs. This requires more MAC overhead, but it provides more flexibility for the network. For example, if two or more TRSs are associated with the SCell, the MAC command can activate/select one of them (e.g., one TRS is linked to a BWP, and by selecting a TRS or selecting a BWP, the linked BWP/TRS are also activated/selected) or more of them. Then, after the AP TRS, according the network configuration/activation, the associated RSs (CSI-RS/SRS) are also transmitted/received/processed. The CSI-RS, SRS, and TRS are associated with the same BWP, and one is QCLed to another. For example, the CSI-RS may be QCLed to the TRS with QCL Type A, and SRS uses the TRS and/or CSI-RS for its pathloss RS. Then, a valid DL CSI is reported from the UE to the gNB, which generally includes at least a valid CQI value. Some embodiments on this aspect will be further discussed later. After that, the SCell activation is completed and the SCell is activated.

FIG. 16 also shows that the gNB sends an L2 AP TRS trigger associated with a deactivated SCell. The UE understands that this initiates an SCell activation process. The AP TRS associated with the trigger may or may not be the default AP TRS, which provides the network more flexibility to select which AP TRS to transmit or which BWP to activate. For example, the default TRS (TRS1) may be associated with the default BWP1, but the L2 AP TRS trigger is for TRS2 and BWP2, then the UE understands that this SCell activation is to make BWP2 active. Then, after the AP TRS, according the network configuration/activation, the associated RSs (CSI-RS/SRS) are also transmitted/received/processed. The CSI-RS, SRS, and TRS are associated with the same BWP, and one is QCLed to another. For example, the CSI-RS may be QCLed to the TRS with QCL Type A, and SRS uses the TRS and/or CSI-RS for its pathloss RS. Then, a valid DL CSI is reported from the UE to the gNB, which generally includes at least a valid CQI value. Some embodiments on this aspect will be further discussed later. After that, the SCell activation is completed and the SCell is activated.

FIG. 16 also shows that the gNB sends an L2 AP CSI-RS trigger associated with a deactivated SCell. The UE understands that this initiates an SCell activation process. The AP CSI-RS associated with the trigger may or may not be the default AP CSI-RS. It is associated with a certain default TRS and optionally a default SRS and BWP, which provides the network more flexibility to select which AP CSI-RS/ TRS/SRS to transmit or which BWP to activate. For example, the default TRS (TRS1) may be associated with the default BWP1 and default CSI-RS1, but the L2 AP CSI-RS trigger is for CSI-RS2, which is linked to BWP2 and TRS2, then the UE understands that this SCell activation is to make BWP2 active and TRS2/CSI-RS2 are to be expected. Then, after the AP TRS2, the AP CSI-RS2 is sent and received. Optionally an AP SRS is transmitted according to configuration/activation, and optionally a valid DL CSI is reported from the UE to the gNB, which generally includes at least a valid CQI value. The CSI-RS, SRS, and TRS are associated with the same BWP, and one is QCLed to another. For example, the CSI-RS may be QCLed to the TRS with QCL Type A, and SRS uses the TRS and/or CSI-RS for its pathloss RS. Some embodiments on this aspect will be further discussed later. After that, the SCell activation is completed and the SCell is activated.

FIG. 16 also shows that the gNB sends an L2 AP SRS trigger associated with a deactivated SCell. The UE understands that this initiates an SCell activation process. The AP SRS associated with the trigger may or may not be the default AP SRS. It is associated with a certain default TRS and optionally a default CSI-RS and BWP, which provides the network more flexibility to select which AP CSI-RS/ TRS/SRS to transmit or which BWP to activate. For example, the default TRS (TRS1) may be associated with the default BWP1 and default SRS1, but the L2 AP SRS trigger is for SRS2, which is linked to BWP2 and TRS2, then the UE understands that this SCell activation is to make BWP2 active and TRS2 is to be expected and SRS2 is to be sent. Then, after the AP TRS2, the AP SRS2 is sent. Optionally an AP CSI-RS is transmitted according to configuration/activation, and optionally a valid DL CSI is reported from the UE to the gNB, which generally includes at least a valid CQI value. Some embodiments on this aspect will be further discussed later. After that, the SCell activation is completed and the SCell is activated.

FIG. 17 illustrates an embodiment for activation and triggering. FIG. 17 illustrates a diagram for a second example embodiment for SCell activation triggering and activation. As shown in FIG. 17, at operation 1702, the gNB sends MAC activation command for a deactivated SCell at slot n. The MAC CE is carried in a PDSCH sent on an activated serving cell. The UE needs to send ACK/NACK for the PDSCH with the MAC CE at operation 1704. If the PDSCH with the MAC CE is successfully decoded, an ACK may be sent, and this initiates the SCell activation process; otherwise a NACK may be sent, and the gNB may have to transmit another PDSCH with the MAC CE, and the SCell activation process may start in the slot that an ACK is sent. From the reception of the PDSCH with the MAC CE to the ACK, it may take t slots. In some cases, k=3 ms (or the equivalent number of slots) (i.e., the time needed for the UE to decode MAC signaling). The value t may also be other UE capability related values, which may be before the UE sends the ACK. The value t may also include other latency that the UE needs to process the MAC CE and take action in L1. In any case, the network and UE need to have a common reference timing for the rest of the signals to be transmitted/received without other signaling, and one embodiment for the common reference timing is the slot of ACK, and another embodiment for the common reference timing is the slot after the ACK so that the UE L1 is ready. Then, at operation 1706, the gNB may transmit an AP TRS to the UE at slot n+k+k_trs, where k_trs is the triggering offset associated with UE receiving an AP TRS in terms of number of slots. This could be related to UE capability, and after the UE reports the capability, the gNB configures AP TRS triggering offset. This allows the UE to have sufficient time to prepare for receiving the AP TRS. The AP TRS is configured for the SCell activation beforehand. No triggering for the TRS is needed, which reduces signaling overhead and latency. In case that multiple AP TRSs are configured for the SCell activation, one of them is configured as the default, and the default AP TRS is sent while other AP TRSs may not be sent; some embodiments are described before. The MAC CE may also be enhanced to include a trigger for one of the AP TRSs to be selected. Based on the received AP TRS, the UE can perform AGC settling, time/frequency tracking, etc. The AP TRS may be repeated within one slot or across different slots. At least one of a default AP CSI-RS and a default AP SRS could be configured for the SCell activation. Then, if the SCell's activation process is also configured with a default AP CSI-RS with triggering offset k_csi-rs, at operation 1708, an AP CSI-RS may also be transmitted to the UE in slot n+k+k_csi-rs. The default AP CSI-RS may be identified based on that it is the default AP CSI-RS for the BWP associated with the triggered AP TRS. No triggering for the CSI-RS is needed, which reduces signaling overhead and latency. It may be preferred to have the CSI-RS to be received after the TRS so that the AGC/tracking achieved from the TRS can be applied to the CSI-RS reception and processing, so in general the network could ensure k_csi-rs>k_trs. An alternative is that the AP CSI-RS is sent in slot n+t+k_trs+k_csi-rs, which ensures that the CSI-RS is later than the TRS. If the TRS is transmitted in multiple slots, the AP CSI-RS may be sent in slot n+k+k_trs+k_trs_length+k_csi-rs, where k_trs_length is a number of slots with AP TRS transmissions and k is specified in a RRC configuration or standard, such as k_trs_length=2, 4, etc., which ensures that the CSI-RS is based on sufficient time-domain samples of the TRS. Based on the CSI-RS, the UE may generate AP CSI report, which could include at least a valid CQI. Then, at operation 1710, the UE may send the report the gNB. The slot that the report with the valid CQI is sent can be viewed as the time that the SCell activation is completed (i.e., the SCell is activated at operation 1712). Note that if a default AP SRS is also configured/identified for the SCell activation process, the UE could send an AP SRS, which may be after the TRS, before or after the CSI-RS. No triggering for the SRS is needed, which reduces signaling overhead and latency. An embodiment of the AP SRS transmission may be described further. In addition, an AP TRS is generally not a standalone RS (i.e., it relies on a P/SP TRS), and the AP and P/SP TRS are QCLed with each other, in particular the AP TRS could be dependent on the P/SP TRS. However, in some cases, for the deactivated SCell, the AP TRS could not depend on a P/SP TRS on the SCell. There are a few embodiments here. One embodiment is that the AP TRS relies on a cross-carrier signal, such as the AP TRS is QCLed with a cross-carrier SSB or a cross-carrier P/SP TRS with QCL Type A and QCL Type D (for FR2). The cross-carrier SSB or P/SP TRS could be on an activated carrier which is generally an intra-band carrier, and could be configured/received for the UE before the activation process starts. In another embodiment, in case of the cross-carrier SSB or P/SP TRS not configured or not transmitted as that carrier is also deactivated, the AP TRS may be repeated in consecutive slots on or after n+k+k_trs so that the UE can derive sufficient tracking information from the AP TRS. The AP TRS is still QCLed with a P/SP TRS, and that P/SP TRS automatically starts after the SCell activation is completed if the P/SP TRS is configured with the AP TRS at operation 1714.

FIG. 18 illustrates an embodiment for SCell activation and RS triggering. FIG. 18 illustrates a diagram for a third example embodiment for SCell activation triggering and activation. As shown in FIG. 18, at operation 1802, the gNB sends MAC activation command for a deactivated SCell at slot n. The MAC CE is carried in a PDSCH sent on an activated serving cell. The UE needs to send ACK/NACK for the PDSCH with the MAC CE at operation 1804. If the PDSCH with the MAC CE is successfully decoded, an ACK may be sent, and this initiates the SCell activation process; otherwise a NACK may be sent, and the gNB may have to transmit another PDSCH with the MAC CE, and the SCell activation process may start in the slot that an ACK is sent. From the reception of the PDSCH with the MAC CE to the ACK, it may take t slots. The value t may also include other latency that the UE needs to process the MAC CE and take action in L1. Then, at operation 1806, the gNB may transmit an AP TRS to the UE at slot n+k+k_trs, where k_trs is the triggering offset associated with UE receiving an AP TRS in terms of number of slots. The AP TRS is configured for the SCell activation beforehand. No triggering for the TRS is needed, which reduces signaling overhead and latency. In case that multiple AP TRSs are configured for the SCell activation, one of them is configured as the default, and the default AP TRS is sent while other AP TRSs will not be sent; some embodiments are described before. The MAC CE may also be enhanced to include a trigger for one of the AP TRSs to be selected. The AP TRS may be repeated within one slot or across different slots. Then, if the SCell's activation process is also configured with a default AP SRS with triggering offset k_srs, at operation 1808, an AP SRS may also be transmitted by the UE in slot n+k+k_srs. The default AP SRS may be identified based on that it is the default AP SRS for the BWP associated with the triggered AP TRS. No triggering for the SRS is needed, which reduces signaling overhead and latency. It may be preferred to have the SRS to be sent after the TRS so that the tracking achieved from the TRS can be applied to the SRS transmission, so in generally the network could ensure k_srs>k_trs. An alternative is that the AP SRS is sent in slot n+k+k_trs+k_srs, which ensures that the SRS is later than the TRS. If the TRS is transmitted in multiple slots, the AP SRS may be sent in slot n+k+k_trs+k_trs_length+k_srs, where k is a number of slots with AP TRS transmissions and k_trs_length is specified in a RRC configuration or standard, such as k_trs_length=2, 4, etc., which ensures that the SRS is based on sufficient time-domain samples of the TRS, such as for pathloss estimation purpose discussed later. However, in either case, the time gap between receiving the TRS and sending the SRS can be shorter than the time gap between receiving the TRS and receiving an AP CSI-RS since the SRS can be sent without waiting for AGC to settle (which is needed for receiving CSI-RS in general). As long as the tracking is acquired by the UE from the AP TRS, the UE is ready to send the SRS. Thus, in an embodiment, the AP SRS slot is n+k+k_trs+t_srs, where t_srs<k_srs and is a value specified by the network. For example, t_srs may be 1 slot (i.e., the SRS can be sent the slot right after the TRS if the frame structure allows (e.g., it is an UL slot or a flexible slot with UL symbols)). Based on the SRS, the gNB can derive partial DL MIMO CSI for FDD system, full DL MIMO CSI for TDD system, and full UL MIMO CSI and UL power control/timing advance information for FDD/TDD. The slot that the SRS is sent can be viewed as the time that the SCell activation is completed (i.e., the SCell is activated at operation 1810), if no default AP CSI-RS is configured for the SCell activation. Note that if a default AP CSI-RS is also configured/identified for the SCell activation process, the UE may also receive an AP CSI-RS, which may be after the TRS, before or after the CSI-RS, but the SCell activation is done before the AP CSI report is sent, that is, the SRS-based CSI acquisition and SCell activation could be faster than the CSI-RS based CSI acquisition and SCell activation. However, in some cases, the UL slots/symbols are sparse in time, and then the SRS-based activation may be slower. Comparing the SRS-based activation and CSI-RS based activation, depending on how the slots/parameters are configured and at what time the activation command is sent, one could be faster than the other, which is known to the gNB and the gNB can choose. In addition, if the gNB needs CQI and/or DL interference information, the CSI-RS based activation can provide such information and can be used. If the gNB needs DL full MIMO CSI, UL CSI/TA/power control information but not DL interference information, the SRS based activation can provide such information and can be used; the activation is done after the SRS is sent, but a CSI report may still be sent after the activation is done. The AP TRS relies on a cross-carrier signal, such as the AP TRS is QCLed with a cross-carrier SSB or a cross-carrier P/SP TRS with QCL Type A and QCL Type D (for FR2). The cross-carrier SSB or P/SP TRS could be on an activated carrier which is generally an intra-band carrier, and could be configured/received for the UE before the activation process starts. In another embodiment, in case of the cross-carrier SSB or P/SP TRS not configured or not transmitted as that carrier is also deactivated, the AP TRS may be repeated in consecutive slots on or after n+k_trs so that the UE can derive sufficient tracking information from the AP TRS. Finally, if the AP TRS is QCLed with a P/SP TRS, and that P/SP TRS automatically starts after the SCell activation is completed if the P/SP TRS is configured with the AP TRS at operation 1812.

FIG. 19 illustrates an embodiment for activation and RS triggering. FIG. 19 illustrates a diagram for a fourth example embodiment for SCell activation triggering and activation. As shown in FIG. 19, at operation 1902, the gNB sends an L1 activation and AP TRS trigger for a deactivated SCell at slot n. The AP TRS and its triggering information are configured for the SCell beforehand. In case that multiple AP TRSs are configured for the SCell activation and one default AP TRS is configured, the AP TRS trigger can indicate one AP TRS different from the default. The AP TRS trigger is carried in a MAC CE in a PDSCH sent on an activated serving cell in slot n. Then, at operation 1904, the gNB may transmit an AP TRS to the UE at slot n+k+k_trs, where k_trs is the triggering offset associated with UE receiving an AP TRS in terms of number of slots. This could be related to UE capability, and after the UE reports the capability, the gNB configures AP TRS triggering offset. This allows the UE to have sufficient time to prepare for receiving the AP TRS. Based on the received AP TRS, the UE can perform AGC settling, time/frequency tracking, etc. The AP TRS may be repeated within one slot or across different slots. Then, if the SCell's activation process is also configured with a default AP CSI-RS with triggering offset k_csi-rs, at operation 1906, an AP CSI-RS may also be transmitted to the UE in slot n+k+k_csi-rs. No triggering for the CSI-RS is needed, which reduces signaling overhead and latency. It may be preferred to have the CSI-RS to be received after the TRS so that the AGC/tracking achieved from the TRS can be applied to the CSI-RS reception and processing, so in generally the network could ensure k_csi-rs>k_trs. An alternative is that the AP CSI-RS is sent in slot n+k_trs+k_csi-rs, which ensures that the CSI-RS is later than the TRS. If the TRS is transmitted in multiple slots, the AP CSI-RS may be sent in slot n+k+k_trs+k_trs_length+ k_csi-rs, where k_trs_length is a number of slots with AP TRS transmissions and k_trs_length is specified in a RRC configuration or standard, such as k=2, 4, etc., which ensures that the CSI-RS is based on sufficient time-domain samples of the TRS. If the SCell's activation process is also configured with a default AP SRS with triggering offset k_srs, an AP SRS may also be transmitted by the UE in slot n+k+k_srs at operation 1908. No triggering for the SRS is needed, which reduces signaling overhead and latency. It may be preferred to have the TRS to be sent after the TRS so that the tracking achieved from the TRS can be applied to the SRS transmission, so in generally the network could ensure k_srs>k_trs. An alternative is that the AP SRS is sent in slot n+k_trs+k_srs, which ensures that the SRS is later than the TRS. The CSI-RS could be before the SRS or after the SRS if both are configured, depending on the parameters. Based on the CSI-RS, the UE may generate AP CSI report, which could include at least a valid CQI. Then, at operation 1910, the UE may send the report the gNB. The slot that the report with the valid CQI is sent can be viewed as the time that the SCell activation is completed (i.e., the SCell is activated at operation 1912). One embodiment is that the AP TRS relies on a cross-carrier signal, such as the AP TRS is QCLed with a cross-carrier SSB or a cross-carrier P/SP TRS with QCL Type A and QCL Type D (for FR2). The cross-carrier SSB or P/SP TRS could be on an activated carrier which is generally an intra-band carrier, and could be configured/received for the UE before the activation process starts. In another embodiment, in case of the cross-carrier SSB or P/SP TRS not configured or not transmitted as that carrier is also deactivated, the AP TRS may be repeated in consecutive slots (with gaps in between if needed) on or after n+k+k_trs so that the UE can derive sufficient tracking information from the AP TRS. The AP TRS is still QCLed with a P/SP TRS, and that P/SP TRS automatically starts after the SCell activation is completed if the P/SP TRS is configured with the AP TRS at operation 1914.

FIG. 20 illustrates a diagram for a fifth example embodiment for SCell activation triggering and activation. As shown in FIG. 20, at operation 2002, the gNB sends an L2 activation and AP CSI-RS trigger for a deactivated SCell at slot n. The AP CSI-RS and its triggering information are configured for the SCell beforehand. In case that multiple AP CSI-RSs are configured for the SCell activation and one default AP CSI-RS is configured, the AP CSI-RS trigger can indicate one AP CSI-RS different from the default. The AP CSI-RS trigger is carried in a PDSCH sent on an activated serving cell in slot n. Then, at operation 2004, the gNB may transmit an AP TRS to the UE at slot n+k+k_trs, where k_trs is the triggering offset associated with UE receiving an AP TRS in terms of number of slots, and the AP TRS is configured for the SCell beforehand. No triggering for the TRS is needed, which reduces signaling overhead and latency. Based on the received AP TRS, the UE can perform AGC settling, time/frequency tracking, etc. The AP TRS may be repeated within one slot or across different slots. Then, at operation 2006, the AP CSI-RS may be transmitted to the UE in slot n+k+k_csi-rs. It may be preferred to have the CSI-RS to be received after the TRS so that the AGC/tracking achieved from the TRS can be applied to the CSI-RS reception and processing, so in generally the network could ensure k_csi-rs>k_trs. An alternative is that the AP CSI-RS is sent in slot n+k+k_trs+k_csi-rs, which ensures that the CSI-RS is later than the TRS. If the TRS is transmitted in multiple slots, the AP CSI-RS may be sent in slot n+k+k_trs+k_trs_length+k_csi-rs, where k_trs_length is a number of slots with AP TRS transmissions and k_trs__length is specified in a RRC configuration or standard, such as k_trs_length=2, 4, etc., which ensures that the CSI-RS is based on sufficient time-domain samples of the TRS. If the SCell's activation process is also configured with a default AP SRS with triggering offset k_srs, an AP SRS may also be transmitted by the UE in slot n+k+k_srs. No triggering for the SRS is needed, which reduces signaling overhead and latency. It may be preferred in some embodiments to have the SRS to be sent after the TRS so that the tracking achieved from the TRS can be applied to the SRS transmission, so in generally the network could ensure k_srs>k_trs. An alternative is that the AP SRS is sent in slot n+k+k_trs+ k_srs, which ensures that the SRS is later than the TRS. The CSI-RS could be before the SRS or after the SRS if both are configured, depending on the parameters. Based on the CSI-RS, the UE may generate AP CSI report, which may include at least a valid CQI. Then, at operation 2008, the UE may send the report the gNB. The slot that the report with the valid CQI is sent can be viewed as the time that the SCell activation is completed (i.e., the SCell is activated at operation 2010). Note that even if the SRS is sent before the CSI-RS, in the case of SCell activation initiated by an AP CSI-RS trigger, the activation is done only after the CSI report is sent. One embodiment is that the AP TRS relies on a cross-carrier signal, such as the AP TRS is QCLed with a cross-carrier SSB or a cross-carrier P/SP TRS with QCL Type A and QCL Type D (for FR2). The cross-carrier SSB or P/SP TRS could be on an activated carrier which is generally an intra-band carrier, and could be configured/received for the UE before the activation process starts. In another embodiment, in case of the cross-carrier SSB or P/SP TRS not configured or not transmitted as that carrier is also deactivated, the AP TRS may be repeated in consecutive slots (with gaps in between if needed) on or after n+k+k_trs so that the UE can derive sufficient tracking information from the AP TRS. The AP TRS is still QCLed with a P/SP TRS, and that P/SP TRS automatically starts after the SCell activation is completed if the P/SP TRS is configured with the AP TRS at operation 2012.

Figure 21:
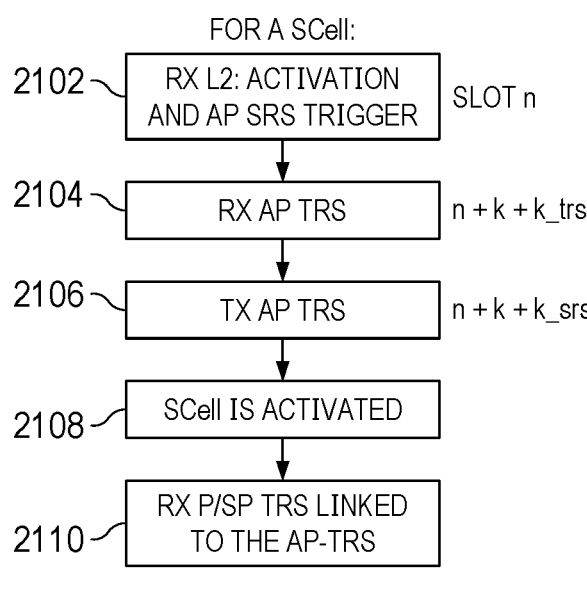
FIG. 21 illustrates SCell activation triggering and activation according to example embodiments presented herein.

FIG. 21 illustrates a diagram for a sixth example embodiment for SCell activation triggering and activation. As shown in FIG. 21, at operation 2102, the gNB sends an L2 activation and AP SRS trigger for a deactivated SCell at slot n. The AP SRS and its triggering information are configured for the SCell beforehand. In case that multiple AP SRSs are configured for the SCell activation and one default AP SRS is configured, the AP SRS trigger can indicate one AP SRS different from the default. The AP SRS trigger is carried in a MAC CE in a PDSCH sent on an activated serving cell in slot n. Then, at operation 2104, the gNB may transmit an AP TRS to the UE at slot n+k+k_trs, where k_trs is the triggering offset associated with UE receiving an AP TRS in terms of number of slots, and the AP TRS is configured for the SCell beforehand. No explicit triggering for the TRS is needed, which reduces signaling overhead and latency. Based on the received AP TRS, the UE can perform AGC settling, time/frequency tracking, etc. The AP TRS may be repeated within one slot or across different slots. Then, at operation 2106, the AP SRS may be transmitted by the UE in slot n+k+k_srs. It may be preferred in some embodiments to have the SRS to be sent after the TRS so that the tracking achieved from the TRS can be applied to the SRS transmission, so in generally the network could ensure k_srs>k_trs. An alternative is that the AP SRS is sent in slot n+k+k_trs+ k_srs, which ensures that the SRS is later than the TRS. If the TRS is transmitted in multiple slots, the AP SRS may be sent in slot n+k+k_trs+k_trs_length+k_srs, where k_trs_len- gth is a number of slots with AP TRS transmissions and k_trs_length is specified in a RRC configuration or standard, such as k_trs_length=2, 4, etc., which ensures that the SRS is based on sufficient time-domain samples of the TRS, such as for pathloss estimation purpose discussed later. Then, if the SCell's activation process is also configured with a default AP CSI-RS with triggering offset k_csi-rs, an AP CSI-RS may also be transmitted to the UE in slot n+k+ k_csi-rs. It may be preferred to have the CSI-RS to be received after the TRS so that the AGC/tracking achieved from the TRS can be applied to the CSI-RS reception and processing, so in generally the network could ensure k_csi- rs>k_trs. An alternative is that the AP CSI-RS is sent in slot n+k+k_trs+k_csi-rs, which ensures that the CSI-RS is later than the TRS. The CSI-RS could be before the SRS or after the SRS if both are configured, depending on the parameters. Based on the CSI-RS, the UE may generate AP CSI report, which could include at least a valid CQI. Then, the UE may send the report the gNB. The slot that the AP SRS is sent can be viewed as the time that the SCell activation is completed (i.e., the SCell is activated at operation 2108). Note that even if the SRS is sent after the CSI-RS, in the case of SCell activation initiated by an AP SRS trigger, the activation is done only after the SRS is sent. One embodiment is that the AP TRS relies on a cross-carrier signal, such as the AP TRS is QCLed with a cross-carrier SSB or a cross-carrier P/SP TRS with QCL Type A and QCL Type D (for FR2). The cross-carrier SSB or P/SP TRS could be on an activated carrier which is generally an intra-band carrier, and could be configured/received for the UE before the activation process starts. In another embodiment, in case of the cross-carrier SSB or P/SP TRS not configured or not transmitted as that carrier is also deactivated, the AP TRS may be repeated in consecutive slots (with gaps in between if needed) on or after n+k_trs so that the UE can derive sufficient tracking information from the AP TRS. The AP TRS is still QCLed with a P/SP TRS, and that P/SP TRS automatically starts after the SCell activation is completed if the P/SP TRS is configured with the AP TRS at operation 2110.

Figure 22A:
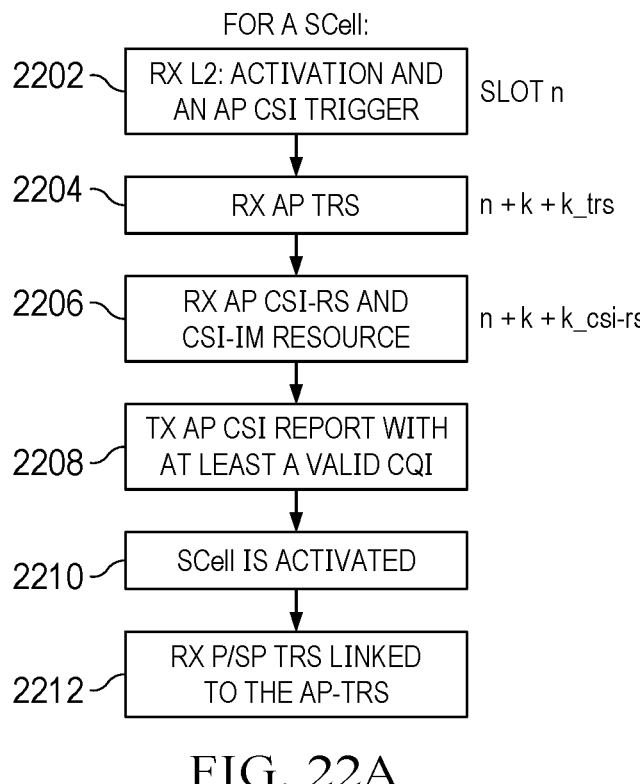
FIG. 22A illustrates SCell activation triggering and activation according to example embodiments presented herein.

FIG. 22A illustrates a diagram for a seventh example embodiment for SCell activation triggering and activation. As shown in FIG. 22A, at operation 2202, the gNB sends an L2 activation and AP CSI reporting trigger for a deactivated SCell at slot n. The AP CSI reporting and its associated CSI-RS/CSI-IM and its triggering information are configured for the SCell beforehand. The operations 2202-2212 of the timeline in FIG. 22 is similar to the embodiment with L2 activation and AP CSI-RS trigger of operations 2002-2212 in FIG. 20, with the addition that the CSI-IM is sent at the same slot as the CSI-RS at operation 2206 in FIG. 22. Since both CSI-RS and CSI-IM are triggered jointly, the trigger is no longer called an AP CSI-RS trigger but an AP CSI reporting trigger. In an embodiment, the CSI-IM may be in a different slot from the CSI-RS.

An AP TRS is generally not a standalone RS (i.e., it relies on a P/SP TRS). In particular, the AP TRS is QCLed to the P/SP TRS. The reliance for a deactivated SCell is examined when the AP TRS is a temporary RS used to facilitate the activation. In TS 38.214, TRS is specified as "Periodic CSI-RS resource in one set and aperiodic CSI-RS resources in a second set, with the aperiodic CSI-RS and periodic CSI-RS resource having the same bandwidth (with same RB location) and the aperiodic CSI-RS being configured with qcl-Type set to 'type-A' and 'typeD', where applicable, with the periodic CSI-RS resources." That is, the existing standards do not allow AP TRS to be used without the associated P/SP TRS. Furthermore, the RSs QCLed with TRS rely on both P/SP TRS and AP TRS but not AP TRS alone. The QCL relations involving AP/P/SP TRS are illustrated as the "Legacy" part in the figure below. In some embodiments, an AP TRS and it QCL source, a P/SP TRS, or the multiple transmission occasions/resources of the same TRS, are the same RS; that is, for a NZP-CSI-RS-ResourceSet configured with the higher layer parameter trs-Info, the UE shall assume the antenna port with the same port index of the configured NZP CSI-RS resources in the NZP-CSI-RS-ResourceSet may be the same.

Figure 22B:
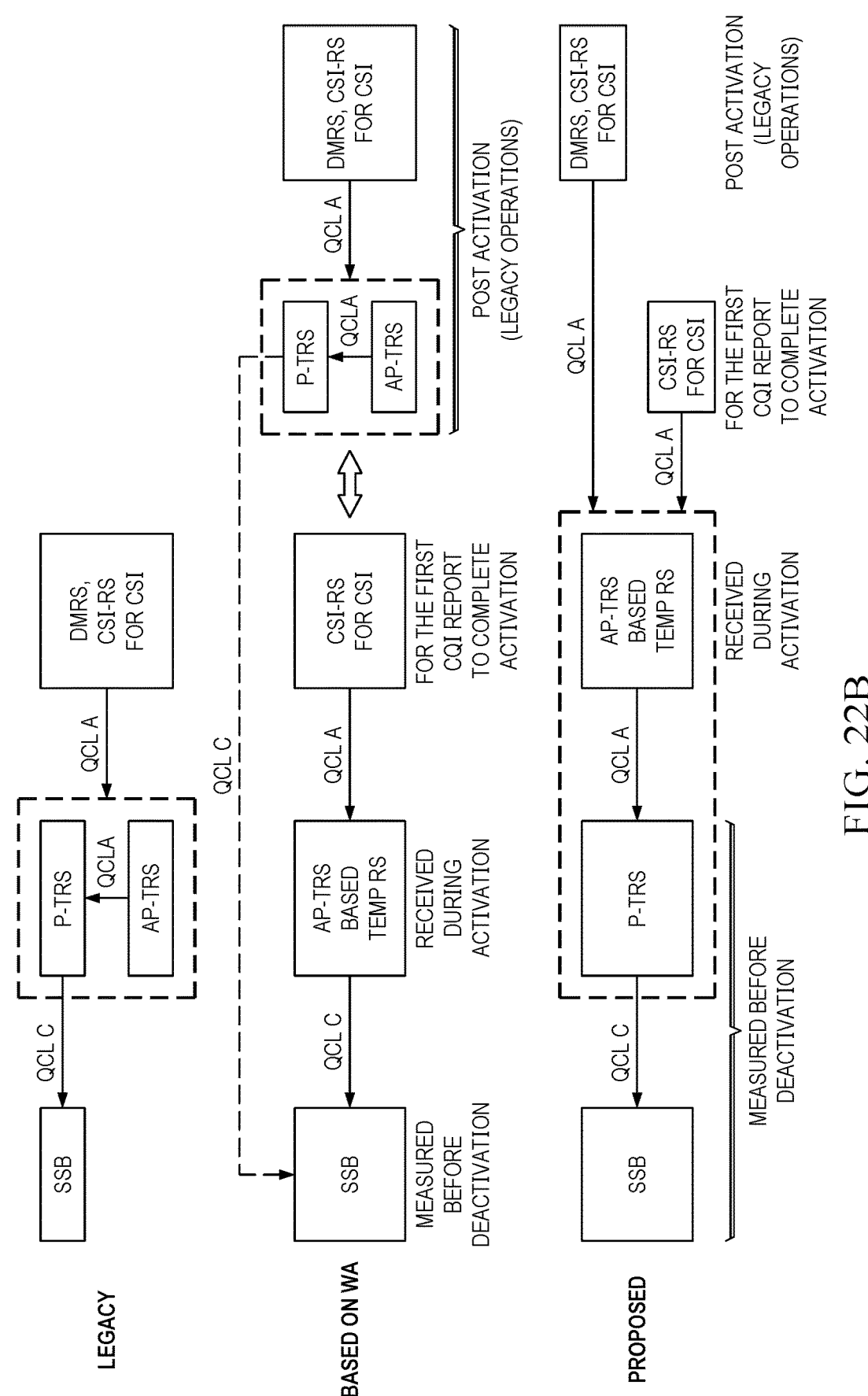
FIG. 22B illustrates QCL relations for FR1 according to example embodiments presented herein.
Figure 22C:
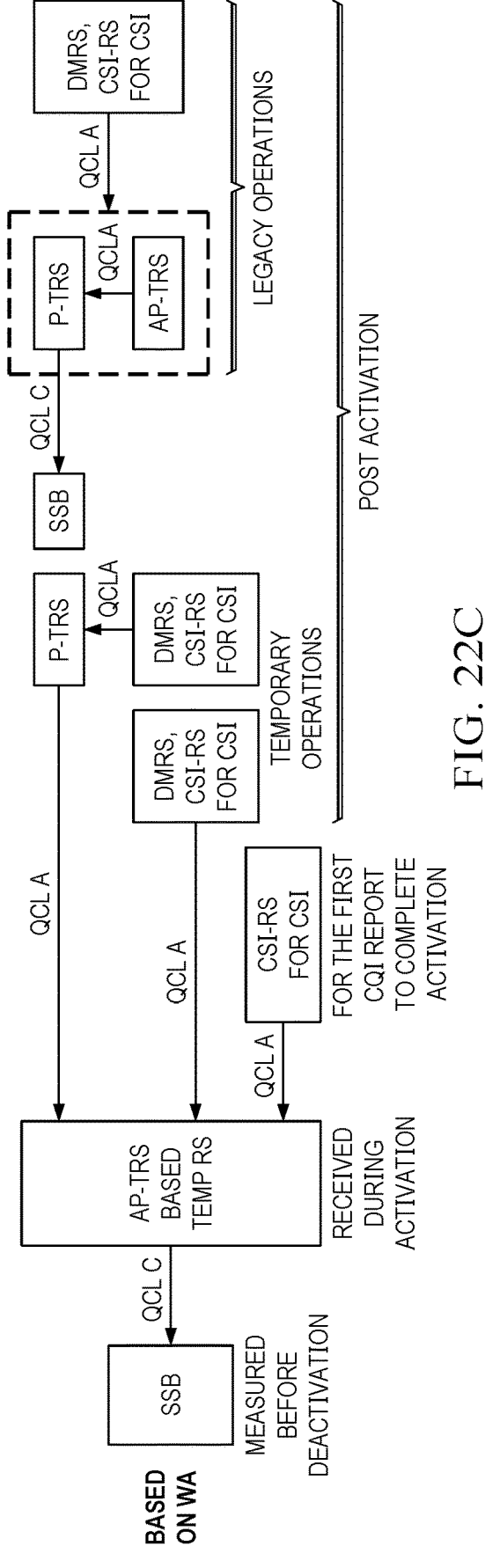
FIG. 22C illustrates an option of the post-activation QCL source RS being different from the AP TRS as the temporary RS according to example embodiments presented herein.

FIG. 22B illustrates QCL relations for FR1, according to some embodiments. The QCL type D may be included in FR2. As an illustrative example, SP TRS is not included, but P TRS in FIG. 22B may be replaced by an SP TRS.

This disclosure now examines the reliance for a deactivated SCell when the AP TRS is a temporary RS used to facilitate the activation. The QCL relations are illustrated in the "Based on WA" part of FIG. 22B. Comparing to the "Legacy" part and "Based on WA" part, two differences can be shown with one possible issue:

Difference 1: The AP TRS based temporary RS is no longer QCLed with Type A with any RS. The UE has to acquire Delay Spread and Doppler Spread based on the AP TRS, rather than deriving from another RS (e.g., P/SP TRS).

Difference 2: The CSI-RS for the first CQI report to complete the SCell activation has to be QCLed with the AP TRS based temporary RS without the associated P/SP TRS.

Possible Issue: how the DMRS for data and CSI-RS for CSI after the SCell activation are associated with the AP TRS based temporary RS without the associated P/SP TRS.

First of all, even though the DMRS for data and CSI-RS for CSI are after the SCell activation, SCell activation procedure design should not cause negative impact on the post-activation operations. For example, if additional time is needed after a "faster" activation using the AP TRS based temporary RS without the associated P/SP TRS, then the UE may not be able to receive high-speed data quite a while after the activation, which may defeat the purpose of "faster" activation. Efficient SCell activation allow the UE to perform high-speed communications on the SCell earlier than the legacy procedure, not just sending an earlier indication of completing the activation.

As one option, the post-activation QCL source RS (the P/SP TRS) may be different from (i.e., not QCLed with) the AP TRS as the temporary RS. The drawback of this option is that the UE has to acquire the P/SP TRS after the activation and then receive data, which causes extra delay. In addition, to acquire the P/SP TRS, since the P/SP TRS is QCLed with SSB, the UE still has to first acquire SSB, which is periodic but the periodicity may not be short, and then acquire P/SP TRS. High-efficiency data transmission will be after that, but the latency is long.

As another option, the AP TRS as the temporary RS serves as the QCL source RS for the post-activation DMRS/CSI-RS, and the AP TRS is bi-directionally QCLed with a P/SP TRS. After the P/SP TRS is transmitted, the AP/P/SP TRS jointly serves as the QCL source for DMRS/CSI-RS. This may require additional specification support, such as DMRS/CSI-RS QCLed with AP TRS without associated P/SP TRS, P/SP TRS QCLed with AP TRS with Type A (i.e., AP TRS and P/SP TRS bi-directionally QCLed with each other with Type A). An embodiment of this option is illustrated below in FIG. 22C.

More details of the embodiment are provided below

QCL source for temp RS: The pre-deactivation SSB is the QCL source with Type C for the temporary AP TRS in case of known SCell.

RS using temp RS as QCL source: The temporary AP TRS serves as the QCL source for other RS following it, until the first P/SP TRS burst is sent. The first P/SP TRS burst after the temporary AP TRS also uses the temporary AP TRS as the QCL source temporarily. After the first P/SP TRS burst, the first P/SP TRS becomes the QCL source for DMRS and CSI-RS.

After these post-activation temporary operations based on the temporary RS (marked by the reception of the first P-TRS burst), the UE resumes legacy operations. The P/SP TRS after the first P/SP TRS burst is QCLed with SSB as in legacy systems, but it does not have to wait for the SSB to be transmitted since it is the same RS as the AP TRS in the temporary RS.

Note that the TRSs in the diagram are the same TRS (in terms of the RS RE locations in the slot, bandwidth, etc., other than the P/SP/AP time-domain behavior). If another TRS is used, e.g., with a different beam, then beam switching and other latency are expected. In general, for two different TRSs, each of them is QCLed to SSB with Type C (and also Type D for FR2), but no QCL relation is defined between the two different TRSs. So even after UE acquires TRS1 during the activation using TRS1 based temporary RS, the UE still has to acquire SSB and then TRS2, i.e., the properties acquired from the activation based on TRS1 may not help the reception of TRS2. In other words, the existing QCL not only defines the QCL relation between source RS and target RS, but also the timing ordering of receiving them at least during the activation, i.e., the UE has to receive/process the source RS before it can receive/process the target RS.

Thus, in any case, it may be needed that AP TRS in the temporary RS and the post-activation P/SP TRS are the same TRS so that the post-activation P/SP TRS can utilize temporary RS, since there is no QCL relation defined between different TRSs. If another TRS is to be used, that TRS may only be used after the UE acquires SSB.

Therefore, the working assumption may require some backward incompatible operations for the UE.

Alternatively, embodiments this disclosure may bring P/SP TRS to be aligned with existing designs, which is shown in the "Proposed" part of FIG. 22B.

First, for a known SCell, the time/frequency synchronization is still maintained with sufficient accuracy, and the channel properties derived from the SSB and/or associated P/SP TRS are still valid for the AP TRS to use. Then, there is no issue with the QCL for AP TRS. This has been confirmed by RAN4 for FR1/FR2. For FR1, if the known SCell measurement cycle is no larger than 160 ms, 1 burst of 2 slots with 4 AP CSI-RS resources as TRS is sufficient for time/frequency tracking, and if the known SCell measurement cycle is larger than 160 ms, 2 bursts of AP CSI-RS resources as TRS are sufficient for AGC and time/frequency tracking. For FR2, 1 burst of 2-slot AP CSI-RS resources as TRS is sufficient for fine timing tracking. Therefore, the SSB and/or associated P/SP TRS of the to-be-activated SCell is the QCL source for the temporary AP TRS in case of known SCell. RAN1 can focus on these cases for now for the temporary RS design and QCL discussions.

If the above assumption does not hold for some cases, then other solutions need to be provided for the QCL of the AP TRS. One is that the AP TRS can rely on a cross-carrier signal as described before, such as the AP TRS is QCLed with a cross-carrier SSB or a cross-carrier P/SP TRS, and the QCL type may be further discussed. The cross-carrier SSB or P/SP TRS could be on an activated carrier which is generally an intra-band carrier and could be configured/received for the UE before the activation process starts. In another solution, in case of the cross-carrier SSB or P/SP TRS is not available, the AP TRS may be transmitted in consecutive slots according to the design of the associated P/SP TRS so that the UE can derive sufficient tracking information from the TRS.

After the transmission of AP TRS during activation, it could serve as the QCL source for other RS(s) after it, including P/SP TRS, P/SP/AP CSI-RS, P/SP/AP SRS. However, after a transmission of P/SP TRS, the P/SP TRS, or the P/SP and AP TRS jointly, can be used as the QCL source for RS(s) after it.

For an unknown SCell, most likely the SSB (or RS based on SSS/PSS) needs to be transmitted, possibly based on a trigger over periodic SSB, and then the P/SP/AP TRS may be transmitted. The activation latency may be long, so it may be desirable to avoid the case of an SCell becomes unknown via a long-periodicity RS.

Therefore, the P/SP TRS associated with the temporary AP TRS may be the QCL source with Type A for the temporary AP TRS in case of known SCell. The temporary AP TRS and the QCLed P/SP TRS may serve as the QCL source for other RS following it, including P/SP TRS if sent after the AP TRS, and the AP/P/SP TRS serves as the QCL source for other RS after the P/SP TRS. The proposed embodiment option is summarized below.

QCL source for temporary RS: The pre-deactivation P/SP TRS associated with the temporary AP TRS may be the QCL source with Type A for the temporary AP TRS in case of known SCell. The AP TRS and the QCLed P/SP TRS may be the joint QCL source for the temporary RS. This may also be applicable to other embodiments in this document. With this understanding, the gNB can trigger an AP TRS burst before the SCell is deactivated, to help the UE best maintain the properties acquired from the TRS and hence facilitate the temporary RS based activation.

RS using temporary RS as QCL source: The temporary AP TRS and the QCLed P/SP TRS (jointly) may serve as the QCL source for other RS following it, including P/SP TRS if sent after the temporary AP TRS, and the AP/P/SP TRS (jointly) may serve as the QCL source for other RS after the P/SP TRS. In other words, TRS of the same parameters may be QCLed with each other, and one occasion can use previous occasion(s) as QCL source.

Restriction of temporary RS based activation: For R17 SCell fast activation, P/SP TRS associated with one of the temporary RSs may need to be transmitted/active pre-deactivation and post-activation. Otherwise, a more complicated design needs to be provided. That is, pre-deactivation P/SP TRS, temporary AP TRS, and post-activation P/SP/AP TRS, may be the same TRS to enable fast activation. This could be the UE assumption/expectation.

The MAC CE trigger may select only the temporary RS with transmitted/active P/SP TRS before the deactivation. If only m such P/SP TRSs were transmitted/active, the UE may expect one of the associated temporary RSs to be triggering by the temporary RS triggering MAC CE. In some embodiments, SP TRS is not supported, so all the configured TRSs are transmitted periodically, and they can be temporary RSs; in other words, temporary RS configurations can only be selected from those configured TRSs in some embodiments.

In the embodiments above, the P/SP TRS used after the activation may be desired to the same as the AP TRS used in the temporary RS (in terms of the RS RE locations in the slot, bandwidth, etc., other than the P/SP/AP time-domain behavior), even though they may be given different names such CSI-RS for tracking versus temporary RS. Otherwise, since P/SP TRS may need to be QCLed with SSB, the P/SP TRS cannot directly use the time/frequency tracking and other properties acquired from the temporary RS. If the P/SP TRS and the AP TRS are the same, the P/SP TRS can be received by the UE and used as the QCL source for RS afterwards. In an embodiment, when an AP TRS based temporary RS is triggered by a MAC CE, the associated SP TRS with the same TRS configuration, may also be activated and become active. The P/SP TRS may (or may not) be utilized by the UE for SCell activation; more embodiments are provided below for UE behaviors of handling P/SP TRS associated with the AP TRS based temporary RS. In an embodiment, an AP TRS used in a temporary RS may be a TRS that is also configured as periodic for the SCell, or (if supported) may be configured as semi-persistent for the SCell and can only be triggered as a temporary RS provided that the SP TRS activation MAC CE is sent during the SCell activation process, such as in the same slot as the SCell activation MAC CE. Otherwise, the TRS may not be allowed to be configured or triggered as part of a temporary RS. In an embodiment, if an AP TRS used in a temporary RS may be a TRS that is not configured as periodic but as semi-persistent for the SCell, the SP TRS is activated (without SP TRS activation MAC CE) when the AP TRS based temporary RS is triggered. That is, the UE can receive P/SP TRS associated with the AP TRS based temporary RS, and the tracking properties gained by the UE using the temporary RS during the SCell activation can be directly used by the UE for post-activation RS/data transmissions/ receptions without the need for waiting for SSB. In an embodiment, for the temporary RS based SCell activation, the UE may not expect to receive data with DMRS QCLed to a TRS not the same as that in the temporary RS, until the UE receives at least one SSB and one burst of the TRS (source for the DMRS). The UE may not report CSI based on a CSI-RS QCLed to a TRS not the same as that in the temporary RS, until the UE receives at least one SSB and one burst of the TRS (source for the CSI-RS).

As described above, for different cases with different requirements on AGC/cell detection/tracking, RS transmissions (including a number of TRS burst(s) and a number of SSB burst(s)) may be different. A summary is provided in below Table 5.

tracking, the 2 TRS bursts are to be sent in that order with a gap in between (e.g., 2 slots or 2 ms). For the 6th row with 1 TRS burst for AGC, m2 SSB bursts for cell detection, and 1 TRS burst for tracking, the RS are to be sent in the order of (1 TRS burst, gap, m2 SSB bursts with gaps in between, gap, 1 TRS burst). The network may just signal Row 6 (e.g., ID 6) in a MAC CE to trigger the RS transmissions. In one embodiment, a part of a row, e.g., (m1 SSB, gap, m2 SSB), is assigned with an ID, and one or more IDs need to be signaled to the UE to for the complete activation process.

A summary is provided in below Table 6 for cases with complete RAN4 inputs.

TABLE 6

Summary of the number of 2-slot TRS burst and number of SSB
transmissions (numbers in the table are for
2-slot TRS bursts unless otherwise specified)

| | Cases covered | Triggering offset | Temp RS Tx cfg | Gap between bursts | Temp RS cfg ID |
|---|---|---|---|---|---|
| FR1 SCell | Case 1a | $K_{TRS}$ | 1 TRS burst | N/A | 0 |
| | Case 1b and | $K_{TRS}$ | 2 TRS bursts | 2 ms or | 1 |

TABLE 5

Summary of the number of 2-slot TRS bursts and number of SSB transmissions
(numbers in the table are for 2-slot TRS bursts unless otherwise specified)

| Cases for SSB/the number of TRS bursts needed | | | AGC | Cell detection | Time-frequency tracking | Fine timing tracking | |
|---|---|---|---|---|---|---|---|
| Known cell | FR1 | Meas cycles ≤ 160 ms | 0 | 0 | 1 | N/A | Row 1 |
| | | Meas cycles > 160 ms | 1 | 0 | 1 | N/A | Row 2 |
| | FR2 | w/activated intra-band cell | 0 | 0 | 1 | TBD | Row 3 |
| | | w/o activated intra-band cell | 0 | 0 | 0 | 1 | Row 4 |
| Unknown cell | FR1 | w/activated intra-band contiguous cell, ΔTxP ≤ 6 dB, Ês/Iot ≥ −2 dB | 1 | 0 | 1 | N/A | Row 5 |
| | | w/activated intra-band contiguous cell, ΔTxP ≤ 6 dB, Ês/Iot < −2 dB | 1 TRS or m1 SSB | m2 SSB | 1 | N/A | Row 6 |
| | FR2 | w/activated intra-band cell | 0 | m2 SSB | 1 | TBD | Row 7 |

Note that in Row 6, when AGC is needed, 1 TRS burst or m1 SSB bursts may be transmitted, followed by m2 SSB bursts and then 1 TRS burst. When cell detection is needed, the cell detection generally requires SSB (and hence m2 SSB bursts in the table), and the AGC before the cell detection may be based on TRS or SSB.

Table 5 shows that at least 2-slot TRS burst(s) could be supported, and m1 and/or m2 SSB bursts could be supported, where m1=1 or 2 or more, and m2=1 or 2 or more. The SSB may be periodic or aperiodic (triggered by MAC CE). It could be in the order of (m1 P SSB, m2 AP SSB), or (m1 P SSB, m2 P SSB) which is the Rel-15/16 scheme, or (m1 AP SSB, m2 AP SSB), or (m1 AP SSB, m2 P SSB), but the one with the shortest delay in general is (m1 AP SSB, m2 AP SSB). A gap (e.g., 2 slots) may exist between any 2 consecutive SSB bursts.

The cases (i.e., rows) in the table may be assigned with IDs and the IDs may be selected by the MAC CE to reduce MAC signaling overhead. In each row, the RSs are sent according to the ordering from left to right, for example, for the 3rd row with 1 TRS burst for AGC and 1 TRS burst for TABLE 6-continued Summary of the number of 2-slot TRS burst and number of SSB
transmissions (numbers in the table are for
2-slot TRS bursts unless otherwise specified)

| | Cases covered | Triggering offset | Temp RS Tx cfg | Gap between bursts | Temp RS cfg ID |
|---|---|---|---|---|---|
| | Case 2a | | | 2 slots | |
| | Case 2b | $K_{TRS}$ | 1 TRS burst, 1 SSB burst, 1 TRS burst | 2 ms or 2 slots | 2 |
| FR2 SCell | Case 3 | $K_{TRS}$ | 1 TRS burst of beam 1 | N/A | 0 |
| | Case 3 | $K_{TRS}$ | 1 TRS burst of beam 2 | N/A | 1 |

Table 6 shows that some cases (e.g., Case 1b and Case 2a) can be supported with the same temporary RS design. As described above, typically the triggering offset can be set as the minimum scheduling offset Ko (except for some embodiments as shown below to handle P/SP TRS and SSB), and the gap between the bursts should be set according to the minimum required value decided by RAN4 (except for some embodiments as shown below to handle P/SP TRS and SSB), to speed up the activation. Furthermore, for FR1, typically one TRS configuration on the BWP with ID firstActiveDownlinkBWP-Id may be sufficient, and for FR2, one TRS configuration per beam pair may be sufficient. Therefore, for a FR1 SCell, there are 3 temporary RS configurations as listed in the table may need to be supported to cover all cases, and for FR2, one temporary RS configuration per beam is sufficient. Each row of the table may form a temporary RS configuration and can be associated with an ID for triggering purpose. Note that if the temporary RS reuses NZP CSI-RS resource set information element which may already be configured with an aperiodicTriggeringOffset, the configured offset may be ignored for any bursts in the temporary RS transmission and the UE follows the offset/gap indicated in the MAC.

Therefore, an embodiment can provide temporary RS configurations to support all cases fully covered by RAN4 inputs, and each configuration is assigned with a unique ID.

Most of the embodiments in the disclosure describe the AGC/tracking/etc. for functionalities are acquired based on a temporary RS, or a temporary RS configuration, or a temporary RS resource configuration, or an AP TRS based temporary RS configuration, or a temporary RS configuration based on an AP TRS, or a temporary AP TRS transmission, or the like. In some embodiments, the AP TRS used in the temporary RS may be replaced by the following signals/RS/RS resource/RS resource set: 1) a P TRS burst and the P TRS burst may be the same RS as the AP TRS; 2) a SSB, which may be the legacy periodic SSB or new aperiodic SSB, and the TRS may be QCLed with the SSB. The motivation for these embodiments is that the during new activation procedure, it may just occur that a P TRS burst and/or SSB is sent, and the gNB/UE can utilize the P TRS burst and/or SSB. If the P TRS burst and/or SSB is transmitted (e.g., for another UE) but not utilized by the UE, the transmission(s) may be wasted and additional delay may be expected. Furthermore, the SSB may be transmitted anyway and the UE following the legacy standards will have to monitor the SSB if it is sent, and the UE behavior for activation receiving both the temporary RS and SSB needs to be defined.

If the P TRS or SSB is quite far away from the desired activation start time, the activation should be purely based on temporary RS. If the SSB is near the desired activation start time and the activation requires only one burst of the SSB, the activation should be purely based on the SSB (i.e., using the legacy activation procedure), even though it may lead to a bit longer activation compared to using temporary RS. If the P TRS or SSB is near the desired activation start time and the activation requires multiple bursts of the P TRS/SSB/temporary RS, the activation can be based on the P TRS or SSB in addition to temporary RS.

In one embodiment, if the temporary RS includes multiple bursts, one of the bursts may be replaced by the P TRS or SSB if the burst starts in the same slot as the P TRS or SSB. When this occurs, the UE may not expect the temporary RS burst starting from that slot, but it may expect the P TRS or SSB and receives/measures the P TRS or SSB. The QCL relation involving the temporary RS may need to change accordingly, such as if SSB is received, then the RS following the temporary RS may only be QCLed Type C to the SSB. In one embodiment, if the temporary RS includes multiple bursts, the first of the bursts (or a burst except for the last) may be replaced by the SSB if the burst starts in the same slot as the SSB; this is to allow the UE to acquire SSB before an AP TRS as SSB is the QCL source for TRS. In an embodiment, if there is a gap of x slots configured between the temporary RS burst and the next temporary RS burst, the next temporary RS burst may be sent one slot earlier if the temporary RS burst of 2 slots is replaced by a SSB of 1 slot. In other words, the x-slot gap now starts after the SSB slot ends. This may even shorten the activation procedure, but it may be viewed as an exception which adds extra complexity, so this embodiment may not be supported in some systems. It may seem unlikely that the P TRS or SSB would happen to be aligned with a temporary RS burst, but the gNB with the prior knowledge of transmission occasion of the P TRS or SSB and the ability of signaling the temporary RS offset and the gap, it can make this occur via proper MAC signaling parameters if the P TRS or SSB is not too far away from the activation start time.

In one embodiment, the UE may not expect any P TRS or SSB to be sent during the activation based on the temporary RS. In another embodiment, the UE does not monitor or utilize any P TRS or SSB for activation during the activation based on the temporary RS except for actions related to CSI reporting. In another embodiment, the UE does not expect any P TRS or SSB not aligned with a temporary RS burst during the activation based on multiple temporary RS bursts. In another embodiment, the UE does not monitor or utilize any P TRS or SSB not aligned with a temporary RS burst for activation during the activation based on temporary RS except for actions related to CSI reporting. In another embodiment, the UE does not expect any SSB not aligned with the first temporary RS burst during the activation based on multiple temporary RS bursts. In another embodiment, the UE does not monitor or utilize any SSB not aligned with the first temporary RS burst for activation during the activation based on temporary RS except for actions related to CSI reporting. The purpose of these embodiments is to reduce UE implementation complexity, so that the UE does not need to handle two different activation procedures at the same time. Note that even if a P TRS or SSB is not utilized during the activation, it may still be monitored by the UE for purposes not directly related to this activation. Note that, however, the UE can always utilize a P/SP TRS for CSI reporting related actions during the activation, e.g., the P/SP TRS may be used as the QCL source for CSI-RS for CSI reporting, but it may not be used in AGC/tracking intended to be done on temporary RS. In one embodiment, the UE behavior is not standardized, and it is up to the UE implementation to utilize the P/SP TRS or SSB to speed up the activation, but the minimum performance requirements may be specified assuming no presence of the P/SP TRS or SSB. Therefore, for capable UEs, they may utilize the P/SP TRS or SSB to speed up the activation, but there is no requirement for any UE to do so.

In one embodiment, the UE may monitor and utilize a SSB for the temporary RS based activation, if the SSB is after slot n+k and at least x slots before the first burst of the temporary RS, where x corresponds to the minimum gap between bursts. In one embodiment, the UE monitor and utilize a P TRS for the temporary RS based activation, if the P TRS is after slot n+k and at least x slots away from any burst of the temporary RS, where x corresponds to the minimum gap between bursts. In essence, in these embodiments, the gNB/UE uses the P TRS or SSB to replace a potential temporary RS burst and the gNB indicates one less burst to the UE.

In the above embodiments involving P TRS, the P TRS may be changed to SP TRS, which may become active when the MAC CE triggers the AP TRS based temporary RS without additional MAC semi-persistent TRS activation command, or only when MAC semi-persistent TRS activation command for this SP TRS is sent.

In an embodiment, the SCell status of unknown/known may not be understood in the same way by the UE and the gNB. Regardless of whether there are different understandings, at least the following may hold: 1) If the UE has communicated with the SCell within the last x ms (e.g., x=400), the SCell is known, and the UE/gNB may have the same understanding; 2) If the UE has not communicated with the SCell within the last y ms (e.g., y=2000), the SCell is unknown, and the UE/gNB may have the same understanding. For these certain cases, the above embodiments can be used. For the cases in between (e.g., the UE has communicated with the SCell between x and y ms and no longer since then), in an embodiment, a bit conservative design can be provided to ensure fast activation always works (e.g., by transmitting one AP SSB as part of a temporary RS). The gNB may thus assume the SCell is known only if the deactivation time has been shorter than x ms and/or the measurement cycle is shorter than y ms or the last communication with the SCell was within x ms, for which no SCell may become unknown. When the condition is not satisfied, the gNB could assume the SCell is unknown, and in an embodiment, the gNB signals the row ID (or equivalently, the RSs and their timings) assuming unknown SCell from the UE perspective and transmit the RSs accordingly. The UE could follow the signaling and should not assume the RSs are transmitted already based on the UE's understanding of the SCell status, in some embodiments. In an embodiment, the gNB may trigger the UE to report the SCell status of known/unknown so that the activation may be based on the correct status update, which may shorten the activation process.

For the rows with activated intra-band cell or activated intra-band contiguous cell, cross-carrier QCL or the like may be introduced. Embodiments are provided below.

FIG. 23 illustrates an existing QCL configuration example for carrier aggregation and new cross-carrier QCL relationship, according to some embodiments. In the existing way, the UE aggregates multiple carriers, and on the carriers, serving cells are configured, e.g., cell 1 and cell 2. Then, for each cell, QCL relationships are configured, such as for cell 1, TRS 1 is QCLed to SSB 1 with QCL Type C (and also D for FR2), and CSI-RS 1 and/or DMRS 1 is QCLed to TRS 1 with QCL Type A, and so on. There is no cross-carrier QCL relationship configured. In some embodiments, cross-carrier QCL relationships are configured/assumed. The cross-carrier QCL relationships may be for the RSs across the cells/carriers.

In an embodiment, the RSs with cross-carrier QCL relationships may be SSBs. That is, SSB 1 in cell 1 is QCLed with SSB 2 in cell 2, and/or vice versa. The UE may not need to utilize one SSB to receive the other SSB according to the cross-carrier QCL relationship as SSB is generally self-sufficient/self-contained, but the QCL relationship can inform the UE that cross-carrier QCL can be assumed. In the example, TRS 1 is QCLed with Type C (and also D for FR2) to SSB 1, and TRS 2 is QCLed with Type C (and also D for FR2) to SSB 2, and with additional cross-carrier QCL between the SSBs, then during the SCell activation, TRS 1 of the to-be-activated cell 1 may be assumed to QCL with Type C (and also D for FR2) to SSB 2 of the activated cell 2, and vice versa.

In an embodiment, the RSs with cross-carrier QCL relationships may be TRSs. That is, TRS 1 in cell 1 is QCLed with TRS 2 in cell 2, and/or vice versa. The UE may not need to utilize one TRS to receive the other TRS according to the cross-carrier QCL relationship when the SSB as the QCL source of the TRS is available, but the QCL relationship can inform the UE that cross-carrier QCL can be assumed. In the example, TRS 1 is QCLed with Type C (and also D for FR2) to SSB 1 and TRS 2, and TRS 2 is QCLed with Type C (and also D for FR2) to SSB2 and TRS 1, then during the SCell activation, TRS 1 of the to-be-activated cell 1 may be assumed to QCL with Type C (and also D for FR2) to SSB 2 and/or TRS 2 of the activated cell 2, and vice versa.

In general, if RS 1-1 (e.g., SSB 1) in cell 1 is QCLed to RS 2-1 (e.g., SSB 2) in cell 2, RS 1-2 (e.g., TRS 1) in cell 1 is QCLed to RS 1-1 with type X, and RS 2-2 (e.g., TRS 2) in cell 2 is QCLed to RS 2-1 with type X, the UE can assume RS 1-2 in cell 1 is QCLed to RS 2-1 with type X for cell 1 activation, and the UE can assume RS 2-2 in cell 2 is QCLed to RS 1-1 with type X for cell 2 activation.

The cross-carrier QCL between RS 1-1 (e.g., SSB 1) in cell 1 and RS 2-1 (e.g., SSB 2) in cell 2 may be an existing QCL type, such as Type C, Type C+D, etc., but it could be interpreted as bi-directional (i.e., the source and target in the RS pair may be flipped). This may be defined as a new QCL type. For example cell 1's SSB may be configured as QCL with cell 2's SSB. Since such a relationship is reciprocal between cell 1 and cell 2, it is not necessary to configure the reverse direction and it can be assumed by the UE. In an embodiment, the cross-carrier bi-directional QCL may become a new QCL type.

The cross-carrier QCL between RS 1-1 (e.g., SSB 1) in cell 1 and RS 2-1 (e.g., SSB 2) in cell 2 may be configured explicitly via RRC signaling or implicitly (i.e., assumed) under some conditions. For example, cell 1 and cell 2 may be serving cells in intra-band CA, cell 1 and cell 2 may be serving cells in contiguous carriers in intra-band contiguous CA, cell 1 and cell 2 may have a shared PA/RF (e.g., intra-band, in the same TAG, same numerology, aligned slot boundary/numbering), cell 1 and cell 2 may be in a serving cell set configured with one or more common properties, and so on. This may require both the UE reporting (e.g., UE capability reporting of band combinations, CA capability, etc., which reflects if the same PA/RF/filter is used for the carriers or not by the UE) and the gNB information about its operation (e.g., if the same PA/RF/filter is used for the carriers or not by the gNB, the power difference between the carriers, etc.).

When the cross-carrier QCL between RS 1-1 (e.g., SSB 1) in cell 1 and RS 2-1 (e.g., SSB 2) in cell 2 is configured or assumed, other signals QCLed to them on the respectively carriers may inherit implied QCL relationship without the need to configure the QCL relationship one by one. For example, TRS 2 can have implied cross-carrier relationship to SSB 1 and/or TRS 1 in FIG. 1, implied from the cross-carrier QCL between SSB 1 and SSB 2 and the same-carrier QCL already configured.

During the initial SCell addition or SCell reconfiguration via RRC reconfiguration message, UE can be configured to detect the TRS at the activation of the SCell. In one embodiment, the TRS transmission from an SCell and reception at the UE is triggered by the MAC CE. A default TRS can be configured to the UE. In addition, several alternative TRSs can also be pre-configured. As previously explained the triggering of transmission of the TRS at an SCell and reception at the UE is the activation of the SCell.

One example is that activation of the default TRS is triggered simply by the existing SCell activation MAC CE. FIG. M shows the existing SCell activation/deactivation MAC CE:

FIG. 24 illustrates an example SCell activation/deactivation MAC CE used for TRS activation, according to some embodiments. The MAC CE may include the following fields.

$C_i$: If there is an SCell configured for the MAC entity with SCellIndex i as specified in TS 38.331, this field indicates the activation/deactivation status of the SCell with SCellIndex i, else the MAC entity shall ignore the $C_i$ field. The $C_i$ field is set to 1 to indicate that the SCell with SCellIndex i shall be activated. The $C_i$ field is set to 0 to indicate that the SCell with SCellIndex i shall be deactivated;

R: Reserved bit, set to 0.

In this example, when a $C_i$ is set to '1', the default TRS of the SCell with index I is also activated. If the UE is configured by the TRS(s), and if the UE only received the SCell activation MAC CE (at the absence of other TRS information), the UE uses the default TRS configuration to perform the TRS detection.

Another example is to design a new SCell activation MAC CE. In the new MAC CE, in addition to the SCell activation/deactivation bits, add the alternative TRS selection bits as show in FIG. 25.

FIG. 25 illustrates a new SCell with TRS activation MAC CE with TRS selection information, according to some embodiments. In the MAC CE, the definition of Ci and R are the same as in the existing SCell activation/deactivation MAC CE. Ti1, Ti2 are the selection bits for alternative TRS if configured. A new Logic Channel ID (LCID) may be assigned to the new MAC CE.

Ti1, Ti2: if Ci is set to '1' to activate the SCell with index 1, (Ti1, Ti2) is in effect and is the index of the alternative TRS selected to be activated with the activation of SCell i.

In this example, the UE procedure is: when a $C_i$ is set to '1'. If the UE is configured by the TRS(s), the UE uses the configuration of the TRS with index (Ti1, Ti2) to perform the TRS detection. In an embodiment, Ti1 may be for the temporary RS resource configuration used for the first temporary RS burst for the SCell with index i, and Ti2 may be for the temporary RS resource configuration used for the second temporary RS burst for the SCell. If only one burst is to be sent, the corresponding Tij field may be set as 0. In another embodiment, the combination of the temporary RS resource configuration used for the first temporary RS burst and the temporary RS resource configuration used for the second temporary RS burst may be indexed and forms one field in the MAC CE. In another embodiment, the time offset of the first burst relative to slot n+k may be included as a separate field for each SCell in the MAC CE. In another embodiment, the time offset of the first burst relative to slot n+k may be included as a separate field for all SCells in the MAC CE. In another embodiment, the time gap of the first and second bursts may be included as a separate field for each SCell in the MAC CE. In another embodiment, the time gap of the first and second bursts is included as a separate field for all SCells in the MAC CE. In another embodiment, for each SCell, the parameters including the time offset, first burst RS resource configuration, gap, and the second burst RS resource configuration, form one temporary RS resource configuration for each SCell, which is assigned with a unique ID and the ID may be included in a field of the MAC CE for a SCell. The bitwidth of each SCell may be the same, (e.g., Z bits for a SCell). However, each SCell may have a different number of temporary RS parameters to be signaled, so the equal number of bits for all SCells may not be the most efficient design. In an embodiment, the bitwidth of each SCell's temporary triggering field may be determined by the total number of parameter combinations (e.g., M) for that field, and the bitwidth may be ceil(log 2(M)). If a SCell has no temporary RS configured, no field would be used for that SCell. In one embodiment, a burst may be configured using a NZP CSI-RS resource set ID and the resource set associated with this ID has to have trs-info configured. That is, it has to be a TRS. Such a TRS, as a candidate for the temporary RS (with 2 slots of 4 samples) on the BWP with firstActiveBWP-ID, may be further configured with a TRS ID or CSI-RS for tracking ID, as other CSI-RS cannot be configured as the burst(s) of the temporary RS for AGC/tracking/etc. In one embodiment, the first burst and the second burst (if configured) may always use the same TRS, and hence the second burst may not need to be explicitly configured as a field in the RRC signaling but implicitly from a field such as the number of bursts or a valid gap value. If the number of bursts field is configured only 1 burst, the gap field may be optional, ignored by the UE, or filled in with an invalid value. The number of burst field may not be needed if the gap field is supported and allows an invalid value to be configured; so if the gap field configures a valid value such as 2 ms, the UE may assume 2 bursts configured with 2 ms gap in between. But, if the gap field configures an invalid value, then the UE may assume 1 burst configured.

In order to save some signaling overhead, a new MAC CE can be designed only including the TRS selection for the activated SCells.

FIG. 26 illustrates an alternative new MAC CE including only the TRS selection bits corresponding to to-be activated SCell(s), according to some embodiments. In the example as shown in FIG. 26, SCells with index 1, 3, 6 are activated by C1, C3, and C6, the corresponding TRS selection bits are carried in the MAC CE in the next Octet: (T11, T12), (T31, T32) and (T61, T62) following the same order of C1, C3, C6. Upon receive the MAC CE, the UE decodes the TRS selection bits only for the SCell activation bits which are set to '1' (activation) and decodes the corresponding groups of the TRS selection bits following the same order as the asserted SCell activation bits. The above examples demonstrate the principle of MAC CE(s) for SCell/TRS activation without loss of generality. Enlarged MAC CE for more SCell activation can be designed in the same principle. TRS activation selection may also be separate out to be TRS activation/selection MAC CE. This example can also be applied to the embodiments designed for FIG. 25.

More alternatives for the temporary RS triggering are provided below, one based on bitmap for each SCell and the other reusing L1 AP-TRS triggering framework.

For triggering temporary RS, down-select based on the following alternatives, or let RAN2 be aware the status of this discussion Alt 1: Bitmap approach in MAC-CE Every Z-bit block in the bitmap corresponds to a SCell, Z>=0.

A Z-bit block indicates the temporary RS [configuration index], and a value zero indicated by the bit block means no RS resource transmitted.

The to-be-activated SCell is indicated via the C values in the legacy SCell activation/de-activation MAC CE or in the new MAC-CE.

Alt 2: Reuse A-TRS triggering framework

A trigger state is indicated by the MAC-CE explicitly.

The association between a trigger state and temporary RS for one or multiple SCells is configured by RRC according Rel-16 A-TRS triggering framework.

FFS: The value zero of the MAC-CE indication means no temporary RS is triggered by the MAC-CE for all to-be-activated SCells.

It is noted that he down-selection targets at a RAN1 consensus on MAC-CE functionality, and the list of RRC parameters for this feature. Any MAC-CE signaling designs above are reference concept, its final MAC-CE signaling design is up to RAN2.

These two alternative approaches are analyzed below.

Bitmap approach

For the bitmap approach, every Z-bit block in the bitmap corresponds to a SCell, and each block indicates an index of the associated temporary RS. Though this requires a new design different from existing CSI triggering framework, this approach is very straightforward to be designed and utilized, especially if there is no need to jointly encode temporary RS triggering information over multiple carriers. On the other hand, it is questionable why joint multi-carrier encoding is needed, as the current design of SCell activation/deactivation is on a per-cell basis without multi-carrier joint activation/deactivation.

Reusing existing CSI triggering framework

The existing CSI triggering framework can support AP TRS/CSI-RS/CSI-IM measurement and AP CSI reporting. A list of trigger states is provided by RRC configuration for each serving cell, and if the list is too large to fit into the CSI request field, a MAC CE subselects a sub-list for the CSI request field. Then the DCI CSI request field triggers only one of the trigger states.

As a side note, as the existing CSI triggering framework is for each cell (Aperiodic CSI Trigger State Subselection MAC CE contains serving cell ID and BWP ID), this design may not be used for joint multi-carrier triggering.

If a separate trigger state list is to be provided for temporary RS based on AP TRS (separate from the trigger state list for CSI on a BWP of a cell), this approach may not provide any advantage than the straightforward bitmap approach, especially since multi-carrier joint triggering is not motivated and cannot be supported.

If the trigger state list for CSI is augmented to include the temporary RSs (i.e., the same trigger state list is used for both CSI triggering and temporary RS triggering), the bitwidths for the CSI request field and the temporary RS triggering field will be both increased, leading to higher control signaling overhead.

This approach may be viable only if CSI acquisition based on temporary RS (CSI-RS/CSI-IM for CSI) is also supported by the MAC CE to trigger AP TRS. Some additional design below may still be needed. For each cell, 2 MAC CE fields may be needed, one for AP TRS based temporary RS and the other for AP CSI triggering. It may not be justified to combine these two fields for joint triggering, as it limits the flexibility.

For each field, a trigger state list is provided, and the current CSI triggering framework is reused for each field/list. The AP TRS trigger state list may only contain AP TRS based temporary RS (e.g., NZP CSI-RS on the BWP with ID firstActive-DownlinkBWP-Id and with trs-info). The AP CSI trigger state list may completely reuse the list for DCI format 0_1 or the list for DCI format 0_2 but restricted to the BWP with ID firstActiveDown-linkBWP-Id. Alternatively, a new list may be provided with same mechanism but only including CSI-RS/CSI-IM on the BWP with ID firstActive-DownlinkBWP-Id.

To summarize, for AP TRS based temporary RS triggering by a MAC CE, the simple bitmap approach may be sufficient, but for AP CSI triggering by MAC CE, the current AP CSI triggering framework can be largely reused.

For triggering temporary RS via MAC CE, if AP CSI acquisition via MAC CE is also supported, reusing the current AP CSI triggering framework may be supported; otherwise, the bitmap approach may be supported.

In another embodiment, based on RAN2 agreement that RRC message can be used to SCG activation, and activation of SCells at the same time of activation SCG/PSCell can reduce the delay of activation of SCells. RRC SCG activation message can be used to activate PSCell plus some or all of the SCells in the SCG. In this case, every SCG SCell's state (activated or maintaining inactivated) are instructed in the RRC message.

Bit indication of activation(1)/deactivation(0) to each SCell Index may be included in the RRC SCG activation message.

For each SCell Index with activation indication, corresponding TRS Index is specified/listed in the message, and corresponding CSI-RS and SRS may be also included to be activated together with the SCell. If the activated SCell associated TRS Index is not present, default TRS is activated.

For each SCell still maintaining in deactivated state, only deactivation indication is under each SCell index of the SCell maintaining deactivated.

If RRC SCG activation is only activating PSCell (the primary cell in the SCG), no SCell activation state information is included in the SCG activation message.

Upon received RRC SCG activation message, the UE performs the following procedure.

If the RRC SCG activation message only activates PSCell of the SCG, the UE only performs the activation procedure to the PSCell. Then, further activation of SCell(s) and the TRS is triggered by MAC CE as discussed previously.

If SCell state is included in the SCG Activation message:

the UE performs the PSCell activation procedure first (including synchronization and random access if necessary);

if an SCell Index is included, activation of the SCell is to be done:

the UE further performs SCell activation procedure;

if a TRS index is present:

the UE detects the TRS based on the index pointing to the configuration of the alternative TRS for detection;

if a TRS index is not present:

the UE detects the TRS based on the configuration of the default TRS;

if an SCell Index is included, deactivation of the SCell is to be done or maintained:

the UE maintains the SCell in deactivated state. It may be activated by MAC CE with associated TRS also activated together later on.

Regarding AP SSB, when transmitted, other UEs which are receiving DL SSB/RS/control/data from this cell may need to perform rate matching/puncturing around the AP SSB. In some embodiments, One or more of the following parameters may need to be signaled aperiodically to the UEs.

carrierFreq or ssb-Freq halfFrameIndex ssbSubcarrierSpacing

SSB-SMTC

The starting slot position of the starting SSB, e.g., as sfn-SSB-offset

The slot offset(s) for other SSB, which also conveys the number of AP SSB samples PRB locations. The PRB locations may or may not be the same as those for the SSB currently configured by the UE. If not, the PRB locations need to be signaled.

SSB-index

A flag of whether PBCH/DMRS is also present or not

In some embodiments, an AP SSB includes both PSS/SSS and PBCH if the UE needs to read the PBCH.

In some embodiments, an AP SSB includes only PSS/SSS but no PBCH and its DMRS if the UE needs to read the PBCH or the information carried in the PBCH is sent via RRC signaling from another serving cell to the UE.

In some embodiments, the following parameters from legacy rate match patterns may not be needed: periodicity, ssb-periodicity, CORSET information, etc.

In some embodiments, if the AP SSB has the same design as the periodic one monitored by the UEs, only the SSB position parameters in time domain (e.g., starting slot, slot offset(s)) and frequency domain (if different from the current SSB PRB location) and SSB-index and the flag on PBCH presence may be needed.

In some embodiments, the signaling may be in a DCI (e.g., a GC DCI or a UE-specific DCI). It may also be a MAC CE sent at the same time as the SCell activation MAC CE. To reduce the signaling overhead, some of the parameters listed above may be grouped together and pre-configured by RRC configuration signaling, and then the DCI/MAC CE can carry only the dynamic information, such as the starting slot position, which group of parameters out of multiple configured groups of parameters, etc. The signaling may only be sent if the AP SSB does not fully overlap with the periodic SSB. The UE may or may not know the signaling is for a transmission of AP SSB (e.g., it may be transparent to the UE). In the non-transparent case, existing SSB region design may be used to specify the region to be used by the UE for rate matching/no receiving. In the transparent case, the number of OFDM symbols and number of PRBs for the region may need to be specified.

In some embodiments, PDSCH may be rate matched around the AP SSB as indicated by the signaling.

In some embodiments, PDCCH candidate, if overlapped with the AP SSB on any resource element, may not be monitored by the UE. That is, a monitoring occasion overlapped with the AP SSB is not a valid monitoring occasion.

In some embodiments, for a RS transmission, if any RE falls into the signaled region, the REs are not used by the UE for measurement. In some embodiments, the RS transmission is not monitored by the UE if at least one RE falls into the signaled region.

FIG. 27A is a flowchart of a method 2700 for SCell activation, according to some embodiments. Method 2700 starts at operation 2702, where the UE receives from a base station a first signaling including a first configuration of a first channel state information reference signal (CSI-RS) for tracking for a secondary cell (SCell). The first configuration is associated with a first identifier (ID). At operation 2704, the UE receives from the base station a second signaling including a second configuration of a reference signal (RS) for fast SCell activation of the SCell. The second configuration is associated with a second ID, and the second configuration includes the first ID. At operation 2706, the UE receives from the base station a medium access control control element (MAC CE) message. The MAC CE message includes an SCell activation command indicating the UE to activate the SCell and the second ID. At operation 2708, the UE receives from the base station the RS for the fast SCell activation of the SCell. The RS includes a first burst of the first CSI-RS for tracking. At operation 2710, the UE performs SCell activation for activating the SCell based at least on the RS upon receiving the SCell activation command. At operation 2712, the UE sends to the base station a report indicating that the SCell is activated for the UE.

In some embodiments, the MAC CE message may further include a bitmap of at least one of one or more activation commands or one or more deactivation commands for corresponding multiple SCells. The MAC CE message may exclude any ID for an RS or an RS configuration for each SCell of one or more SCells to be deactivated. In some embodiments, the MAC CE message may include RS configuration IDs of the one or more SCells to be activated corresponding to the one or more activation commands. The bitmap in the MAC CE message may include activation command bits corresponding to the one or more activation commands. The RS configuration IDs may follow the bitmap in the MAC CE message in an ascending order of the one or more SCells to be activated in the bitmap. In some embodiments, the UE may perform the SCell activation by at least one of setting automatic gain control (AGC) based on the first burst or performing time and frequency synchronization or tracking for the SCell based on the first burst. In some embodiments, the RS may further include a second burst of the first CSI-RS for tracking after the first burst. A time duration between the first burst and the second burst may be associated with a gap value indicated by the second configuration. In some embodiments, the UE may perform the SCell activation by setting AGC based on the first burst and performing time and frequency synchronization or tracking for the SCell based on the second burst. In some embodiments, the RS may be aperiodic and transmitted to the UE responsive to the SCell activation command being transmitted. In some embodiments, the UE may receive the RS by receiving from the base station the RS on a first bandwidth part (BWP) in one or more BWPs of the SCell. The first BWP may be associated with a firstActiveDownlinkBWP-Id. The firstActiveDownlinkBWP-Id may be configured in an RRC message when the SCell is configured. The first BWP is activated in conjunction with the SCell being activated. In some embodiments, the first CSI-RS for tracking may be configured as an aperiodic CSI-RS for tracking on the first BWP. In some embodiments, the second configuration may further indicate an offset value associated with a delay between slot (n+k) and the first burst, slot n denotes an ending slot for the MAC CE message, and slot (n+k) denotes one slot after decoding and processing of the MAC CE message. In some embodiments, the report may include a downlink (DL) CSI.

FIG. 27B is a flowchart of a method 2750 for SCell activation, according to some embodiments. Method 2750 starts at operation 2752, where the base station transmits to a UE a first signaling including a first configuration of a first channel state information reference signal (CSI-RS) for tracking for a secondary cell (SCell). The first configuration is associated with a first identifier (ID). At operation 2754, the base station transmits to the UE a second signaling including a second configuration of a reference signal (RS) for fast SCell activation of the SCell. The second configuration is associated with a second ID, and the second configuration includes the first ID. At operation 2756, the base station transmits to the UE a medium access control control element (MAC CE) message. The MAC CE message includes an SCell activation command indicating the UE to activate the SCell and the second ID. At operation 2758, the base station transmits to the UE the RS for the fast SCell activation of the SCell. The RS includes a first burst of the first CSI-RS for tracking. The UE performs SCell activation for activating the SCell based at least on the RS upon receiving the SCell activation command. At operation 2760, the base station receives from the UE a report indicating that the SCell is activated for the UE.

In some embodiments, the MAC CE message may further include a bitmap of at least one of one or more activation commands or one or more deactivation commands for corresponding multiple SCells. The MAC CE message may exclude any ID for an RS or an RS configuration for each SCell of one or more SCells to be deactivated. In some embodiments, the MAC CE message may include RS configuration IDs of the one or more SCells to be activated corresponding to the one or more activation commands. The bitmap in the MAC CE message may include activation command bits corresponding to the one or more activation commands. The RS configuration IDs may follow the bitmap in the MAC CE message in an ascending order of the one or more SCells to be activated in the bitmap. In some embodiments, the UE may perform the SCell activation by at least one of setting automatic gain control (AGC) based on the first burst or performing time and frequency synchronization or tracking for the SCell based on the first burst. In some embodiments, the RS may further include a second burst of the first CSI-RS for tracking after the first burst. A time duration between the first burst and the second burst may be associated with a gap value indicated by the second configuration. In some embodiments, the UE may perform the SCell activation by setting AGC based on the first burst and performing time and frequency synchronization or tracking for the SCell based on the second burst. In some embodiments, the RS may be aperiodic and transmitted to the UE responsive to the SCell activation command being transmitted. In some embodiments, the base station may transmit the RS by transmitting to the UE the RS on a first bandwidth part (BWP) in one or more BWPs of the SCell. The first BWP may be associated with a firstActiveDownlinkBWP-Id. The firstActiveDownlinkBWP-Id may be configured in an RRC message when the SCell is configured. The first BWP is activated in conjunction with the SCell being activated. In some embodiments, the first CSI-RS for tracking may be configured as an aperiodic CSI-RS for tracking on the first BWP. In some embodiments, the second configuration may further indicate an offset value associated with a delay between slot (n+k) and the first burst, slot n denotes an ending slot for the MAC CE message, and slot (n+k) denotes one slot after decoding and processing of the MAC CE message. In some embodiments, the report may include a downlink (DL) CSI.

Figure 28:
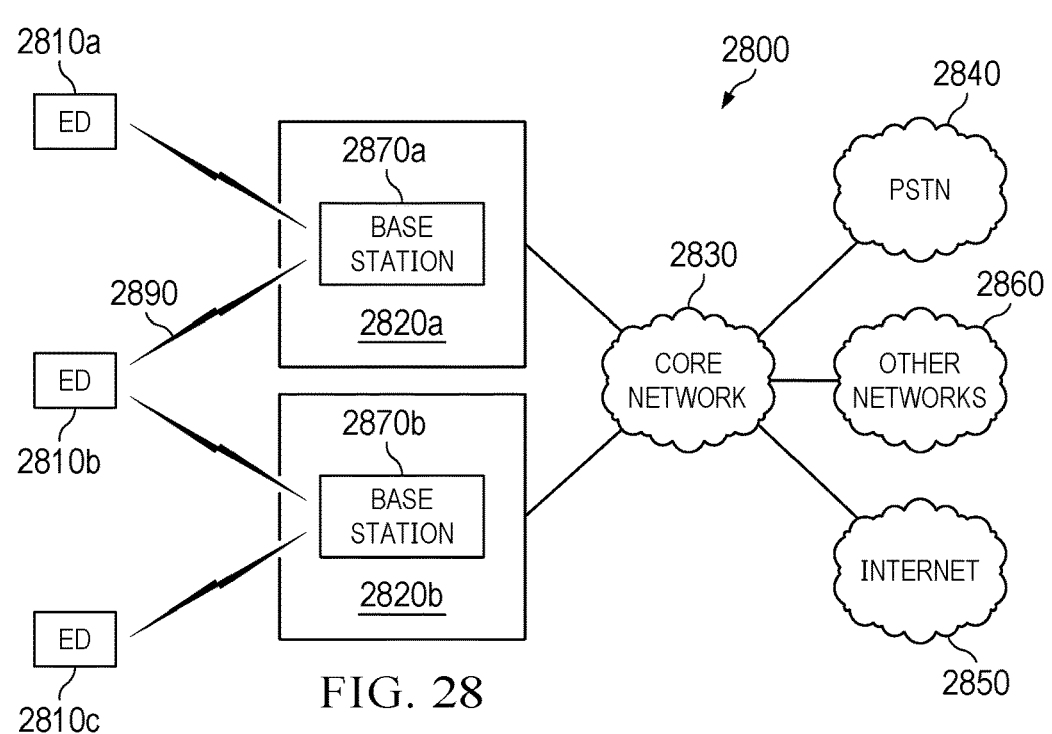
FIG. 28 illustrates an example communication system according to example embodiments presented herein.

FIG. 28 illustrates an example communication system 2800. In general, the system 2800 enables multiple wireless or wired users to transmit and receive data and other content. The system 2800 may implement one or more channel access methods, such as code division multiple access (CDMA), time division multiple access (TDMA), frequency division multiple access (FDMA), orthogonal FDMA (OFDMA), single-carrier FDMA (SC-FDMA), or non-orthogonal multiple access (NOMA).

In this example, the communication system 2800 includes electronic devices (ED) 2810a-2810c, radio access networks (RANs) 2820a-2820b, a core network 2830, a public switched telephone network (PSTN) 2840, the Internet 2850, and other networks 2860. While certain numbers of these components or elements are shown in FIG. 28, any number of these components or elements may be included in the system 2800.

The EDs 2810a-2810c are configured to operate or communicate in the system 2800. For example, the EDs 2810a-2810c are configured to transmit or receive via wireless or wired communication channels. Each ED 2810a-2810c represents any suitable end user device and may include such devices (or may be referred to) as a user equipment or device (UE), wireless transmit or receive unit (WTRU), mobile station, fixed or mobile subscriber unit, cellular telephone, personal digital assistant (PDA), smartphone, laptop, computer, touchpad, wireless sensor, or consumer electronics device.

The RANs 2820a-2820b here include base stations 2870a-2870b, respectively. Each base station 2870a-2870b is configured to wirelessly interface with one or more of the EDs 2810a-2810c to enable access to the core network 2830, the PSTN 2840, the Internet 2850, or the other networks 2860. For example, the base stations 2870a-2870b may include (or be) one or more of several well-known devices, such as a base transceiver station (BTS), a Node-B (NodeB), an evolved NodeB (eNodeB), a Next Generation (NG) NodeB (gNB), a Home NodeB, a Home eNodeB, a site controller, an access point (AP), or a wireless router. The EDs 2810a-2810c are configured to interface and communicate with the Internet 2850 and may access the core network 2830, the PSTN 2840, or the other networks 2860.

In the embodiment shown in FIG. 28, the base station 2870a forms part of the RAN 2820a, which may include other base stations, elements, or devices. Also, the base station 2870b forms part of the RAN 2820b, which may include other base stations, elements, or devices. Each base station 2870a-2870b operates to transmit or receive wireless signals within a particular geographic region or area, sometimes referred to as a "cell." In some embodiments, multiple-input multiple-output (MIMO) technology may be employed having multiple transceivers for each cell.

The base stations 2870a-2870b communicate with one or more of the EDs 2810a-2810c over one or more air interfaces 2890 using wireless communication links. The air interfaces 2890 may utilize any suitable radio access technology.

It is contemplated that the system 2800 may use multiple channel access functionality, including such schemes as described above. In particular embodiments, the base stations and EDs implement 5G New Radio (NR), LTE, LTE-A, or LTE-B. Of course, other multiple access schemes and wireless protocols may be utilized.

The RANs 2820a-2820b are in communication with the core network 2830 to provide the EDs 2810a-2810c with voice, data, application, Voice over Internet Protocol (VoIP), or other services. Understandably, the RANs 2820a-2820b or the core network 2830 may be in direct or indirect communication with one or more other RANs (not shown). The core network 2830 may also serve as a gateway access for other networks (such as the PSTN 2840, the Internet 2850, and the other networks 2860). In addition, some or all of the EDs 2810a-2810c may include functionality for communicating with different wireless networks over different wireless links using different wireless technologies or protocols. Instead of wireless communication (or in addition thereto), the EDs may communicate via wired communication channels to a service provider or switch (not shown), and to the Internet 2850.

Although FIG. 28 illustrates one example of a communication system, various changes may be made to FIG. 28. For example, the communication system 2800 could include any number of EDs, base stations, networks, or other components in any suitable configuration.

Figure 29A:
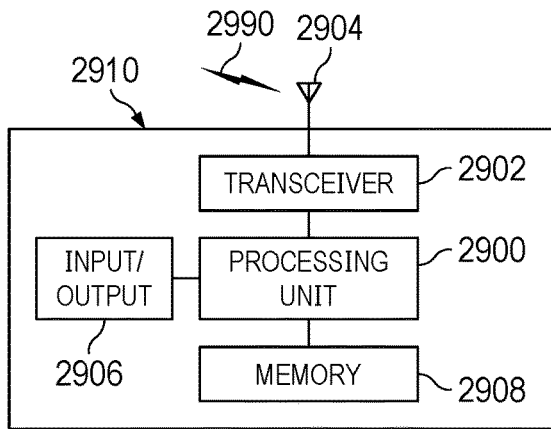
FIGS. 29A and 29B illustrate example devices that may implement the methods and teachings according to this disclosure, according to some embodiments.
Figure 29B:
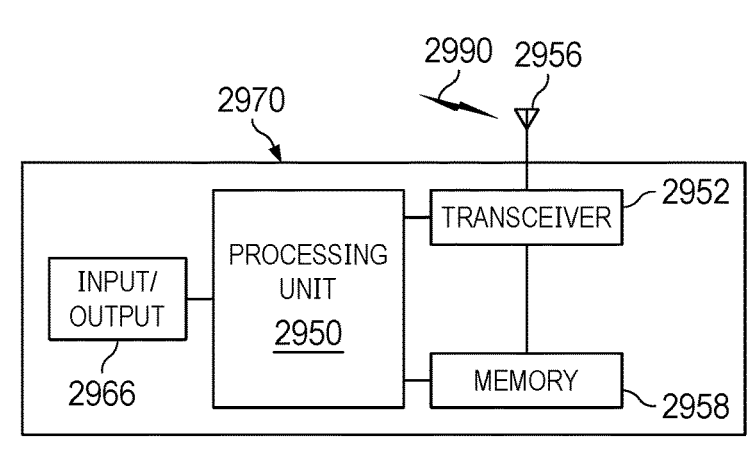

FIGS. 29A and 29B illustrate example devices that may implement the methods and teachings according to this disclosure. In particular, FIG. 29A illustrates an example ED 2910, and FIG. 29B illustrates an example base station 2970. These components could be used in the system 2800 or in any other suitable system.

As shown in FIG. 29A, the ED 2910 includes at least one processing unit 2900. The processing unit 2900 implements various processing operations of the ED 2910. For example, the processing unit 2900 could perform signal coding, data processing, power control, input/output processing, or any other functionality enabling the ED 2910 to operate in the system 2900. The processing unit 2900 also supports the methods and teachings described in more detail above. Each processing unit 2900 includes any suitable processing or computing device configured to perform one or more operations. Each processing unit 2900 could, for example, include a microprocessor, microcontroller, digital signal processor, field programmable gate array, or application specific integrated circuit.

The ED 2910 also includes at least one transceiver 2902. The transceiver 2902 is configured to modulate data or other content for transmission by at least one antenna or NIC (Network Interface Controller) 2904. The transceiver 2902 is also configured to demodulate data or other content received by the at least one antenna 2904. Each transceiver 2902 includes any suitable structure for generating signals for wireless or wired transmission or processing signals received wirelessly or by wire. Each antenna 2904 includes any suitable structure for transmitting or receiving wireless or wired signals. One or multiple transceivers 2902 could be used in the ED 2910, and one or multiple antennas 2904 could be used in the ED 2910. Although shown as a single functional unit, a transceiver 2902 could also be implemented using at least one transmitter and at least one separate receiver.

The ED 2910 further includes one or more input/output devices 2906 or interfaces (such as a wired interface to the Internet 2850). The input/output devices 2906 facilitate interaction with a user or other devices (network communications) in the network. Each input/output device 2906 includes any suitable structure for providing information to or receiving information from a user, such as a speaker, microphone, keypad, keyboard, display, or touch screen, including network interface communications.

In addition, the ED 2910 includes at least one memory 2908. The memory 2908 stores instructions and data used, generated, or collected by the ED 2910. For example, the memory 2908 could store software or firmware instructions executed by the processing unit(s) 2900 and data used to reduce or eliminate interference in incoming signals. Each memory 2908 includes any suitable volatile or non-volatile storage and retrieval device(s). Any suitable type of memory may be used, such as random access memory (RAM), read only memory (ROM), hard disk, optical disc, subscriber identity module (SIM) card, memory stick, secure digital (SD) memory card, and the like.

As shown in FIG. 29B, the base station 2970 includes at least one processing unit 2950, at least one transceiver 2952, which includes functionality for a transmitter and a receiver, one or more antennas 2956, at least one memory 2958, and one or more input/output devices or interfaces 2966. A scheduler, which would be understood by one skilled in the art, is coupled to the processing unit 2950. The scheduler could be included within or operated separately from the base station 2970. The processing unit 2950 implements various processing operations of the base station 2970, such as signal coding, data processing, power control, input/output processing, or any other functionality. The processing unit 2950 can also support the methods and teachings described in more detail above. Each processing unit 2950 includes any suitable processing or computing device configured to perform one or more operations. Each processing unit 2950 could, for example, include a microprocessor, microcontroller, digital signal processor, field programmable gate array, or application specific integrated circuit.

Each transceiver 2952 includes any suitable structure for generating signals for wireless or wired transmission to one or more EDs or other devices. Each transceiver 2952 further includes any suitable structure for processing signals received wirelessly or by wire from one or more EDs or other devices. Although shown combined as a transceiver 2952, a transmitter and a receiver could be separate components. Each antenna 2956 includes any suitable structure for transmitting or receiving wireless or wired signals. While a common antenna 2956 is shown here as being coupled to the transceiver 2952, one or more antennas 2956 could be coupled to the transceiver(s) 2952, allowing separate antennas 2956 to be coupled to the transmitter and the receiver if equipped as separate components. Each memory 2958 includes any suitable volatile or non-volatile storage and retrieval device(s). Each input/output device 2966 facilitates interaction with a user or other devices (network communications) in the network. Each input/output device 2966 includes any suitable structure for providing information to or receiving/providing information from a user, including network interface communications.

Figure 30:
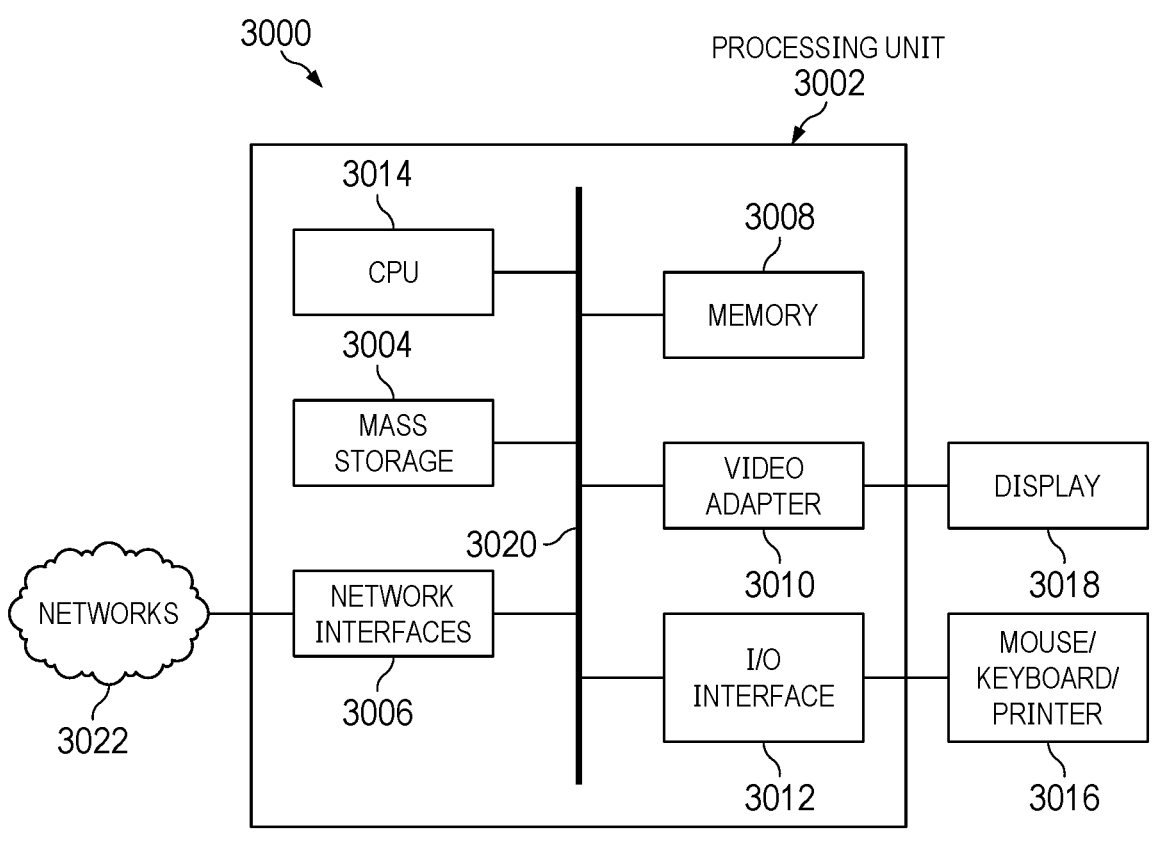
FIG. 30 is a block diagram of a computing system that may be used for implementing the devices and methods disclosed herein, according to some embodiments.

FIG. 30 is a block diagram of a computing system 3000 that may be used for implementing the devices and methods disclosed herein. For example, the computing system can be any entity of UE, access network (AN), mobility management (MM), session management (SM), user plane gateway (UPGW), or access stratum (AS). Specific devices may utilize all of the components shown or only a subset of the components, and levels of integration may vary from device to device. Furthermore, a device may contain multiple instances of a component, such as multiple processing units, processors, memories, transmitters, receivers, etc. The computing system 3000 includes a processing unit 3002. The processing unit includes a central processing unit (CPU)

3014, memory 3008, and may further include a mass storage device 3004, a video adapter 3010, and an I/O interface 3012 connected to a bus 3020.

The bus 3020 may be one or more of any type of several bus architectures including a memory bus or memory controller, a peripheral bus, or a video bus. The CPU 3014 may comprise any type of electronic data processor. The memory 3008 may comprise any type of non-transitory system memory such as static random access memory (SRAM), dynamic random access memory (DRAM), synchronous DRAM (SDRAM), read-only memory (ROM), or a combination thereof. In an embodiment, the memory 3008 may include ROM for use at boot-up, and DRAM for program and data storage for use while executing programs.

The mass storage 3004 may comprise any type of non-transitory storage device configured to store data, programs, and other information and to make the data, programs, and other information accessible via the bus 3020. The mass storage 3004 may comprise, for example, one or more of a solid state drive, hard disk drive, a magnetic disk drive, or an optical disk drive.

The video adapter 3010 and the I/O interface 3012 provide interfaces to couple external input and output devices to the processing unit 3002. As illustrated, examples of input and output devices include a display 3018 coupled to the video adapter 3010 and a mouse, keyboard, or printer 3016 coupled to the I/O interface 3012. Other devices may be coupled to the processing unit 3002, and additional or fewer interface cards may be utilized. For example, a serial interface such as Universal Serial Bus (USB) (not shown) may be used to provide an interface for an external device.

The processing unit 3002 also includes one or more network interfaces 3006, which may comprise wired links, such as an Ethernet cable, or wireless links to access nodes or different networks. The network interfaces 3006 allow the processing unit 3002 to communicate with remote units via the networks. For example, the network interfaces 3006 may provide wireless communication via one or more transmitters/transmit antennas and one or more receivers/receive antennas. In an embodiment, the processing unit 3002 is coupled to a local-area network 3022 or a wide-area network for data processing and communications with remote devices, such as other processing units, the Internet, or remote storage facilities.

It should be appreciated that one or more steps of the embodiment methods provided herein may be performed by corresponding units or modules. For example, a signal may be transmitted by a transmitting unit or a transmitting module. A signal may be received by a receiving unit or a receiving module. A signal may be processed by a processing unit or a processing module. The respective units or modules may be hardware, software, or a combination thereof. For instance, one or more of the units or modules may be an integrated circuit, such as field programmable gate arrays (FPGAs) or application-specific integrated circuits (ASICs).

Although the present disclosure and its advantages have been described in detail, it should be understood that various changes, substitutions and alterations can be made herein without departing from the scope of the disclosure as defined by the appended claims.

What is claimed is:

1. A method comprising:
receiving, by a user equipment (UE) from a base station, a first signaling including a first configuration of a first channel state information reference signal (CSI-RS) for tracking for a secondary cell (SCell), wherein the first configuration is associated with a first identifier (ID);
receiving, by the UE from the base station, a second signaling including a second configuration of a reference signal (RS) for fast SCell activation of the SCell, wherein the second configuration is associated with a second ID, and wherein the second configuration includes the first ID;
receiving, by the UE from the base station, a medium access control (MAC) control element (CE) message, the MAC CE message including an SCell activation command indicating the UE to activate the SCell, and the MAC CE message further including the second ID;
receiving, by the UE from the base station, the RS for the fast SCell activation of the SCell, wherein the RS includes a first burst of the first CSI-RS for tracking;
performing, by the UE upon receiving the SCell activation command, SCell activation for activating the SCell based at least on the RS; and
sending, by the UE to the base station, a report indicating that the SCell is activated for the UE.

2. The method of claim 1, wherein the MAC CE message further includes a bitmap of at least one of one or more activation commands or one or more deactivation commands for corresponding multiple SCells, and the MAC CE message excludes any ID for an RS or an RS configuration for each SCell of one or more SCells to be deactivated.

3. The method of claim 2, wherein the MAC CE message includes a plurality of RS configuration IDs of the one or more SCells to be activated corresponding to the one or more activation commands, wherein the bitmap in the MAC CE message includes activation command bits corresponding to the one or more activation commands, and wherein the plurality of RS configuration IDs follow the bitmap in the MAC CE message in an ascending order of the one or more SCells to be activated in the bitmap.

4. The method of claim 1, the performing the SCell activation including at least one of:
setting, by the UE, automatic gain control (AGC) based on the first burst, or performing, by the UE, time and frequency synchronization or tracking for the SCell based on the first burst.

5. The method of claim 1, wherein the RS further includes a second burst of the first CSI-RS for tracking after the first burst, and wherein a time duration between the first burst and the second burst is associated with a gap value indicated by the second configuration.

6. The method of claim 5, the performing the SCell activation including:
setting, by the UE, AGC based on the first burst; and
performing, by the UE, time and frequency synchronization or tracking for the SCell based on the second burst.

7. The method of claim 1, wherein the RS is aperiodic and transmitted to the UE responsive to the SCell activation command being transmitted.

8. The method of claim 1, the receiving the RS comprising:
receiving, by the UE from the base station, the RS on a first bandwidth part (BWP) in one or more BWPs of the SCell, wherein the first BWP is associated with a firstActiveDownlinkBWP-Id, wherein the firstActiveDownlinkBWP-Id is configured in an RRC message when the SCell is configured, and wherein the first BWP is activated in conjunction with the SCell being activated.

9. The method of claim 8, wherein the first CSI-RS for tracking is configured as an aperiodic CSI-RS for tracking on the first BWP.

10. The method of claim 1, wherein the second configuration further indicates an offset value associated with a delay between slot (n+k) and the first burst, wherein slot n denotes an ending slot for the MAC CE message, and wherein the slot (n+k) denotes one slot after decoding and processing of the MAC CE message.

11. The method of claim 1, wherein the report includes a downlink (DL) CSI.

12. A method comprising:

transmitting, by a base station to a user equipment (UE), a first signaling including a first configuration of a first channel state information reference signal (CSI-RS) for tracking for a secondary cell (SCell), wherein the first configuration is associated with a first identifier (ID);

transmitting, by the base station to the UE, a second signaling including a second configuration of a reference signal (RS) for fast SCell activation of the SCell, wherein the second configuration is associated with a second ID, and wherein the second configuration includes the first ID;

transmitting, by the base station to the UE, a medium access control (MAC) control element (CE) message, the MAC CE message including an SCell activation command indicating the UE to activate the SCell, and the MAC CE message further including the second ID;

transmitting, by the base station to the UE, the RS for the fast SCell activation of the SCell, wherein the RS includes a first burst of the first CSI-RS for tracking; and receiving, by the base station from the UE, a report indicating that the SCell is activated for the UE.

13. The method of claim 12, wherein the MAC CE message further includes a bitmap of at least one of one or more activation commands or one or more deactivation commands for corresponding multiple SCells, and the MAC CE message excludes any ID for an RS or an RS configuration for each SCell of one or more SCells to be deactivated.

14. The method of claim 13, wherein the MAC CE message includes a plurality of RS configuration IDs of the one or more SCells to be activated corresponding to the one or more activation commands, wherein the bitmap in the MAC CE message includes activation command bits corresponding to the one or more activation commands, and wherein the plurality of RS configuration IDs follow the bitmap in the MAC CE message in an ascending order of the one or more SCells to be activated in the bitmap.

15. The method of claim 12, the SCell activation command configured to cause the UE to perform SCell activation for activating the SCell based at least on the RS.

16. The method of claim 15, wherein the UE performs the SCell activation by at least one of setting automatic gain control (AGC) based on the first burst or performing time and frequency synchronization or tracking for the SCell based on the first burst.

17. The method of claim 15, wherein the RS further includes a second burst of the first CSI-RS for tracking after the first burst, and wherein a time duration between the first burst and the second burst is associated with a gap value indicated by the second configuration.

18. The method of claim 17, wherein the UE performs the SCell activation by setting AGC based on the first burst and performing time and frequency synchronization or tracking for the SCell based on the second burst.

19. The method of claim 15, wherein the RS is aperiodic and transmitted to the UE responsive to the SCell activation command being transmitted.

20. The method of claim 12, the transmitting the RS comprising:

transmitting, by the base station to the UE, the RS on a first bandwidth part (BWP) in one or more BWPs of the SCell, wherein the first BWP is associated with a firstActiveDownlinkBWP-Id, wherein the firstActive-DownlinkBWP-Id is configured in an RRC message when the SCell is configured, and wherein the first BWP is activated in conjunction with the SCell being activated.

21. The method of claim 20, wherein the first CSI-RS for tracking is configured as an aperiodic CSI-RS for tracking on the first BWP.

22. The method of claim 12, wherein the second configuration further indicates an offset value associated with a delay between slot (n+k) and the first burst, wherein slot n denotes an ending slot for the MAC CE message, and wherein the slot (n+k) denotes one slot after decoding and processing of the MAC CE message.

23. The method of claim 12, wherein the report includes a downlink (DL) CSI.

24. A user equipment (UE) comprising:

at least one processor; and a non-transitory computer readable storage medium storing instructions that, when executed by the at least one processor, cause the UE to perform operations, the operations comprising:

receiving, from a base station, a first signaling including a first configuration of a first channel state information reference signal (CSI-RS) for tracking for a secondary cell (SCell), wherein the first configuration is associated with a first identifier (ID);

receiving, from the base station, a second signaling including a second configuration of a reference signal (RS) for fast SCell activation of the SCell, wherein the second configuration is associated with a second ID, and wherein the second configuration includes the first ID;

receiving, from the base station, a medium access control (MAC) control element (CE) message, the MAC CE message including an SCell activation command indicating the UE to activate the SCell, and the MAC CE message further including the second ID;

receiving, from the base station, the RS for the fast SCell activation of the SCell, wherein the RS includes a first burst of the first CSI-RS for tracking;

performing, upon receiving the SCell activation command, SCell activation for activating the SCell based at least on the RS; and sending, to the base station, a report indicating that the SCell is activated for the UE.

25. A base station comprising:

at least one processor; and a non-transitory computer readable storage medium storing instructions that, when executed by the at least one processor, cause the base station to perform operations, the operations comprising:

transmitting, to a user equipment (UE), a first signaling including a first configuration of a first channel state information reference signal (CSI-RS) for tracking for a secondary cell (SCell), wherein the first configuration is associated with a first identifier (ID);

transmitting, to the UE, a second signaling including a second configuration of a reference signal (RS) for fast SCell activation of the SCell, wherein the second configuration is associated with a second ID, and wherein the second configuration includes the first ID;

transmitting, to the UE, a medium access control (MAC) control element (CE) message, the MAC CE message including an SCell activation command indicating the UE to activate the SCell, and the MAC CE message further including the second ID;

transmitting, to the UE, the RS for the fast SCell activation of the SCell, wherein the RS includes a first burst of the first CSI-RS for tracking; and receiving, from the UE, a report indicating that the SCell is activated for the UE.

26. The base station of claim 25, the SCell activation command configured to cause the UE to perform SCell activation for activating the SCell based at least on the RS.

* * * * *